United States Patent
Sakurai

(10) Patent No.: US 7,593,569 B2
(45) Date of Patent: Sep. 22, 2009

(54) PIXEL DEFECT CORRECTION DEVICE

(75) Inventor: Junzo Sakurai, Hachioju (JP)

(73) Assignee: Eastman Kodak Company, Rochester, NY (US)

( * ) Notice: Subject to any disclaimer, the term of this patent is extended or adjusted under 35 U.S.C. 154(b) by 698 days.

(21) Appl. No.: 11/248,882

(22) Filed: Oct. 12, 2005

(65) Prior Publication Data

US 2006/0132626 A1    Jun. 22, 2006

(30) Foreign Application Priority Data

Dec. 21, 2004    (JP) .............................. 2004-369737

(51) Int. Cl.
G06K 9/00    (2006.01)
(52) U.S. Cl. ...................................... 382/167; 348/246
(58) Field of Classification Search ................. 382/167; 348/246
See application file for complete search history.

(56) References Cited

U.S. PATENT DOCUMENTS 6,683,643 B1 * 1/2004 Takayama et al. ........... 348/247
6,741,754 B2    5/2004 Hamilton, Jr.
7,015,961 B2 * 3/2006 Kakarala ..................... 348/246
2002/0149683 A1 * 10/2002 Post ........................... 348/246

* cited by examiner

Primary Examiner—Vikkram Bali
Assistant Examiner—Eueng-Nan Yeh
(74) Attorney, Agent, or Firm—Pamela R. Crocker

(57) ABSTRACT

A point defect and a line defect in a captured image resulting due to an imaging element defect in a digital camera are interpolated. A defect correction circuit of a digital camera simultaneously corrects a point flaw, a vertical line flaw, and a horizontal line flaw in a captured image. In consideration of cases in which a point flaw and a vertical line flaw are present adjacent to each other, the defect correction circuit executes predetermined difference calculations using pixels surrounding a target pixel to be corrected and determines an interpolation pattern based on a comparison of magnitude among the difference calculation values. The defect correction circuit also selects, for interpolation, an interpolation pattern from among interpolation patterns prepared in advance based on an adjacent pattern of the point flaw and line flaw. The adjacent pattern is detected by a defect decode circuit 78.

12 Claims, 55 Drawing Sheets

| R00 | G01 | R02 | G03 | R04 | G05 |
|-----|-----|-----|-----|-----|-----|
| G10 | B11 | G12 | B13 | G14 | B15 |
| R20 | G21 | R22 | G23 | R24 | G25 |
| G30 | B31 | G32 | B33 | G34 | B35 |
| R40 | G41 | R42 | G43 | R44 | G45 |

| R00 | G | ▨ | G | R04 |
|---|---|---|---|---|
| G | B | ▨ | B | G |
| R20—G→| R22 |←G—R24 |
| G | B | ▨ | B | G |
| R40 | G | ▨ | G | R44 |

Fig. 12 (b)

| R00 | G | ▨ | G | R04 |
|---|---|---|---|---|
| G | B | ▨ | B | G |
| R20 | G | R22 | G | R24 |
| G | B | ▨ | B | G |
| R40 | G | ▨ | G | R44 |

Fig. 12 (c)

| R00 | G | ▨ | G | R04 |
|---|---|---|---|---|
| G | B | ▨ | B | G |
| R20 | G | R22 | G | R24 |
| G | B | ▨ | B | G |
| R40 | G | ▨ | G | R44 |

| G01 | R | G03 | R | G05 |
|---|---|---|---|---|
| B | G12 | B | G14 | B |
| ▨ | ▨ | G23 | ▨ | ▨ |
| B | G32 | B | G34 | B |
| G41 | R | G43 | R | G45 |

Fig. 17 (b)

| G01 | R | G03 | R | G05 |
|---|---|---|---|---|
| B | G12 | B | G14 | B |
| ▨ | ▨ | G23 | ▨ | ▨ |
| B | G32 | B | G34 | B |
| G41 | R | G43 | R | G45 |

Fig. 17 (c)

| G01 | R | G03 | R | G05 |
|---|---|---|---|---|
| B | G12 | B | G14 | B |
| ▨ | ▨ | G23 | ▨ | ▨ |
| B | G32 | B | G34 | B |
| G41 | R | G43 | R | G45 |

Fig. 17 (d)

| G01 | R | G03 | R | G05 |
|---|---|---|---|---|
| B | G12 | B | G14 | B |
| ▨ | ▨ | G23 | ▨ | ▨ |
| B | G32 | B | G34 | B |
| G41 | R | G43 | R | G45 |

| R00 | G | R02 | G | R04 |
|---|---|---|---|---|
| G | B | G | B | G |
| ▨ | ▨ | R22 | ▨ | ▨ |
| G | B | G | B | G |
| R40 | G | R42 | G | R44 |

Fig. 20 (b)

| R00 | G | R02 | G | R04 |
|---|---|---|---|---|
| G | B | G | B | G |
| ▨ | ▨ | R22 | ▨ | ▨ |
| G | B | G | B | G |
| R40 | G | R42 | G | R44 |

Fig. 20 (c)

| R00 | G | R02 | G | R04 |
|---|---|---|---|---|
| G | B | G | B | G |
| ▨ | ▨ | R22 | ▨ | ▨ |
| G | B | G | B | G |
| R40 | G | R42 | G | R44 |

| G01 | R | /// | R | G05 |
|-----|---|-----|---|-----|
| B | G12 | /// | G14 | B |
| G21 | R | G23 | R | G25 |
| B | G32 | /// | G34 | B |
| G41 | R | /// | R | G45 |

Fig. 52

| G01 | R   |     | R   | G05 |
|-----|-----|-----|-----|-----|
| B   | G12 |     | G14 | B   |
| G21 | R   | G23 | R   | G25 |
| B   | G32 |     | G34 | B   |
| G41 | R   |     | R   | G45 |

Fig. 54 (a)

| G01 | R   |     | R   | G05 |
|-----|-----|-----|-----|-----|
| B   | G12 |     | G14 | B   |
| G21 | R   | G23 | R   | G25 |
| B   | G32 |     | G34 | B   |
| G41 | R   |     | R   | G45 |

Fig. 54 (b)

| G01 | R   |     | R   | G05 |
|-----|-----|-----|-----|-----|
| B   | G12 |     | G14 | B   |
| G21 | R   | G23 | R   | G25 |
| B   | G32 |     | G34 | B   |
| G41 | R   |     | R   | G45 |

Fig. 54 (c)

| G01 | R   |     | R   | G05 |
|-----|-----|-----|-----|-----|
| B   | G12 |     | G14 | B   |
| G21 | R   | G23 | R   | G25 |
| B   | G32 |     | G34 | B   |
| G41 | R   |     | R   | G45 |

| G01 | R | | R | G05 |
|---|---|---|---|---|
| B | G12 | | G14 | B |
| G21 | R | G23 | R | G25 |
| B | G32 | | G34 | B |
| G41 | R | | R | G45 |

Fig. 55 (b)

| G01 | R | | R | G05 |
|---|---|---|---|---|
| B | G12 | | G14 | B |
| G21 | R | G23 | R | G25 |
| B | G32 | | G34 | B |
| G41 | R | | R | G45 |

Fig. 55 (c)

| G01 | R | | R | G05 |
|---|---|---|---|---|
| B | G12 | | G14 | B |
| G21 | R | G23 | R | G25 |
| B | G32 | | G34 | B |
| G41 | R | | R | G45 |

Fig. 55 (d)

| G01 | R | | R | G05 |
|---|---|---|---|---|
| B | G12 | | G14 | B |
| G21 | R | G23 | R | G25 |
| B | G32 | | G34 | B |
| G41 | R | | R | G45 |

PIXEL DEFECT CORRECTION DEVICE

FIELD OF THE INVENTION

The present invention relates to a pixel defect correction device, and in particular to a technique for correcting point defects, horizontal direction defects, and vertical direction defects in two-dimensional pixels arranged along horizontal and vertical directions.

BACKGROUND OF THE INVENTION

CCD's and CMOS's are used as imaging elements in digital cameras. In order to respond to a demand for higher image quality, efforts have been made to reduce pixel size and increase the number of pixels. While the reduction of the pixel size can be achieved by reducing the size of the photodiode and vertical direction (V) transfer path, reduction of the size of the photodiode and the V transfer path increases the probability of generation of defects. A localized crystal defect of a photodiode causes pixel degradation and defects in which a constant bias voltage is always applied to an opto-electric conversion output corresponding to an amount of incident light causes a white spot with a high brightness on the monitor, and thus causes a defect which is commonly called a white flaw. A defect in which the photosensitivity of the photodiode is reduced appears on the monitor as a black point, and thus causes a defect which is commonly called a black flaw. A defect in which a dust or like is attached to the V transfer path blocks transfer of charges and appears on the monitor as a linear flaw, and thus causes a defect which is commonly called a vertical flaw. Therefore, it is necessary to correct the point flaw and the vertical flaw. The point flaw and the vertical flaw can be corrected through a correction using pixel values of pixels surrounding the defect and in which the point defect and V transfer path defect are not present.

U.S. Pat. No. 6,741,754 discloses a technique for correcting a point flaw and a vertical flaw. This related art will now be described. FIG. 49 shows a flowchart of an overall process in this related art. A target image is imaged on a CCD through an optical system of the digital camera such as a lens, a shutter, and a diaphragm. Each photodiode which forms a part of the CCD converts light from the target into an electrical signal based on the amount of light and outputs as an image signal. The image signal is converted into a digital signal by an A/D device and then supplied to an image processor. The image processor comprises a system LSI and processes a digital image signal to generate image signals of R, G, and B. The image signals of R, G, and B are converted into an analog signal by a A/D device and displayed on a display panel on a back surface of the digital camera. When the user presses a shutter button of the digital camera, the image captured at the time of pressing is output from the image processor and stored in a memory. The image processor determines whether or not there is a point flaw or a vertical flaw within the captured image at the timing of the pressing operation of the button. When at least one point flaw or vertical flaw is present, any point flaw is first corrected (S101) and then, after the point flaw is corrected, any vertical flaw is corrected. In the correction of the vertical flaw, the vertical flaw of the G pixel is first corrected (S102) and then the vertical flaw of the R pixel and the vertical flaw of the B pixel are corrected (S103). After the point flaw and the vertical flaw are corrected, normal signal processes are applied and the signal is stored in a memory (S104).

FIG. 50 shows a method of correcting the point flaw in the G pixel. In FIG. 50, it is assumed that the point defect appears in a pixel G23. Four pixels surrounding the G23 pixel, that is, a pixel G12, a pixel G14, a pixel G32, and a pixel G34 are used to interpolate a pixel value of the pixel G23 to correct the defect using:

$$G23 = (G12 + G14 + G32 + G34)/4$$

The above-described expression indicates that the pixel G23 is corrected using an average of surrounding four pixels.

FIG. 51 shows a method for correcting a point flaw of an R pixel. In FIG. 51, it is assumed that a point defect appears in a pixel R22. Four pixels surrounding the pixel R22, that is, a pixel R02, a pixel R42, a pixel R20, and a pixel R24 are used to correct the pixel value of the R22 pixel using:

$$R22 = (R02 + R42 + R20 + R24)/4$$

Because the placement of the B pixel is similar to that of the R pixel, the point defect of the B pixel can be corrected in a manner similar to the point effect of the R pixel.

FIG. 52 shows a vertical flaw of the G pixel. FIG. 52 shows a case in which a defect appears in the transfer path along the V direction including the pixel G23 and a vertical line including G23 becomes black.

FIG. 53 is a block diagram of a vertical flaw correction circuit for G which corrects the vertical flaw shown in FIG. 52. A correction circuit 10 is provided within an image processor of the digital camera and comprises an interpolation pattern unit 12, a vertical line flaw detection pattern unit 14, and a calculation pattern selector 16. The interpolation pattern unit 12 executes an interpolation calculation for all of a plurality of correction patterns which are defined in advance. The vertical line flaw detection pattern unit 14 detects the pattern of the vertical line flaw through calculation. The calculation pattern selector 16 selects one of the correction patterns based on the calculation result form the vertical line flaw detection pattern unit 14 and outputs the selected correction value as a correction value of the G pixel.

FIG. 54 shows a calculation in the vertical line flaw detection pattern unit 14. The vertical line flaw detection pattern unit 14 executes four calculations shown in FIG. 54. FIG. 54(a) shows a pattern in which a difference between an upper-right pixel G14 and a lower-left pixel G32 which are adjacent to the pixel G23 to be corrected is calculated. When the difference calculation in this direction is abbreviated as Sla:

$$G(Sla) = ABS(G14 - G32)$$

In this expression, "ABS" indicates an absolute value. FIG. 54(b) shows a pattern in which a difference between an upper-left pixel G12 and a lower-right pixel G32 which are adjacent to the pixel G23 to be corrected is calculated. When the difference calculation in which direction is abbreviated as Bac:

$$G(Bac) = ABS(G12 - G34)$$

FIG. 54(c) shows a pattern in which a difference between pixels G21 and G25 which are pixels immediately to the right and to the left in the horizontal direction of the pixel G23 to be corrected is calculated. When the difference calculation in this direction is abbreviated as Hor:

$$G(Hor) = ABS(G21 - G25)$$

FIG. 54(d) shows a pattern in which a difference among pixels G12, G32, G14, and G34 which are adjacent pixels of the pixel G23 to be corrected along the vertical direction is calculated. When the difference calculation in this direction is abbreviated as G(Ver):

$$G(Ver) = ABS(G12 + G14 - G32 - G34)$$

The vertical line flaw detection pattern unit 14 executes these four difference calculations and supplies the calculated values to the calculation pattern selector 16.

FIG. 55 shows a calculation performed at the interpolation pattern unit 12. FIG. 55(*a*) shows a correction calculation using the upper-right pixel, lower-right pixel, upper-left pixel, and lower-left pixels which are adjacent to the pixel G23 to be corrected. This calculation can be represented as:

$$G23=(G12+G14+G32+G34)/4$$

FIG. 55(*b*) shows a correction calculation using pixels G21 and G25 which are adjacent to the pixel G23 to be corrected along the horizontal direction. This calculation can be represented as:

$$G23=(G21+G25)/2$$

FIG. 55(*c*) shows a correction calculation using the upper-right pixel G14 and the lower-left pixel G32 which are adjacent to the pixel G23 to be corrected. This calculation can be represented as:

$$G23=(G14+G32)/2$$

FIG. 55(*d*) shows a correction calculation using the upper-left pixel G12 and the lower-right pixel G34 which are adjacent to the pixel G23 to be corrected. This calculation can be represented as:

$$G23=(G12+G34)/2$$

The interpolation pattern unit 12 supplies correction values which are corrected using these four correction patterns to the calculation pattern selector 16. The calculation pattern selector 16 selects one of the four correction values from the interpolation pattern unit 12 based on a magnitude comparison among four difference calculation values from the vertical line flaw detection pattern unit 14 and outputs the selected correction value. More specifically, the calculation pattern selector 16 calculates a calculation pattern having a small difference calculation value and selects a correction pattern corresponding to the calculation pattern. Based on the four difference calculation values of G(Sla), G(Bac), G(Hor), and G(Ver), the calculation pattern selector 16 determines:

$$G(Hor)<G(Sla) \text{ and } G(Hor)<G(Bac) \quad (1)$$

When the difference in the pixels along horizontal direction is small and this condition is satisfied, the calculation pattern selector 16 determines:

$$G(Ver)<\text{threshold value} \quad (2)$$

When the difference in the pixels along vertical direction is small and this condition is also satisfied, it is determined that the difference value is small both in the horizontal direction and in the vertical direction. Therefore, a correction pattern shown in FIG. 55(*a*) is selected. When, on the other hand, the condition (1) is satisfied, but condition (2) is not satisfied, it is determined that the difference value in the vertical direction is large and the correction pattern of FIG. 55(*b*) is selected in order to execute the correction process only with the pixels of the horizontal direction.

When the condition (1) is not satisfied, the calculation pattern selector 16 determines:

$$G(Sla)<G(Bac) \quad (3)$$

When the difference value in the Sla direction is small, the correction pattern of FIG. 55(*c*) is selected. On the contrary, when the condition (3) is not satisfied, the correction pattern of FIG. 55(*d*) is selected. In summary, this process is an algorithm in which the target pixel is corrected using surrounding pixels in which the difference calculation value is small and thus the pixel values do not significantly differ from each other.

FIG. 56 is a block diagram of a vertical line flaw correction circuit for R. A correction circuit 18 comprises an interpolation pattern unit 20, a vertical line flaw detection pattern unit 22, and a calculation pattern selector 24. The functions of these units are similar to the interpolation pattern unit 12, vertical line flaw detection pattern section 14, and calculation pattern selector 16 of the correction circuit 10.

FIG. 57 shows a calculation in the vertical line flaw detection pattern unit 22. FIG. 57(*a*) is a difference calculation using pixels G12, G21, G23, and G32 surrounding a pixel R22 to be corrected and pixels G01, G10, G34, and G43 at the lower right and the upper left. When the difference calculation in this direction is abbreviated as Sla:

$$G'(Sla)=(G12+G21+G23+G32-G01-G10-G34-G43)/2$$

FIG. 57(*b*) shows a difference calculation using the pixels surrounding the pixel R22 to be corrected and pixels G03, G14, G30, and G41 at the upper right and lower left. When the difference calculation in this direction is abbreviated as Bac:

$$G'(Bac)=(G12+G21+G23+G32-G03-G14-G30-G41)/2$$

FIG. 57(*c*) shows a difference calculation using pixels surrounding the pixel R22 to be corrected and pixels G10, G30, G14, and G34 in the horizontal direction. When the difference calculation in this direction is abbreviated as Hor:

$$G'(Hor)=(G12+G21+G23+G32-G10-G30-G14-G34)/2$$

The vertical line flaw detection pattern unit 22 supplies these three difference calculation values to the calculation pattern selector 24.

FIG. 58 shows a calculation in the interpolation pattern unit 20. FIG. 58(*a*) is a calculation using pixels R20 and R24 in the horizontal direction of the pixel R22 to be corrected and:

$$R22=(R20+R24+G'(Hor))/2$$

FIG. 58(*b*) is a correction calculation using the pixels R00 and R44 at the upper left and the lower right of the pixel R22 to be corrected and:

$$R22=(R00+R44+G'(Sla))/2$$

FIG. 58(*c*) is a correction calculation using pixels R04 and R40 at the upper right and lower left of the pixel R22 to be corrected and:

$$R22=(R04+R40+G'(Bac))/2$$

The interpolation pattern unit 20 supplies these three correction values to the calculation pattern selector 24. The interpolation pattern selector 24 compares the magnitude of the three difference calculation values from the vertical line flaw detection pattern unit 22. Then, the interpolation pattern selector 24 determines:

$$ABS(G'(Hor))<ABS(G'(Sla)) \text{ and } ABS(G'(Hor))<ABS(G'(Bac)) \quad (4)$$

When the difference value in the horizontal direction is small and the condition (4) is satisfied, the interpolation pattern selector 24 selects the correction pattern of FIG. 58(*a*). When, on the other hand, the condition (1) is not satisfied, the interpolation pattern selector 24 determines:

$$ABS(G'(Sla))<ABS(G'(Bac)) \quad (5)$$

When the difference in the horizontal direction is large but the difference in Sla is small, and thus the condition (5) is satisfied, the interpolation pattern selector 24 selects the correction pattern of FIG. 58(b). When, on the other hand, the condition (5) is not satisfied, the correction pattern of FIG. 58(c) is selected.

When the point flaw and the vertical flaw are sequentially corrected as described above, correction circuits for both processes are required, and, moreover, the correction process requires a long time before all defects are corrected. Therefore, it is desirable that the point flaw and the vertical flaw be simultaneously processed. When, however, the point flaw and the vertical flaw are simultaneously processed in the related art as described above, there is a problem in that the precision of the correction is degraded when the point flaw and the vertical flaw are present adjacent to each other.

For example, in a case in which a point flaw is present, in addition to the vertical flaw shown in FIG. 52, in pixels G12 and G14 which are adjacent pixels of the vertical flaw and the pixel values in the pixels are as shown in FIG. 59, that is, the pixel values in the pixels G12 and G14 which are point flaws are 255 in 256 gradation system from 0 to 255, the pixel value in the pixel G21 is 158, the pixel value in the pixel G25 is 217, the pixel value in the pixel G32 is 183, and the pixel value in the pixel G34 is 212. In this case, the four difference calculation values shown in FIG. 54 are:

$G(Sla)=ABS(G14-G32)=72;$ $G(Bac)=ABS(G12-G34)=43;$ $G(Hor)=ABS(G21-G25)=59;$ and $G(Ver)=ABS(G12+G14-G32-G34)=115$ Because G(Bac)<G(Hor), the calculation pattern selector 16 selects the correction pattern of FIG. 55(d) and the pixel G23 is corrected using pixels G12 and G34. However, because a point flaw is present in the pixel G12, the pixel G23 can be corrected only when the pixel G12 has an accurate pixel value.

The above-described problem may occur not only when the point flaw and the vertical flaw are simultaneously corrected, but also when the G pixel, R pixel, and B pixel are simultaneously corrected and when the vertical flaw and a horizontal flaw are simultaneously corrected in a case in which the horizontal flaw and vertical flaw may simultaneously occur because of a gate switch defect of a CMOS.

SUMMARY OF THE INVENTION

The present invention was conceived in view of the above-described circumstances and advantageously provides a device which can simultaneously correct a point flaw and a vertical flaw; a point flaw and a horizontal flaw; or a point flaw, a vertical flaw, and a horizontal flaw.

According to one aspect of the present invention, there is provided a pixel defect correction circuit which corrects a point defect and a line defect of a plurality of pixels arranged along a horizontal direction and a vertical direction, the pixel defect correction circuit comprising a unit which detects presence and a position of a point defect and a line defect, a unit which corrects a point defect pixel by calculating a pixel value of the point defect pixel from pixel values of surrounding pixels which are adjacent to the point defect pixel, a unit which calculates a first difference value between pixel values of an upper-right pixel and a lower-left pixel which are adjacent to a target pixel to be corrected within a line defect pixel, a second difference value between pixel values of an upper-left pixel and a lower-right pixel which are adjacent to the target pixel, a third difference value between a sum of the pixel values of the upper-left pixel and the lower-left pixel and a sum of the pixel values of the upper-right pixel and the lower-right pixel, and a fourth difference value between a sum of the pixel values of the upper-left pixel and the upper-right pixel and a sum of the pixel values of the lower-left pixel and the lower-right pixel, and a unit which corrects the line defect pixel by calculating a pixel value of the target pixel from at least one of the pixel values of the upper-right pixel, the lower-right pixel, the upper-left pixel, and the lower-left pixel using a correction pattern corresponding to a relationship in magnitude of the first difference value, the second difference value, the third difference value, and the fourth difference value.

According to another aspect of the present invention, there is provided a pixel defect correction circuit which corrects a point defect and a line defect of a plurality of pixels arranged along a horizontal direction and a vertical direction, the pixel defect correction circuit comprising a unit which detects presence and a position of a point defect and a line defect, a unit which corrects a point defect pixel by calculating a pixel value of the point defect pixel from pixel values of surrounding pixels which are adjacent to the point defect pixel, a unit which calculates a first difference value between pixel values of a horizontal direction pixel and an upper-left pixel and a lower-right pixel which are adjacent to a target pixel to be corrected within a line defect pixel, a second difference value between pixel values of the horizontal direction pixel and an upper-right pixel and a lower-left pixel which are adjacent to the target pixel, and a third difference value between pixel values of the horizontal direction pixel and a left pixel and a right pixel which are adjacent to the target pixel, and a unit which corrects a vertical line defect pixel by calculating a pixel value of the target pixel from at least one of the pixel values of the upper-right pixel, the lower-right pixel, the upper-left pixel, and the lower-left pixel using a correction pattern corresponding to a relationship in magnitude of the first difference value, the second difference value, and the third difference value.

According to another aspect of the present invention, there is provided a pixel defect correction circuit which corrects a point defect and a line defect of a plurality of pixels arranged along a horizontal direction and a vertical direction, the pixel defect correction circuit comprising a unit which detects presence and a position of a point defect and a line defect, a unit which corrects a point defect pixel by calculating a pixel value of the point defect pixel from pixel values of surrounding pixels which are adjacent to the point defect pixel, a unit which calculates a first difference value between pixel values of a vertical direction pixel and an upper-left pixel and a lower-right pixel which are adjacent to a target pixel to be corrected within a line defect pixel, a second difference value between pixel values of the vertical direction pixel and an upper-right pixel and a lower-left pixel which are adjacent to the target pixel, and a third difference value between pixel values of the vertical direction pixel and a left pixel and a right pixel which are adjacent to the target pixel, and a unit which corrects a horizontal line defect pixel by calculating a pixel value of the target pixel from at least one of the pixel values of the upper-right pixel, the lower-right pixel, the upper-left pixel, and the lower-left pixel using a correction pattern corresponding to a relationship in magnitude among the first difference value, the second difference value, and the third difference value.

According to another aspect of the present invention, there is provided a pixel defect correction circuit which corrects a point defect and a line defect of a plurality of pixels arranged along a horizontal direction and a vertical direction, the pixel defect correction circuit comprising a unit which detects presence and a position of a point defect and a line defect, a unit which corrects a point defect pixel by calculating a pixel value of the point defect pixel from pixel values of surrounding pixels which are adjacent to the point defect pixel, and a unit which, when a point defect and a line defect are at adjacent positions, corrects a line defect pixel by calculating a pixel value of a target pixel to be corrected within the line defect from pixel values of the surrounding pixels other than the line defect according to a pattern of the adjacent positions.

Through use of the present invention, a point defect pixel and a line defect pixel can be reliably corrected, and a point defect pixel and a line defect pixel can be corrected simultaneously and in parallel to each other.

BRIEF DESCRIPTION OF THE DRAWINGS

Preferred embodiments of the present invention will be described in detail by reference to the drawings, wherein:

FIG. 2 is an explanatory diagram showing a Bayer arrangement of color filters;

FIG. 11 is an explanatory diagram showing a calculation at a vertical line flaw detection pattern unit for RB according to the first preferred embodiment of the present invention;

FIG. 12 is an explanatory diagram showing an interpolation pattern at an interpolation pattern unit for RB according to the first preferred embodiment of the present invention;

FIG. 16 is an explanatory diagram showing a calculation at a horizontal line flaw detection pattern unit for G according to the second preferred embodiment of the present invention;

FIG. 17 is an explanatory diagram showing an interpolation pattern at an interpolation pattern unit for G according to the second preferred embodiment of the present invention;

FIG. 19 is an explanatory diagram showing a calculation in a horizontal line flaw detection pattern unit for RB according to the second preferred embodiment of the present invention;

FIG. 20 is an explanatory diagram showing an interpolation pattern at an interpolation pattern unit for RB according to the second preferred embodiment of the present invention;

FIG. 35 is an explanatory diagram showing a calculation at a calculation unit for RB according to the third preferred embodiment of the present invention;

FIG. 43 is an explanatory diagram showing a calculation at a calculation unit for RB according to the fourth preferred embodiment of the present invention;

FIG. 46 is an explanatory diagram showing a calculation at an intersecting flaw calculation unit for RB according to the fourth preferred embodiment of the present invention;

FIG. 52 is an explanatory diagram showing a vertical flaw of a G pixel;

FIG. 54 is an explanatory diagram showing a calculation at a vertical line flaw detection pattern unit for G in a device according to a related art;

FIG. 55 is an explanatory diagram showing an interpolation pattern at a vertical line flaw interpolation pattern unit for G in a device according to a related art;

FIG. 57 is an explanatory diagram showing a calculation at a vertical line flaw detection pattern unit for RB in a device according to a related art;

FIG. 58 is an explanatory diagram showing an interpolation pattern at a vertical line flaw interpolation pattern unit for RB in a device according to a related art.

DETAILED DESCRIPTION OF THE INVENTION

Figure 1:
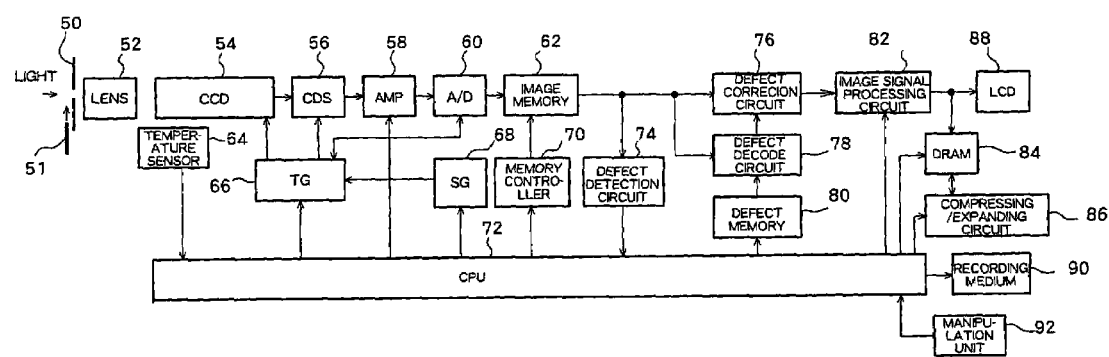
FIG. 1 is a block diagram showing a structure of a preferred embodiment of the present invention.

Preferred embodiments of the present invention will now be described referring to the drawings. FIG. 1 shows an overall structure of a digital camera incorporating a pixel defect correction circuit according to a first preferred embodiment of the present invention. An optical system including a diaphragm 50 and a lens 52 guides light from an imaging target to a CCD 54. A light shielding filter 51 may be placed in front of the diaphragm 50. The CCD 54 converts the light from the imaging target into an electrical signal corresponding to the amount of light and supplies the electrical signal to a CDS (correlated double sampling) 56. The CDS 56 samples the image signal and supplied to an A/D 60 through an amplifier (AMP) 58. The amplifier (AMP) 58 adjusts a gain of the image signal. The A/D 60 converts the sampled image signal into a digital signal and supplies the digital signal to an image memory 62 which functions as a frame memory. Operations of the CCD 54, CDS 56, and A/D 60 are controlled by timing signals from a signal generator (SG) 68 and a timing generator (TG) 66 and reading and writing of data from and to the image memory 62 are controlled by a memory controller 70. Operations of the timing generator 66 and the memory controller 70 are controlled by a control signal from a CPU 72. The CPU 72 supplies a control signal to each unit based on a manipulation signal from a manipulation unit 92 and a temperature signal from a temperature sensor 64 which detects a temperature of the CCD 54. The image memory 62 supplies the image data to a defect detection circuit 74, a defect correction circuit 76, and a defect decode circuit 78 according to a control signal from the memory controller 70. The defect detection circuit 74 detects, from the image data, a defect present in the captured image and supplies the detection result to the CPU 72. When a defect is detected, the CPU 72 stores an address of the defect pixel in a defect memory 80 such as an EEPROM. The defect memory 80 supplies the address data of the defect pixel to the defect decode circuit 78. The defect decode circuit 78 reads defect information in synchronization with the current signal from the image memory 62 based on the address data of the defect pixel and supplies the read information to the defect correction circuit 76. The defect correction circuit 76 corrects the defect using the image data from the image memory 62 and the defect information from the defect decode circuit 78 and supplies the corrected data to an image signal processor circuit 82.

The defect correction circuit 76 according to the first preferred embodiment of the present invention simultaneously applies correction processes regardless of the type of the defects. In other words, instead of using an algorithm such as, for example, the algorithm in which it is determined whether the defect pixel is a G pixel, an R pixel, or a B pixel, the G pixel is first corrected, and then the R pixel and the B pixel are corrected, the defect correction circuit 76 processes the G pixel, R pixel, and B pixel simultaneously, that is, in parallel. The image signal processor circuit 82 applies a white balance process, a gamma correction process, or an edge process to image data in which the point flaw and the vertical flaw are corrected, generates image data for R, G, and B or generates a brightness Y signal, a Cb signal, and a Cr signal from the image data for R, G, and B, and stores the generated data or signal on a recording medium 90 such as a flash memory through a DRAM 84 and a compressing/expanding circuit 86. The image data is compressed in the compressing/expanding circuit 86 and stored in the storage medium 90. The image data read from the recording medium 90 is expanded by the compressing/expanding circuit 86 and is displayed on an LCD 88 through the DRAM 84. The defect correction circuit 76 and the defect decode circuit 78 operate by a control signal, supplied from the CPU 72, corresponding to a shutter button manipulation signal from the manipulation unit 92. Before the shutter button is pressed, image data is sequentially rewritten on the image memory 62, and, when the shutter button is pressed, the defect in the image data at that point is corrected and the image data is stored in the storage medium 90. Alternatively, it is also possible to employ a configuration in which defects of the image data are continuously corrected in the defect correction circuit 76, even when the shutter button is not pressed, in order to correct the defect in an image displayed on the LCD 88.

FIG. 2 shows an arrangement of color filters of the CCD 54. This arrangement is an arrangement which is commonly known as a "Bayer arrangement". An R pixel and a G pixel and a B pixel and the G pixel are alternately placed along the horizontal and vertical directions. Pixels R00, R02, R04, R20, R22, R24, R40, R42, and R44 are R (red) pixels, pixels B11, B13, B15, B31, B33, and B35 are B (blue) pixels, and pixels G01, G03, G05, G10, G12, G14, G21, G23, G25, G30, G32, G34, G41, G43, and G45 are G (green) pixels.

Figure 3:
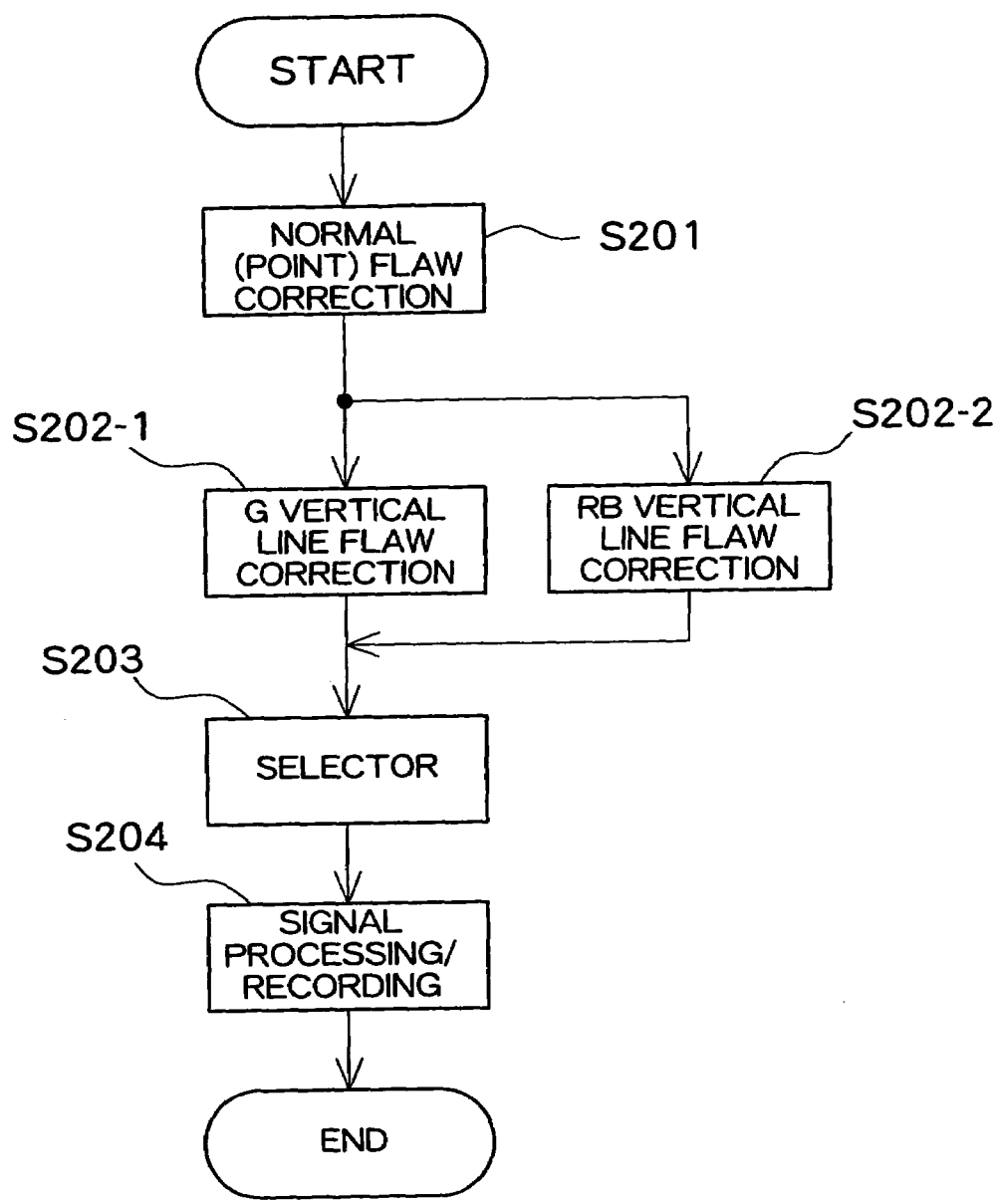
FIG. 3 is a flowchart showing a process according to a first preferred embodiment of the present invention.

FIG. 3 is a flowchart showing the overall process of the first preferred embodiment of the present invention. When a user presses a shutter button, the defect correction circuit 76 corrects a point flaw (S201). Then, the defect correction circuit 76 simultaneously corrects a G vertical line flaw, an R vertical line flaw, and a B vertical line flaw (S202-1 and S202-2). Here, the "simultaneous correction" in this process does not refer to a sequential process in which, for example, the G vertical flaw is first corrected in order to correct the target pixel as described above, but instead refers to an execution of both the correction of the G vertical flaw and the correction of the R and B vertical flaws (in parallel). After the G vertical flaw, R vertical flaw, and B vertical flaw are corrected, the selector switches and an appropriate output is output (S203), and image processes are sequentially applied (S204).

Figure 4:
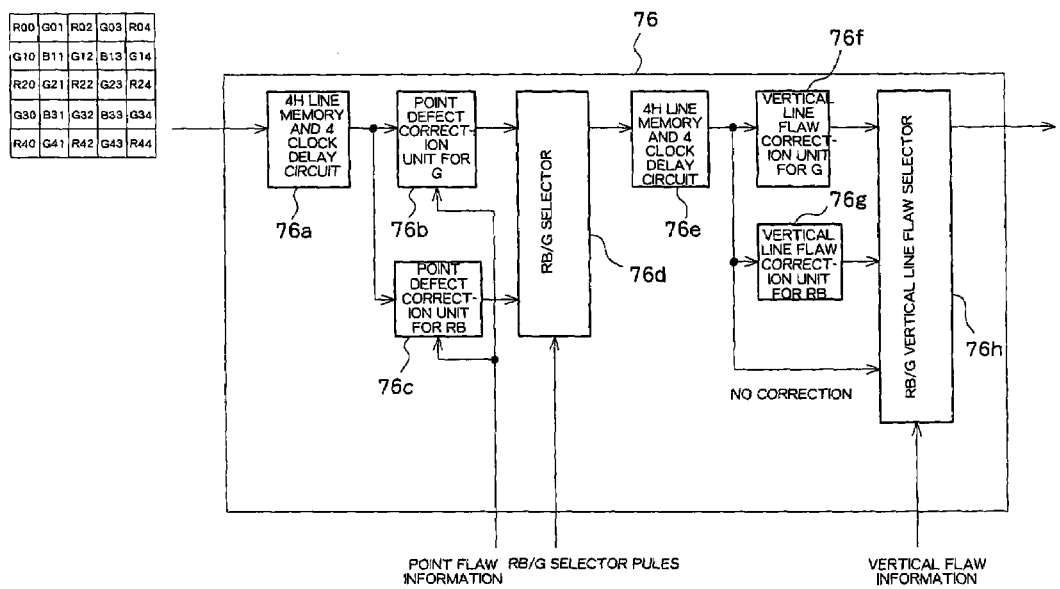
FIG. 4 is a block diagram showing a structure of a defect correction circuit according to the first preferred embodiment of the present invention.

FIG. 4 shows an example structure of the defect correction circuit 76 shown in FIG. 1. The defect correction circuit 76 comprises a point defect correction unit 76b for G which corrects a point flaw in a G pixel, a point defect correction unit 76c for RB which corrects a point flaw in an R pixel and a B pixel, a vertical line flaw correction unit 76f for G which corrects a vertical flaw in the G pixel, and a vertical line flaw correction unit 76g for RB which corrects a vertical flaw in the R pixel B pixel. The point defect correction unit 76b for G and the point defect correction unit 76c for RB are provided in parallel to each other and the vertical line flaw correction unit 76f for G and the vertical line flaw correction unit 76g for RB are provided in parallel to each other.

A 4H line memory and 4 clock delay circuit 76a operate on image data sequentially supplied from the image memory 62 which functions as the frame memory, stores image data for 4H (4 horizontal lines), and delays each horizontal line of 4H by 4 clocks (4 dots). Data of a total of 25 pixels are output from the delay elements of the 4H line memory and 4 clock delay circuit 76a.

Figure 5:
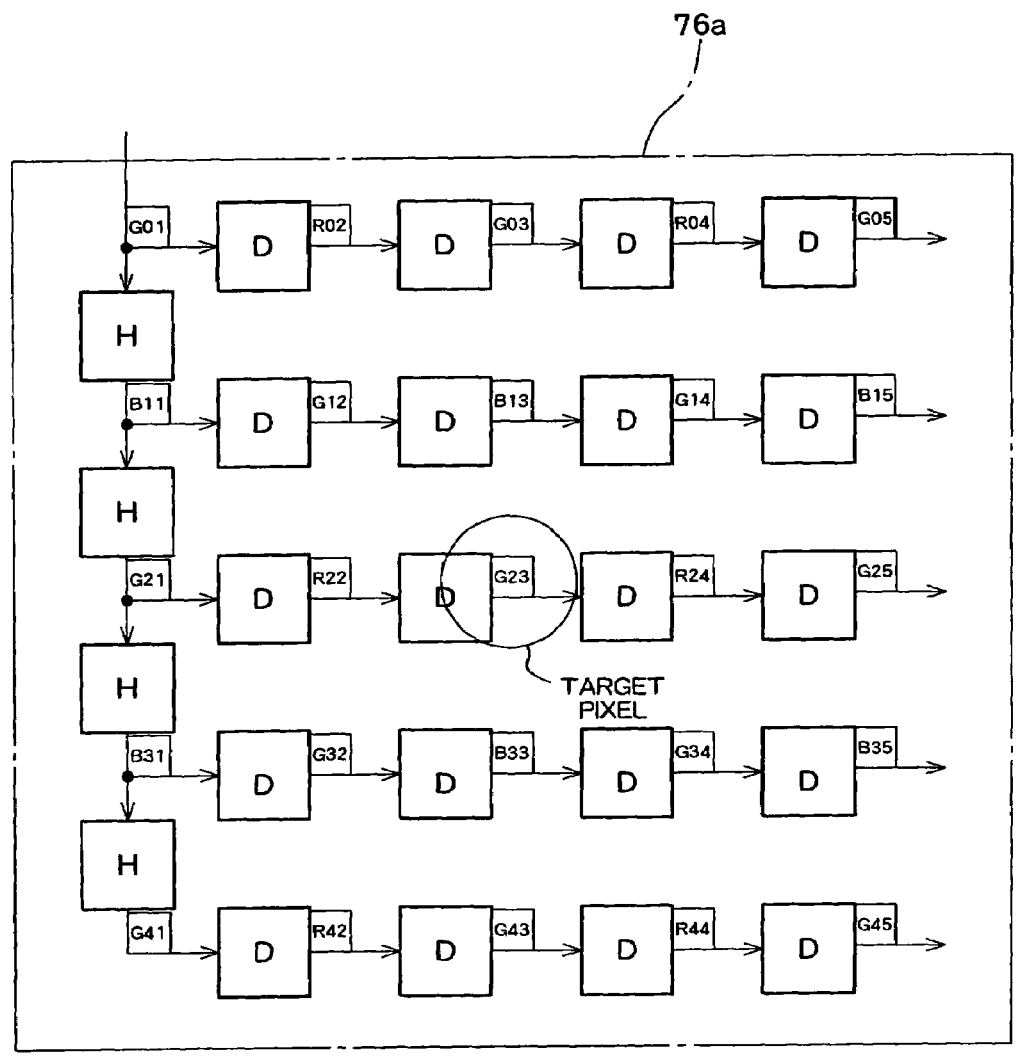
FIG. 5 is a structural diagram showing a 4H line memory and clock delay circuit according to the first preferred embodiment of the present invention.

FIG. 5 shows a structure of the 4H line memory and 4 clock delay circuit 76a and outputs at specific timings. In FIG. 5, "H" indicates a line memory and a "D" indicates a delay element. Looking at the first line, the first line comprises 4 delay elements. G01 is output from an input end of a first element, R02 is output from an output end of the first delay element, G03 is output from an output end of a second delay element, R04 is output from an output end of a third delay element, and G05 is output from an output end of a fourth delay element. Looking at the second line, the second line also comprises 4 delay elements. B11 is output from an input end of a first delay element, G12 is output from an output end of the first delay element, B13 is output from an output end of a second delay element, G14 is output from an output end of a third delay element, and B15 is output from an output end of a fourth delay element. Looking at the third line, G21 is output from an input end of a first delay element, R22 is output from an output end of the first delay element, G23 is output from an output end of a second delay element, R24 is output from an output end of a third delay element, and G25 is output from an output end of a fourth delay element. Looking at the fourth line, B31 is output from an input end of a first delay element, G32 is output from an output end of the first delay element, B33 is output from an output end of a second delay element, G34 is output from an output end of a third delay element, and B35 is output from an output end of a fourth delay element. Looking at the fifth line, G41 is output from an input end of a first delay element, R42 is output from an output end of the first delay element, G43 is output from an output end of a second delay element, R44 is output from an output end of a third delay element, and G45 is output from an output end of a fourth delay element. A pixel at the center of these 25 pixels, pixel G23 output from the output end of the second delay element of the third line, is the pixel to be processed and corrected.

In FIG. 5, the pixel G23 is shown as a "target pixel". The 4H line memory and 4 clock delay circuit 76a generates data for a total of 25 pixels of G01~G45 and supplies the data to the point defect correction unit 76b for G.

Figure 6:
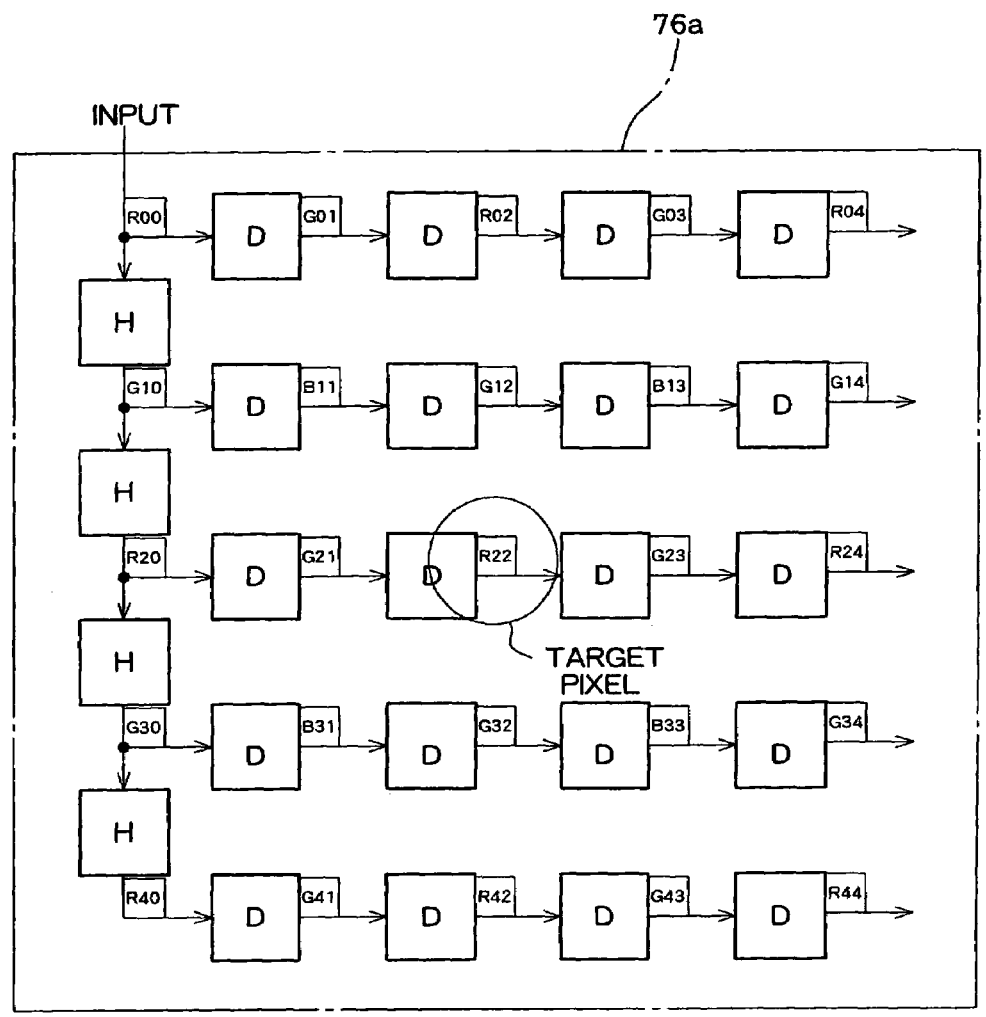
FIG. 6 is a structural diagram showing a 4H line memory and clock delay circuit according to the first preferred embodiment of the present invention.

FIG. 6 shows an output of the 4H line memory and 4 clock delay circuit 76a at another timing. Looking at a first line, R00 is output from an input end of a first delay element, G01 is output from an output end of the first delay element, R02 is output from an output end of a second delay element, G03 is output from an output end of a third delay element, and R04 is output from an output end of a fourth delay element. Looking at a second line, G10 is output from an input end of a first delay element, B11 is output from an output end of the first delay element, G12 is output from an output end of a second delay element, B13 is output from an output end of a third delay element, and G14 is output from an output end of a fourth delay element. Looking at a third line, R20 is output from an input end of a first delay element, G21 is output from an output end of the first delay element, R22 is output from an output end of a second delay element, G23 is output from an output end of a third delay element, and R24 is output from an output end of a fourth delay element. Looking at a fourth line, G30 is output from an input end of a first delay element, B31 is output from an output end of the first delay element, G32 is output from an output end of a second delay element, B33 is output from an output end of a third delay element, and G34 is output from an output end of a fourth delay element. Looking at a fifth line, R40 is output from an input end of a first delay element, G41 is output from an output end of the first delay element, R42 is output from an output end of a second delay element, G43 is output from an output end of a third delay element, and R44 is output from an output end of a fourth delay element. The pixel R22 at the center is the pixel to be processed and the pixel to be corrected. The 4H line memory and 4 clock delay circuit 76a generates data for a total of 25 pixels of R00~R44 and supplies the data to the point defect correction unit 76b for RB.

Figure 50:
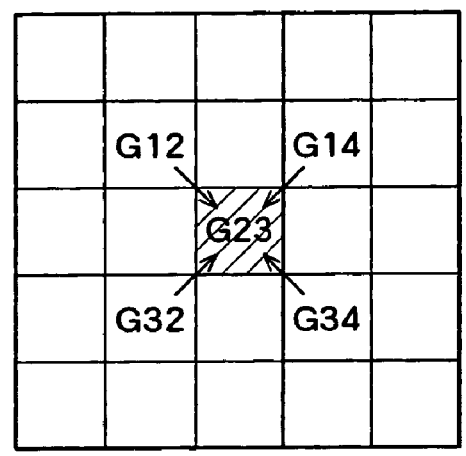
FIG. 50 is an explanatory diagram showing a correction of a point flaw for G according to a related art.

The point defect correction unit 76b for G corrects the point flaw in a manner similar to the related art using the pixel data of 25 pixels. That is, as shown in FIG. 50, the point defect correction unit 76b for G uses the data of the pixels G12, G14, G32, and G34 present around the pixel G23 to be corrected and interpolates G23 by:

$$G23=(G12+G14+G32+G34)/4$$

The determination that there is a point flaw in the pixel G23 is based on the defect information from the defect decode circuit 78. The point defect correction unit 76b for G determines that there is a defect in the address of the pixel G23 and that the defect is a point flaw based on the point flaw information from the defect decode circuit 78, and, thus, does not use the image data of G23, interpolates the pixel data of G23 based on the above-described formula, and outputs the interpolation value as the image data for the pixel G23.

Figure 51:
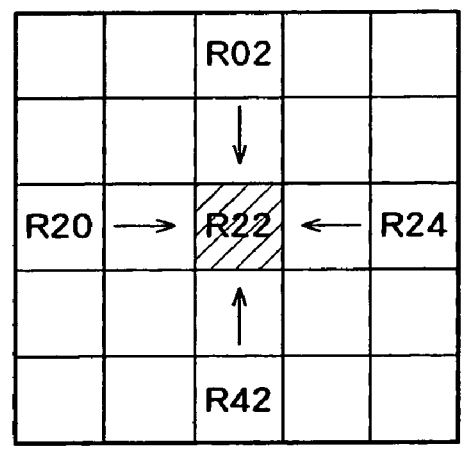
FIG. 51 is an explanatory diagram showing a correction of a point flaw for RB according to a related art.

Similarly, the point defect correction unit 76c for RB corrects the point flaw in a manner similar to the related art using the pixel data for the 25 pixels. That is, as shown in FIG. 51, the point defect correction unit 76c for RB interpolates the pixel value of the pixel R22 using the data of the pixels R20, R02, R24, and R42 which are present around the pixel R22 to be corrected and calculating:

$$R22=(R02+R42+R20+R24)/4$$

The B pixel is corrected in a similar manner. Returning to FIG. 4, after the point defect correction unit 76b for G and the point defect correction unit 76c for RB correct the point flaws as described above, the corrected data is output to an RB/G selector.

The RB/G selector 76d switches the output according to a selector pulse from the CPU 72 for identifying RB/G and again outputs image data in a sequential manner.

Similar to the 4H line memory and 4 clock delay circuit 76a, a 4H line memory and 4 clock delay circuit 76e outputs image data for 25 pixels from sequential image data and supplies the output image data to the vertical line flaw correction unit 76f for G and the vertical line flaw correction unit 76g for RB. In consideration of cases in which there is no vertical line flaw, the image data is not output to these correction units and is also supplied directly to an RB/G vertical line flaw selector 76h.

Figure 7:
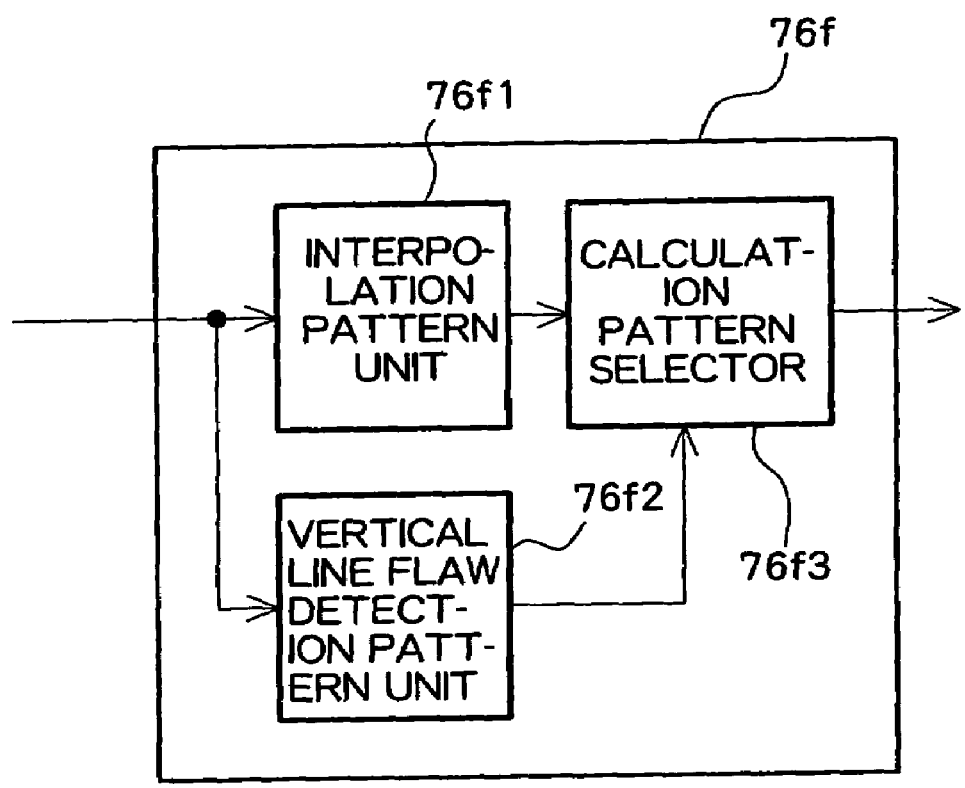
FIG. 7 is a block diagram showing a structure of a vertical line flaw correction unit for G according to the first preferred embodiment of the present invention.
Figure 53:
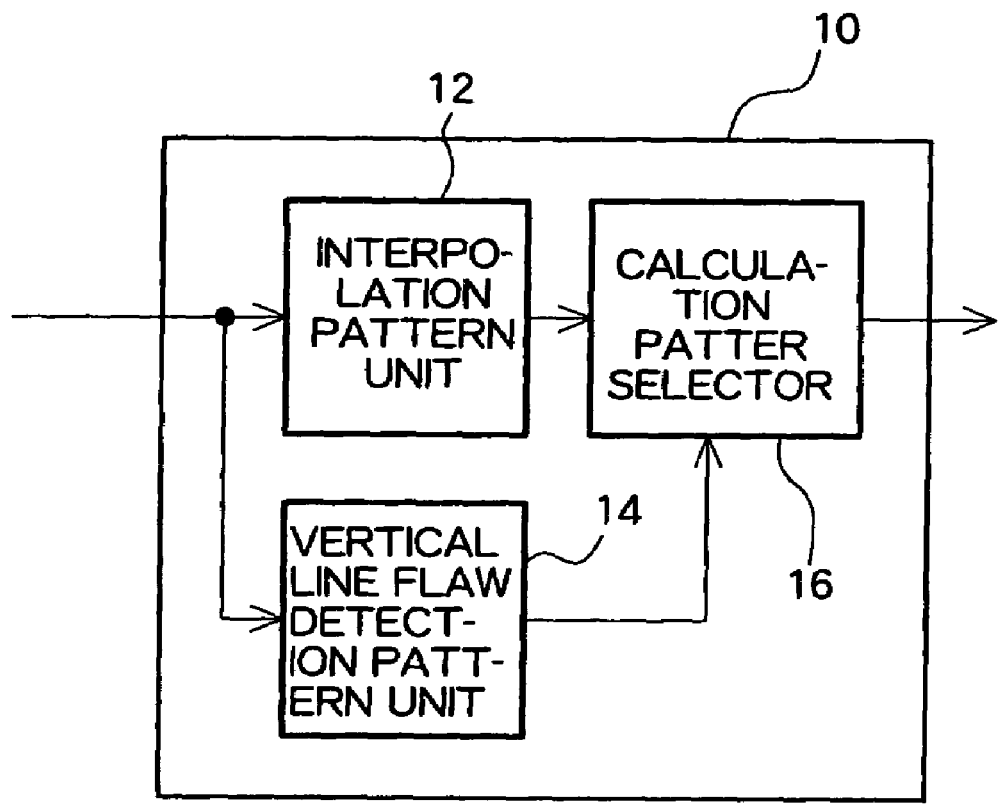
FIG. 53 is a block diagram showing a structure of a vertical line flaw correction unit for G in a device according to a related art.

FIG. 7 shows a structure of the vertical line flaw correction unit 76f for G shown in FIG. 4. Similar to the correction unit 10 shown in FIG. 53, the vertical line flaw correction unit 76f for G comprises an interpolation pattern unit 76f1, a vertical line flaw detection pattern unit 76f2, and a calculation pattern selector 76f3. The functions of these units are also similar to the functions of the units in the correction unit 10 except that the pattern of the difference calculation in the vertical line flaw detection pattern unit 76f2 differs from the corresponding function.

Figure 8:
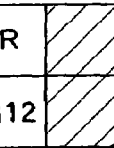
FIG. 8 is an explanatory diagram showing a calculation at the vertical line flaw detection pattern unit for G according to the first preferred embodiment of the present invention.
Figure 8:
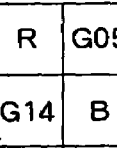
Figure 8:
Figure 8:
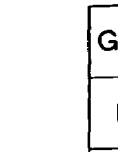

FIG. 8 shows a difference calculation at the vertical line flaw detection pattern unit 76f2. This calculation corresponds to the difference calculation pattern of the related art shown in FIG. 54. The difference calculations of FIGS. 8(a), 8(b), and 8(d) are identical to the difference calculations of FIGS. 54(a), 54(b), and 54(d), respectively, but the difference calculation of FIG. 8(c), that is, the calculation of G(Hor) differs from the difference calculation of FIG. 54(c). The vertical line flaw detection pattern unit 76f2 calculates, as the difference calculation G(Hor):

$$G(Hor)=ABS(G12+G32-G14-G34)$$

This calculation is performed using horizontal pixels G12 and G14 positioned above the pixel G23 and the horizontal pixels G32 and G34 positioned below the pixel G23. The pixels G12, G14, G32, and G34 are pixels which are adjacent in a vertical line including the pixel G23, and thus, if a point flaw is present adjacent to the vertical flaw, these pixels may be affected by the point flaw.

Figure 9:
FIG. 9 is an explanatory diagram showing an interpolation pattern in an interpolation pattern unit for G according to the first preferred embodiment of the present invention.

FIG. 9 shows a calculation at the interpolation pattern unit 76f1 of FIG. 7. The interpolation pattern corresponds to the interpolation pattern of the related art shown in FIG. 55 and is identical to the interpolation pattern of FIG. 55.

Figure 59:
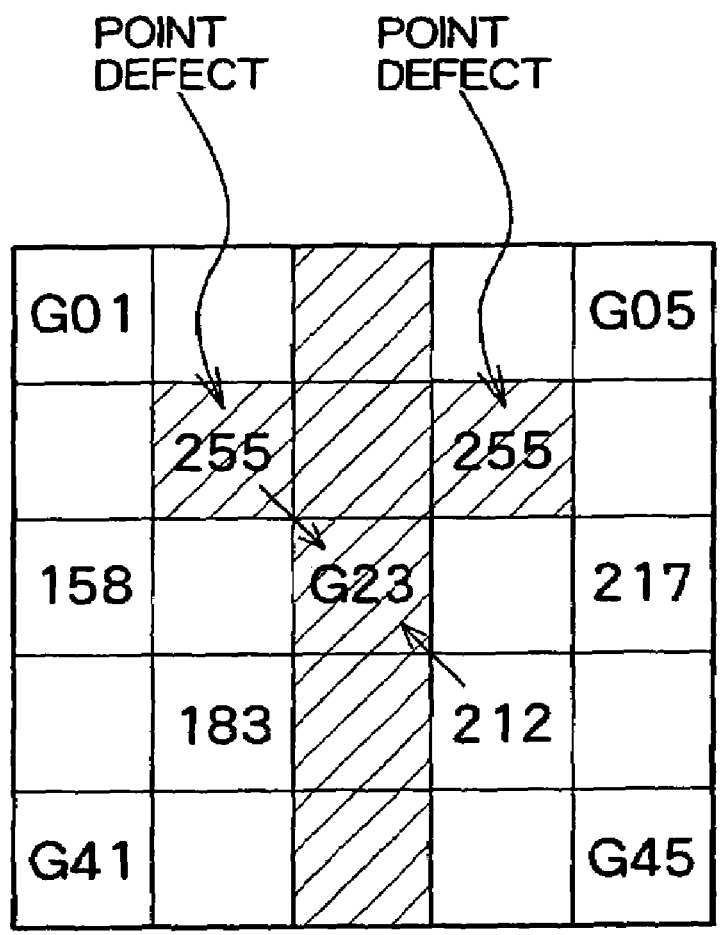
FIG. 59 is an explanatory diagram showing a case in which a point flaw is present adjacent to a vertical flaw.

As described, although the interpolation pattern at the interpolation pattern unit 76f1 is identical to that of the related art, the difference calculation of G(Hor) in the vertical line flaw detection pattern unit 76f2 differs from that in the related art. Therefore, even if there is a vertical line flaw in the pixel G23 and there is a point flaw adjacent to the vertical line flaw, the difference value of G(Hor) differs from that of the related art, and, therefore, a different interpolation pattern is selected, even when a selection algorithm identical to that in the related art is used. More specifically, when there is a point flaw in the pixels G12 and G14 adjacent to the vertical flaw as shown in FIG. 59, the difference calculations of the first preferred embodiment of the present invention yields:

$$G(Sla)=72;$$

$$G(Bac)=43;$$

$$G(Hor)=29; \text{ and}$$

$$G(ver)=115$$

Thus, the value of G(Hor) is smaller than the value in the related art which is 59. Therefore, in the algorithm for comparing the magnitudes of the difference calculation values, the condition of G(Hor)<G(Sla) and G(Hor)<G(Bac) is satisfied and one of the interpolation patterns of FIGS. 9(a) and 9(b) is selected according to a relationship in magnitude between G(Ver) and a threshold value. For example, when 115>threshold value in relation to the threshold value, the interpolation pattern of FIG. 9(b) is selected. The interpolation pattern of FIG. 9(b) is an interpolation pattern which does not use the pixels G12 and G14 in which the point flaw occurs, and, thus, the vertical flaw can be corrected without being affected by the point flaw.

Figure 10:
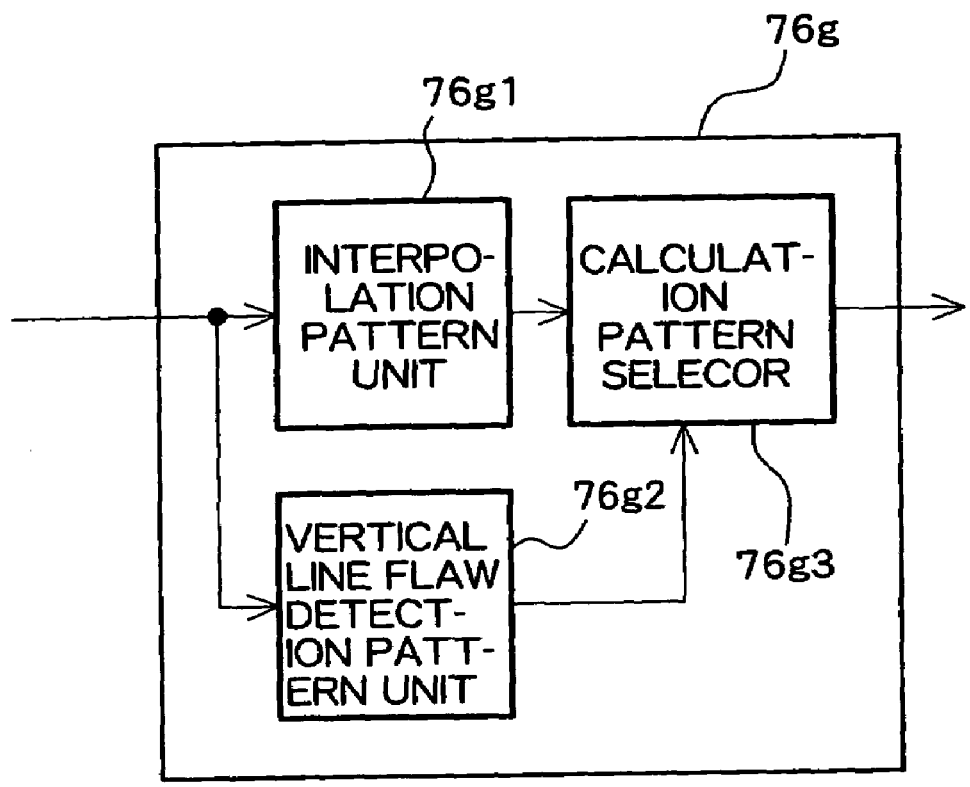
FIG. 10 is a block diagram showing a structure of a vertical line flaw correction unit for RB according to the first preferred embodiment of the present invention.
Figure 56:
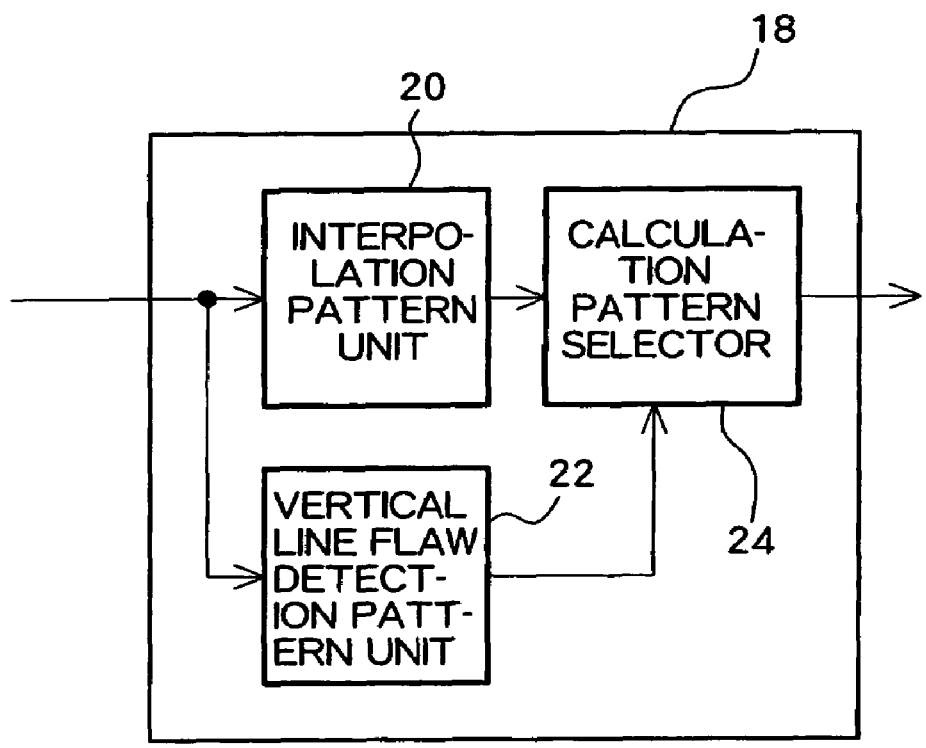
FIG. 56 is a block diagram showing a structure of a vertical line flaw correction unit for RB in a device according to a related art.

FIG. 10 shows a structure of the vertical line flaw correction unit 76g for RB in FIG. 4. The vertical line flaw correction unit 76g for RB corresponds to the correction unit 18 of the related art shown in FIG. 56. The functions of the interpolation pattern unit 76g1, vertical line flaw detection pattern unit 76g2, and calculation pattern selector 76g3 are similar to those of the corresponding units shown in FIG. 56.

Figures 11A, 11B, 11C:
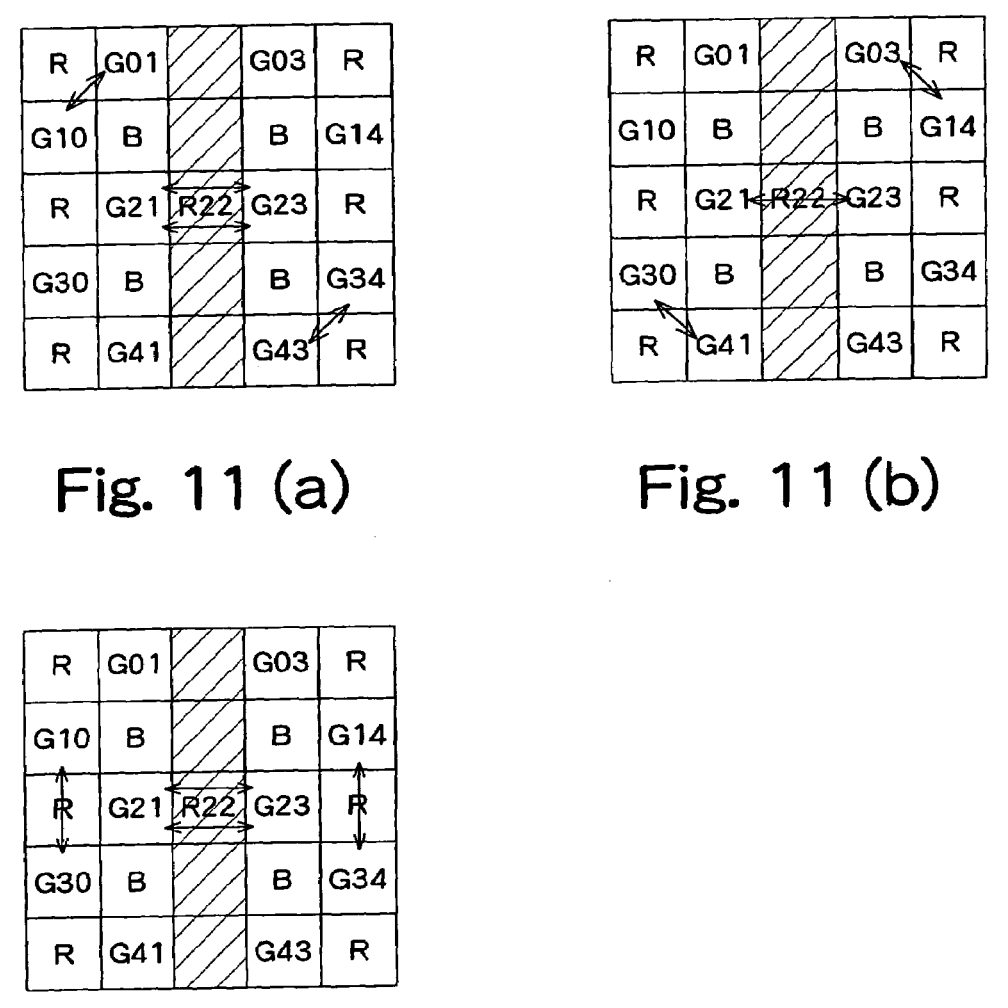
Figures 57A, 57B, 57C:
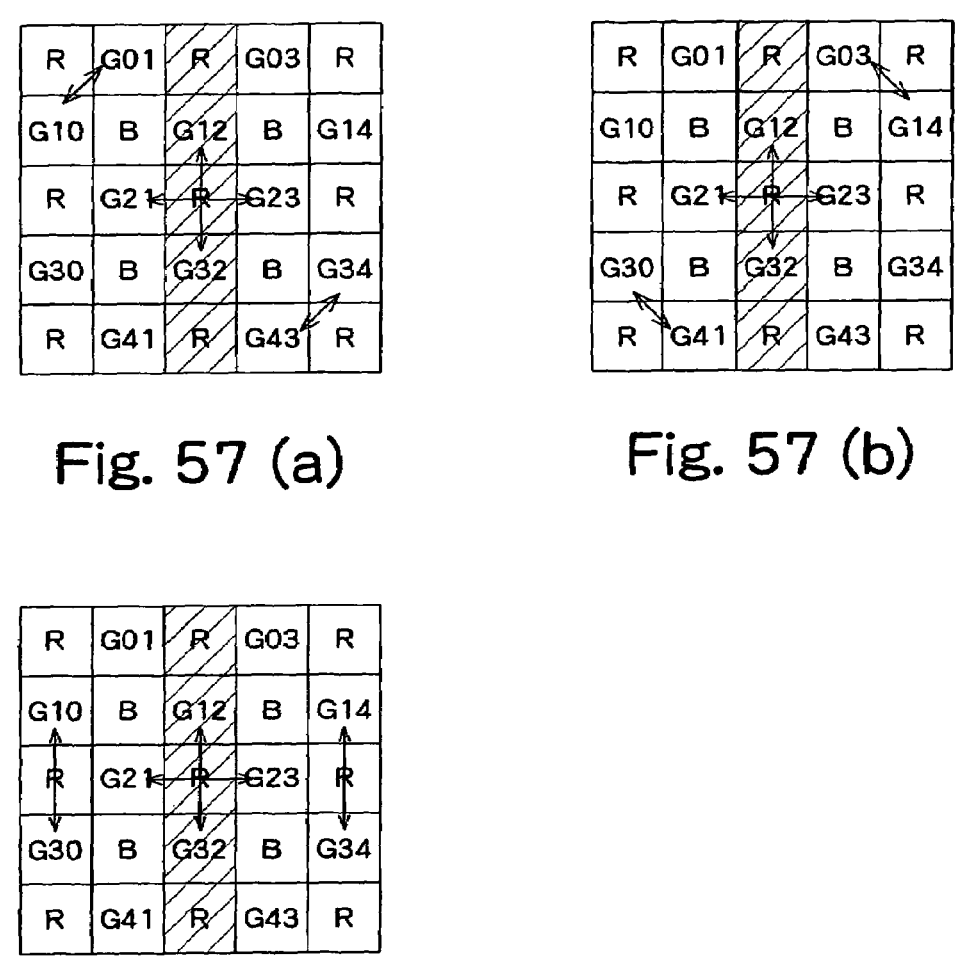

FIG. 11 shows a difference calculation pattern at the vertical line flaw detection pattern unit 76g2 shown in FIG. 10. The difference calculation pattern corresponds to the difference calculation of the related art shown in FIG. 57. All of the difference calculations of G'(Sla), G'(Bac), and G'(Hor) differ from those of the related art. Specifically, FIG. 11(a) shows a difference calculation in the Sla direction and:

$$G'(Sla)=(G21*2+G23*2-G01-G10-G34-G43)/2$$

FIG. 11(b) shows a difference calculation in the Bac direction and:

$$G'(Bac)=(G21*2+G23*2-G03-G04-G30-G40)/2$$

FIG. 11(c) shows a difference calculation in the Hor direction and:

$$G'(Hor)=(G21*2+G23*2-G10-G30-G14-G34)/2$$

All of the above difference calculations differ from the difference calculations in the related art in that the pixels G12 and G32 are not used, while the pixels G21 and G23 repeatedly are used in the calculation.

Figures 58A, 58B, 58C:
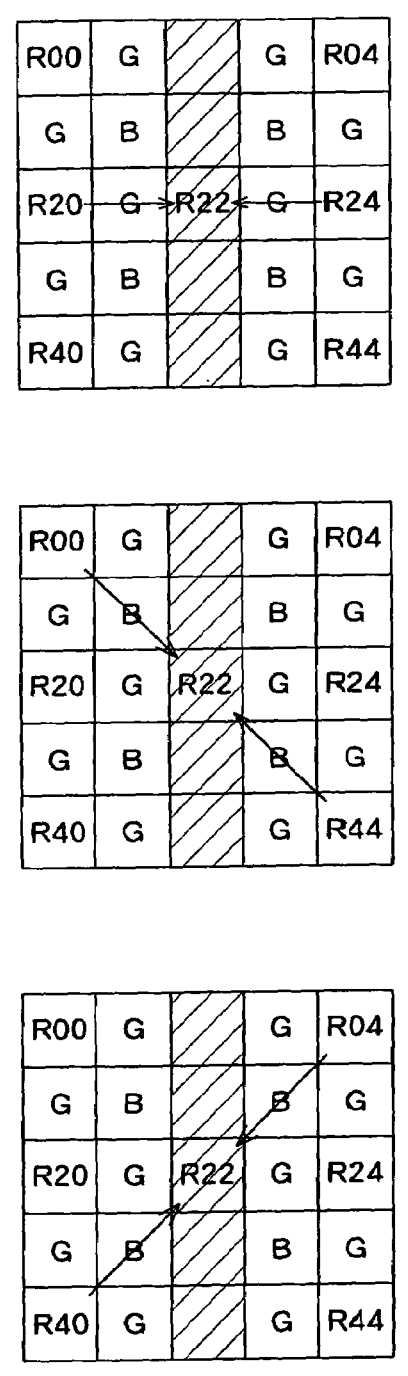

FIG. 12 shows an interpolation pattern at the interpolation pattern unit 76g1 of FIG. 10. The interpolation pattern of FIG. 12 is identical to the interpolation pattern of the related art shown in FIG. 58.

Although the interpolation pattern at the interpolation pattern unit 76g1 is identical to the interpolation pattern of the related art as described, the difference calculation at the vertical line flaw detection pattern unit 76g2 differs from that of the related art. Therefore, even when a selection algorithm identical to the related art is used, an interpolation pattern different from that of the related art is selected. More specifically, because the pixels G12 and G32 are not used for the difference calculation, the interpolation pattern can be selected without being affected by the vertical flaw. The selection algorithm first determines whether or not ABS(G'(Hor))<ABS(G'(Sla)) and ABS(G'(Hor))<ABS(G'(Bac)). When the difference in the horizontal direction is small and the condition is satisfied, the interpolation pattern of FIG. 12(a) is selected. When, on the other hand, this condition is not satisfied, the selection algorithm then determines whether or not ABS(G'(Sla))<ABS(G'(Bac)). When the difference in Sla is small and the condition is satisfied, the interpolation pattern of FIG. 12(b) is selected. On contrary, when the condition is not satisfied, the interpolation pattern of FIG. 12(c) is selected.

In this manner, the vertical line flaw correction unit 76f for G and the vertical line flaw correction unit 76g for RB correct the vertical flaw and supply the corrected data to the selector 76h. The selector 76h switches between the data and outputs data according to the defect information from the defect decode circuit 78. In other words, corrected image data is output at the address in which the vertical flaw is present and uncorrected image data is output at the address in which the vertical flaw is absent.

In the above description of the first preferred embodiment of the present invention, a configuration is described in which the vertical line flaw in G and the vertical line flaw in RB are simultaneously corrected. In the second preferred embodiment of the present invention, a configuration is described in which a horizontal flaw is simultaneously corrected in addition to the vertical flaw.

Figure 13:
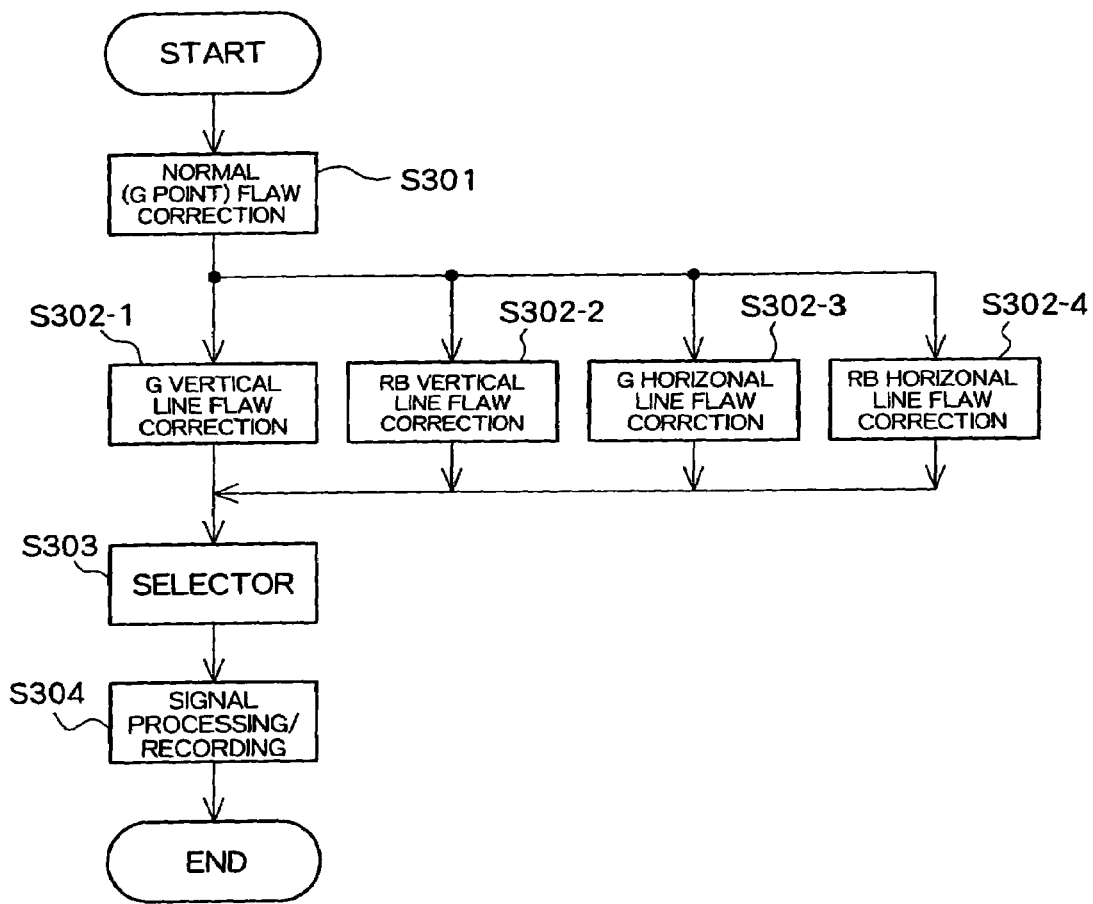
FIG. 13 is a flowchart showing a process according to a second preferred embodiment of the present invention.

FIG. 13 is a flowchart showing a process according to the second preferred embodiment of the present invention. First, the point flaw is corrected (S301). Then, correction of the vertical line flaw in G (S302-1), correction of the vertical line flaw in RB (S302-2), correction of a horizontal line flaw in G (S302-3), and correction of a horizontal line flaw in RB (S302-4) are simultaneously performed, that is, performed in parallel. After the flaws are corrected, the output is switched by a selector and data is output (S303). Signal processes are applied, and the data is recorded on a recording medium 90 (S304).

Figure 14:
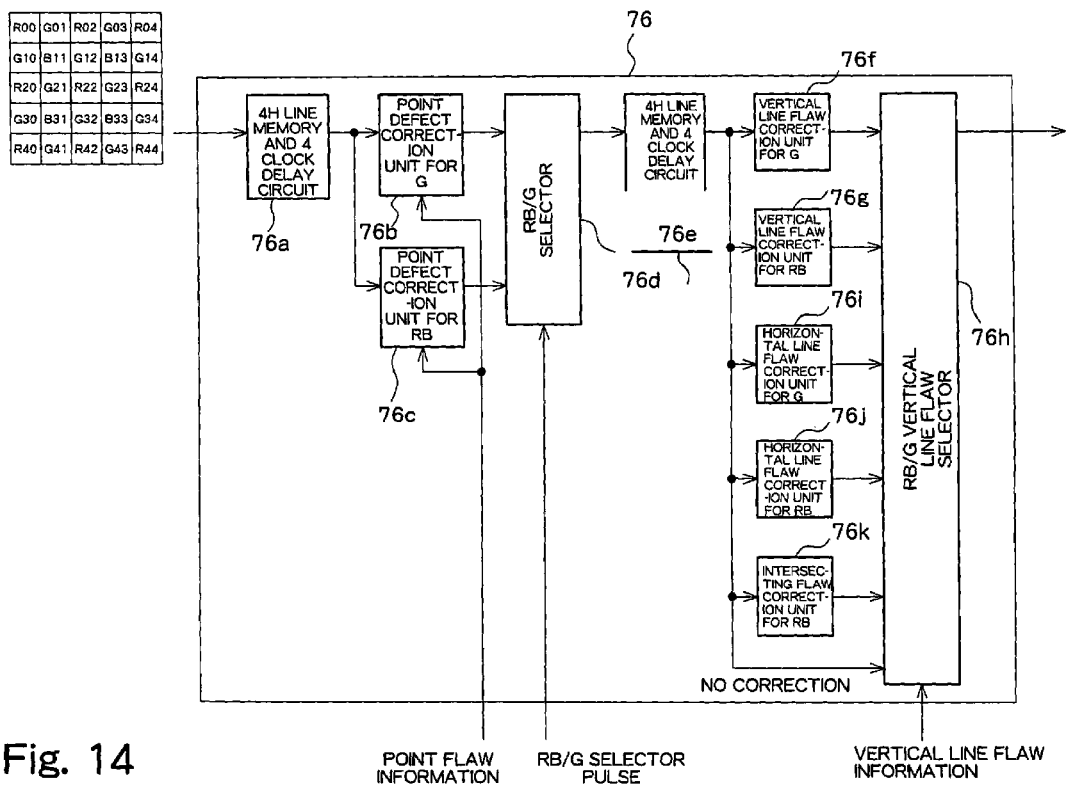
FIG. 14 is a block diagram showing a structure of a defect correction circuit according to the second preferred embodiment of the present invention.

FIG. 14 shows a structure of a defect correction circuit 76 according to the second preferred embodiment of the present invention. The defect correction circuit 76 comprises a horizontal line flaw correction unit 76i for G, a horizontal line flaw correction unit 76j for RB, and an intersecting flaw correction unit 76k for RB, in addition to the components shown in FIG. 4. The additional structures (vertical line flaw correction unit 76f for G~the intersecting flaw correction unit 76k for RB) are provided in parallel to each other.

Figure 15:
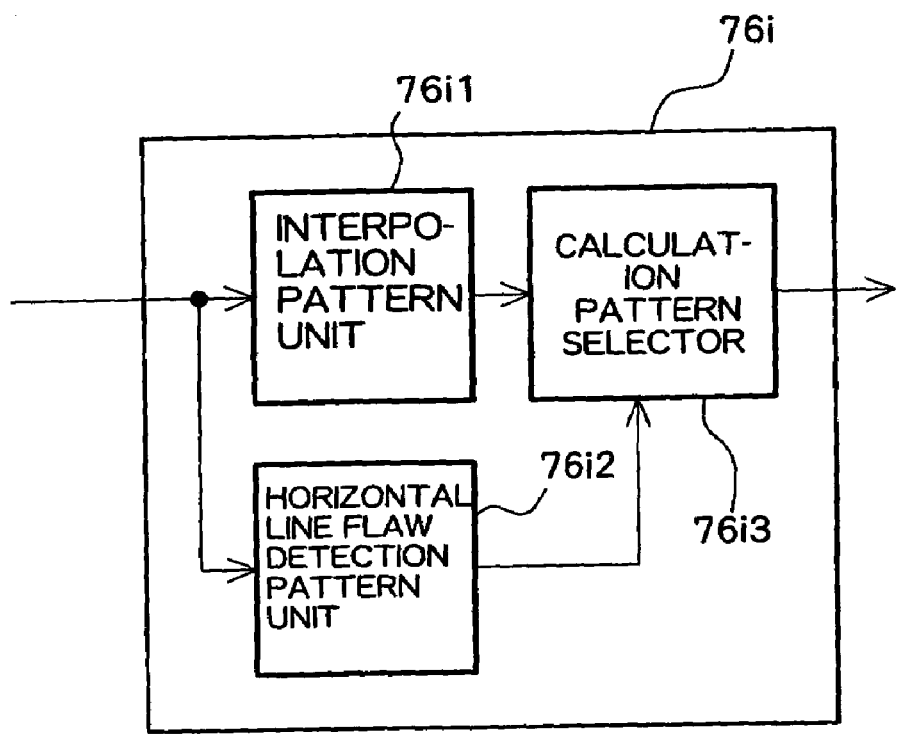
FIG. 15 is a block diagram showing a structure of a horizontal line flaw correction unit for G according to the second preferred embodiment of the present invention.

FIG. 15 shows a structure of the horizontal line flaw correction unit 76i for G in FIG. 14. An interpolation pattern unit 76i1 performs calculation of a predetermined interpolation pattern and supplies an interpolation value to a calculation pattern selector 76i3. A horizontal line flaw detection pattern unit 76i2 performs a difference calculation and supplies a difference value to a calculation pattern selector 76i3. The calculation pattern selector 76i3 compares the magnitudes of the difference values and selects and outputs one of the interpolation values based on the comparison result.

Figures 16A, 16B, 16C, 16D:
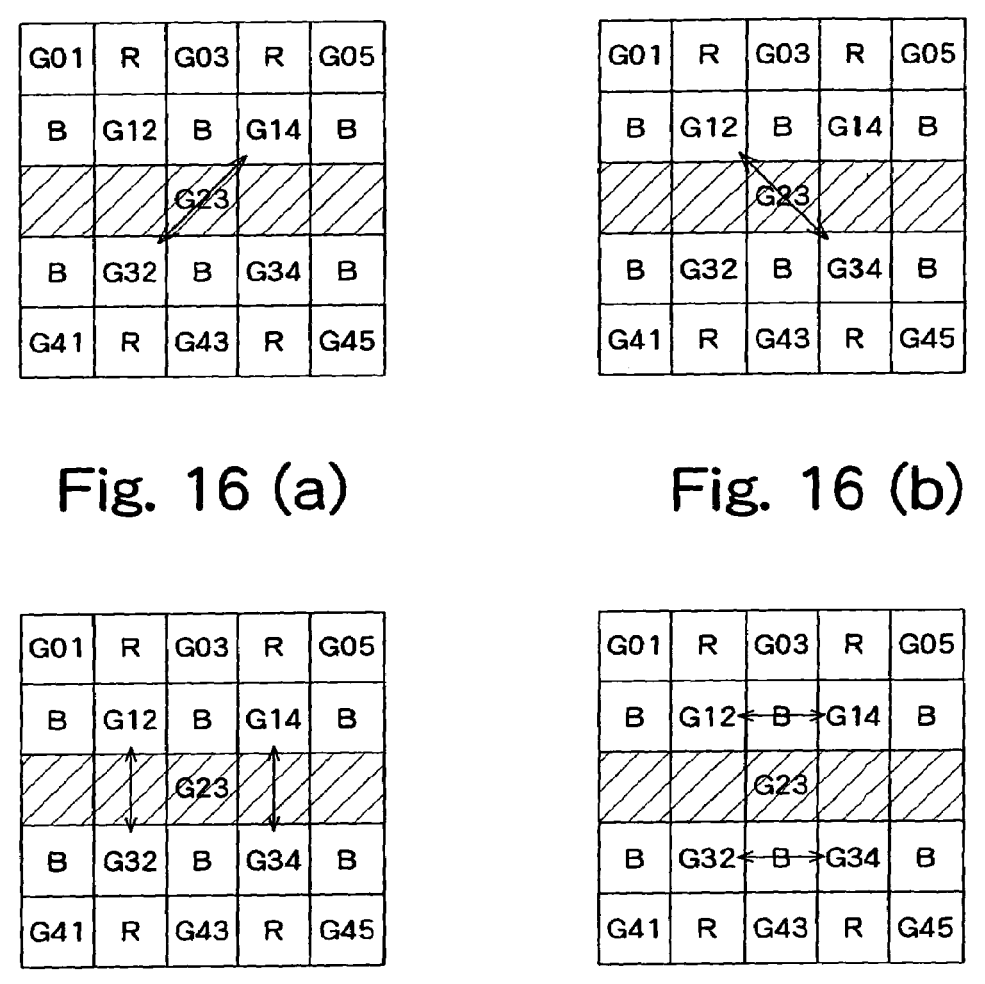

FIG. 16 shows a difference calculation at the horizontal line flaw detection pattern unit 76i2. FIG. 16(a) shows a difference calculation in the Sla direction and the following is calculated using pixels G14 and G23 adjacent to the pixel G23 which is the pixel to be corrected:

$$G(Sla)=ABS(G14-G32)$$

FIG. 16(b) shows a difference calculation in the Bac direction, wherein the following is calculated using pixels G12 and G34:

$$G(Bac)=ABS(G12-G34)$$

FIG. 16(c) shows a difference calculation in the Ver direction wherein the following is calculated using pixels G12, G14, G32, and G34:

$$G(Ver)=ABS(G12+G14-G32-G34)$$

FIG. 16(d) is a difference calculation in the Hor direction wherein the following is calculated using the pixels G12, G14, G32, and G34:

$$G(Hor)=ABS(G12+G32-G14-G34)$$

Normally, the difference value in the Ver direction is calculated as:

$$G(Ver)=ABS(G03-G43)$$

It should be noted that, in the second preferred embodiment of the present invention, this calculation is not used and the difference calculation is performed using the pixels G12, G14, G32, and G34. The calculation of G(Ver) in the second preferred embodiment of the present invention corresponds to G(Hor) of the first preferred embodiment of the present invention and considers a case in which a point flaw is present adjacent to the horizontal flaw. The difference calculation of FIG. 16 is identical to that of FIG. 8 showing a difference calculation in the case of the vertical flaw. FIG. 16(c) corresponds to FIG. 8(d) and FIG. 16(d) corresponds to FIG. 8(c).

FIG. 17 shows an interpolation pattern at the interpolation pattern unit 76i1 of FIG. 15. FIG. 17(a) shows an interpolation pattern which interpolates the pixel value of the pixel G23 which is the pixel to be corrected, using four pixels including pixels G12, G14, G32, and G34 that are adjacent to the pixel G23 to be corrected, using:

$$G23=(G12+G14+G32+G34)/4$$

FIG. 17(b) shows an interpolation pattern which interpolates the pixel value of the pixel G23 using pixels G03 and G43, by:

$$G23=(G03+G43)/2$$

FIG. 17(c) shows an interpolation pattern which interpolates the pixel value of the pixel G23 using the pixels G14 and G32, by:

$$G23=(G14+G32)/2$$

FIG. 17(d) shows an interpolation pattern which interpolates the pixel value of the pixel G23 using the pixels G12 and G34, by:

$$G23=(G12+G34)/2$$

The calculation pattern selector 76i3 compares the magnitudes of the four difference values shown in FIG. 16 and first determines whether or not G(Ver)<G(Sla) and whether or not G(Ver)<G(Bac). When the difference value G(Ver) in the vertical direction is small and the condition is satisfied, the calculation pattern selector 76i3 determines whether or not G(Hor)<threshold value. When the difference value G(Hor) in the horizontal direction is small and is smaller than the threshold value, the interpolation pattern of FIG. 17(a) is selected, and, when the condition is not satisfied, the interpolation pattern of FIG. 17(b) is selected. When, on the other hand, G(Ver) is large, the calculation pattern selector 76i3 determines whether or not G(Sla)<G(Bac). The interpolation pattern of FIG. 17(c) is selected when this condition is satisfied and the interpolation pattern of FIG. 17(d) is selected otherwise.

With such a selection algorithm, when a point flaw is present in, for example, the pixels G12 and G14 adjacent to the horizontal flaw, the value of G(Ver) is small, and thus, a possibility that the interpolation pattern of FIG. 17(b) is selected is increased, resulting in inhibition of a situation in which the pixel value is corrected using a pixel in which a point flaw is present.

Figure 18:
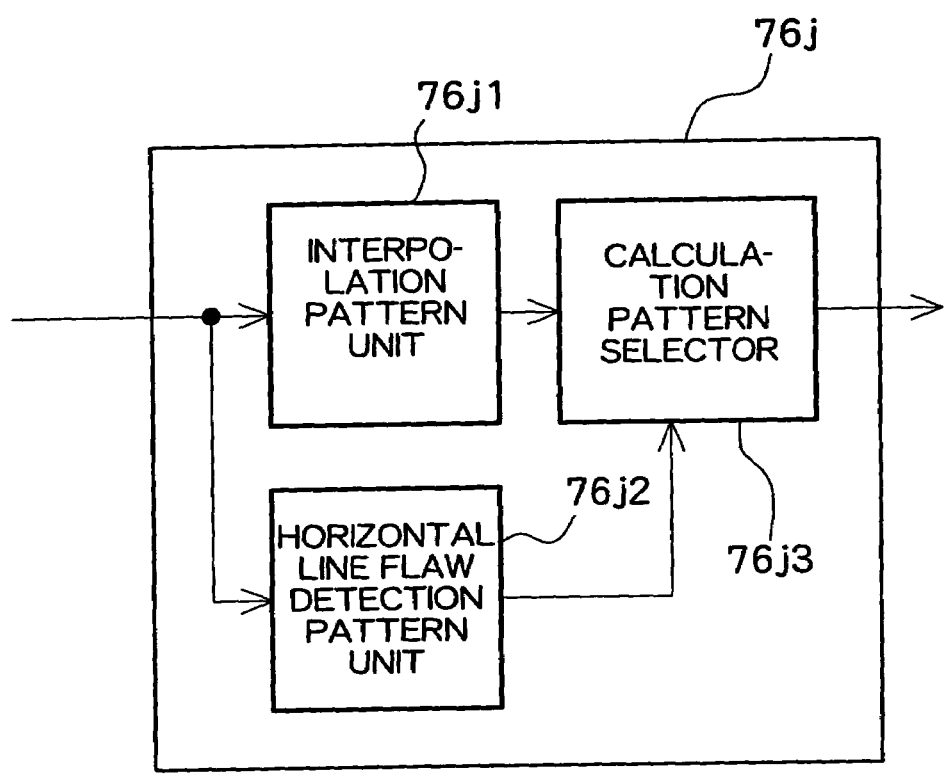
FIG. 18 is a block diagram showing a structure of a horizontal flaw correction unit for RB according to the second preferred embodiment of the present invention.

FIG. 18 shows a structure of the horizontal line flaw correction unit 76*j* for RB in FIG. 14. The horizontal line flaw correction unit 76*j* for RB comprises an interpolation pattern unit 76*j*1, a horizontal line flaw detection pattern unit 76*j*2, and a calculation pattern selector 76*j*3.

Figures 19A, 19B, 19C:
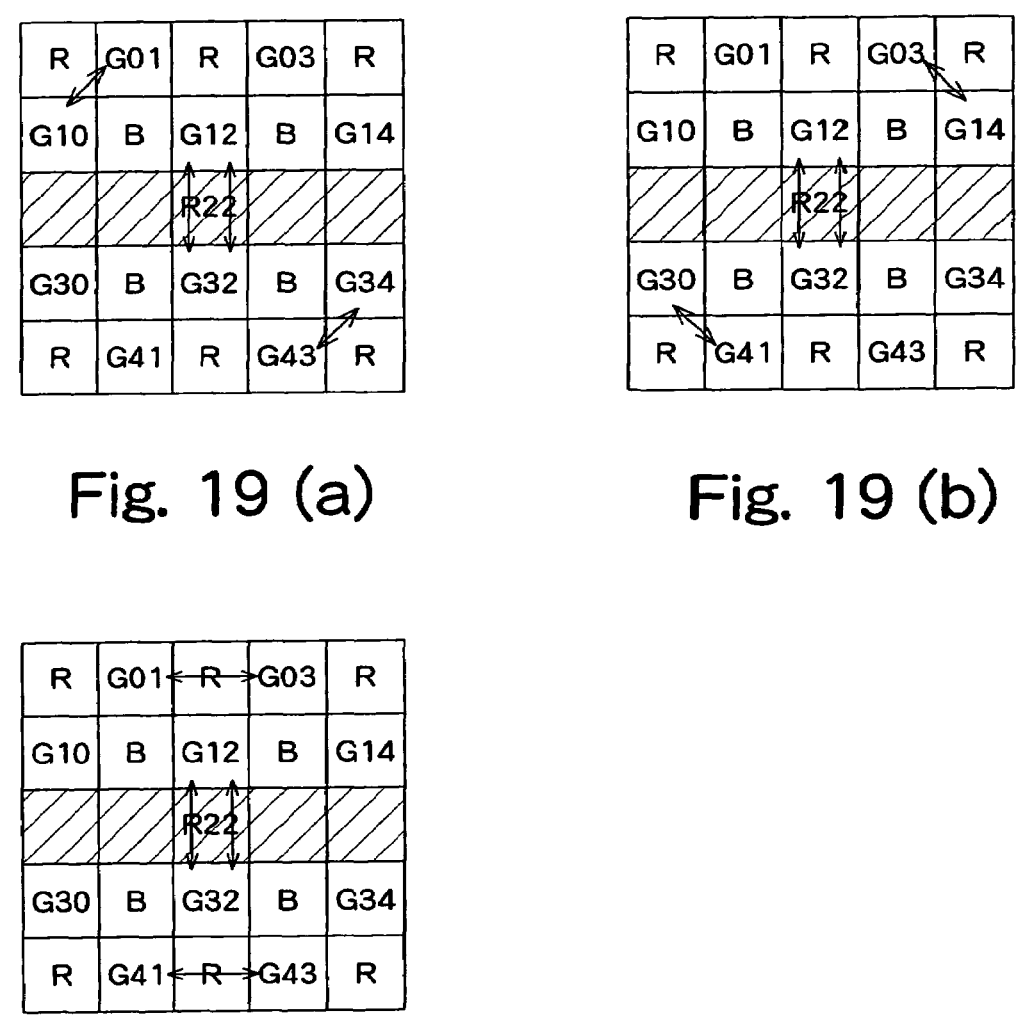

FIG. 19 shows a difference calculation pattern in the horizontal flaw detection pattern unit 76*j*2 of FIG. 18. Unlike in the case of the vertical flaw shown in FIG. 11, pixels G12 and G32 which are adjacent to the target pixel above and below the target pixel are used. FIG. 19(*a*) shows a difference calculation in the Sla direction and:

$$G'(Sla)=(G12*2+G32*2-G01-G10-G34-G43)/2$$

FIG. 19(*b*) shows a difference calculation in the Bac direction and:

$$G'(Bac)=(G12*2+G32*2-G03-G14-G30-G41)/2$$

FIG. 19(*c*) shows a difference calculation in the Hor direction and:

$$G'(Hor)=(G12*2+G32*2-G01-G03-G41-G43)/2$$

FIG. 20 shows an interpolation pattern at the interpolation pattern unit 76*j*1 of FIG. 18. FIG. 20(*a*) shows an interpolation using upper and lower pixels R02 and R42, which interpolates the pixel value of the target pixel R22 by:

$$R22=(R02+R42+G'(Hor))/2$$

FIG. 20(*b*) shows an interpolation using pixels R00 and R44, which interpolates the pixel value of the target pixel R22 by:

$$R22=(R00+R44+G'(Sla))/2$$

FIG. 20(*c*) shows an interpolation using pixels R04 and R40, which interpolates the pixel value of the target pixel R22 by:

$$R22=(R04+R40+G'(Bac))/2$$

The calculation pattern selector 76*j*3 compares magnitudes of the difference values and selects one of the interpolation values based on the comparison result. More specifically, the calculation pattern selector 76*j*3 first determines whether or not ABS(G'(Ver))<ABS(G'(Sla)) and ABS(G'(Ver))<ABS (G'Bac)). When the difference in the vertical direction is small and the condition is satisfied, the interpolation pattern of FIG. 20(*a*) is selected. When, on the other hand, the difference in the vertical direction is large and the condition is not satisfied, the calculation pattern selector 76*j*3 determines whether or not ABS(G'(Sla))<ABS(G'(Bac)). When the difference value of Sla is small and the condition is satisfied, the interpolation pattern of FIG. 20(*b*) is selected. When, on the other hand, the condition is not satisfied, the interpolation pattern of FIG. 20(*c*) is selected.

Figure 21:
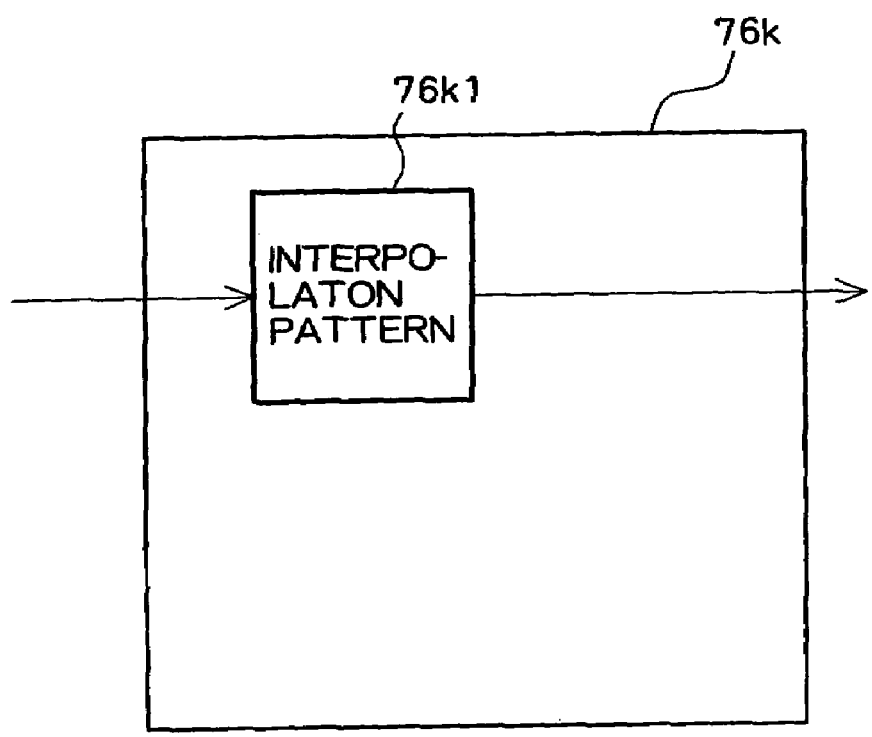
FIG. 21 is a block diagram showing a structure of an intersecting flaw correction unit for RB according to the second preferred embodiment of the present invention.

FIG. 21 shows a structure of an intersecting flaw correction unit 76*k* for RB of FIG. 14. The intersecting flaw correction unit 76*k* for RB comprises an interpolation pattern unit 76*k*1. An intersecting flaw is a flaw which occurs at an intersection between a vertical flaw and a horizontal flaw and there is one pattern. Therefore, unlike the case of the vertical flaw and the horizontal flaw, it is not necessary to perform a plurality of difference calculations and select an interpolation pattern based on the comparison of magnitudes of the difference calculation results. Thus, the intersecting flaw correction unit 76*k* need not include an intersecting flaw detection pattern unit and a calculation pattern selector.

Figure 22:
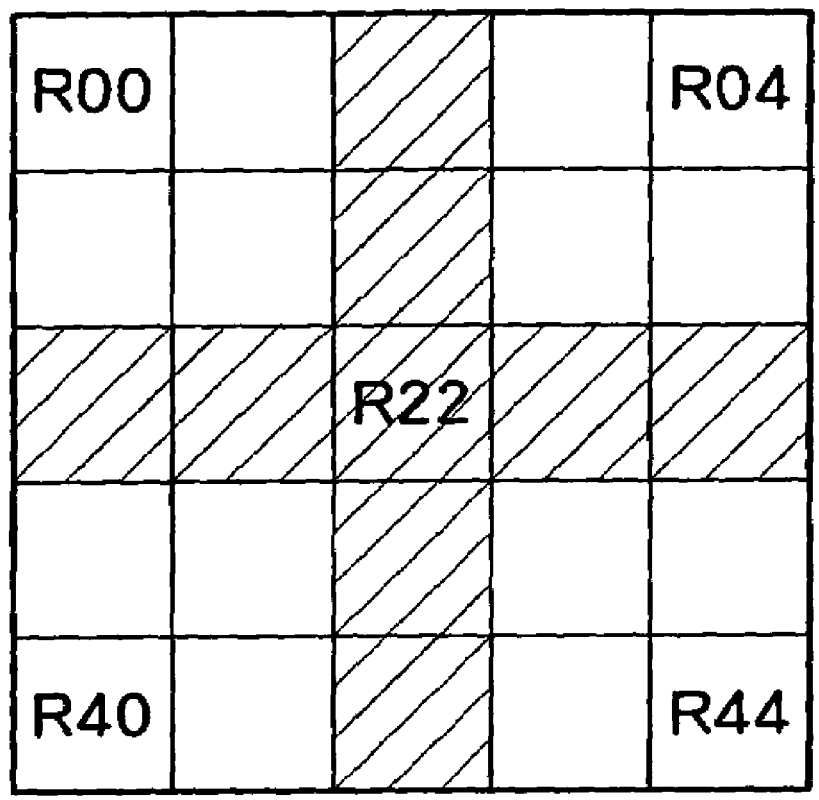
FIG. 22 is an explanatory diagram of an intersecting flaw.

FIG. 22 shows an interpolation pattern in the interpolation pattern unit 76*k*. The pixel value of the pixel R22 to be corrected which has the intersecting flaw is interpolated using four surrounding pixels, that is, pixels R00, R04, R40, and R44 through:

$$R22=(R00+R04+R40+R44)/4$$

There may be an intersecting flaw in a G pixel. However, the intersecting flaw in G pixel can be interpolated as a point flaw by:

$$G23=(G12+G14+G32+G34)/4$$

In consideration of the above, the intersecting flaw correction unit 76*k* for RB, but not an intersecting flaw correction unit for G, is provided in the structure of FIG. 14 (the point defect correction unit 76*b* for G also functions as the intersecting flaw correction unit for G).

In the description of the second preferred embodiment of the present invention above, an example is described in which a vertical flaw and a horizontal flaw are simultaneously processed in parallel. In the third preferred embodiment of the present invention, a configuration is described in which a point flaw and a vertical flaw are processed, simultaneously and in parallel.

Figure 23:
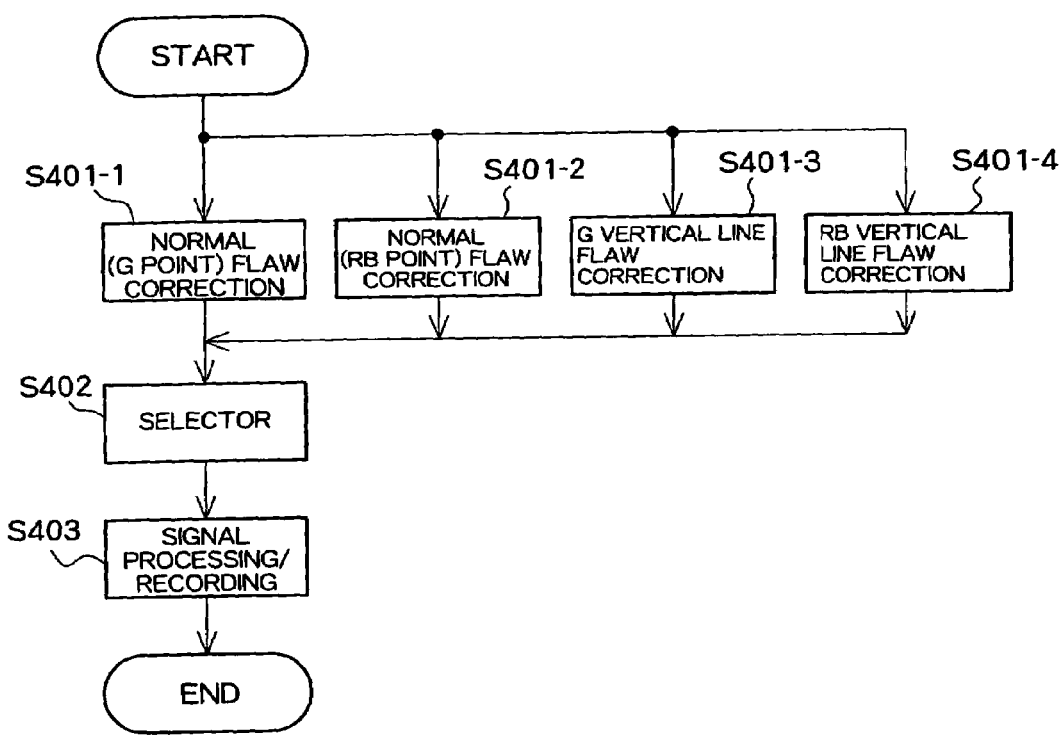
FIG. 23 is a flowchart showing a process according to a third preferred embodiment of the present invention.

FIG. 23 is a flowchart showing an overall process of the third preferred embodiment of the present invention. First, correction of a point flaw of G (S401-1), correction of a point flaw of RB (S401-2), correction of a vertical line flaw of G (S401-3), and correction of a vertical line flaw of RB (S401-4) are simultaneously executed. After the point flaw is corrected, the data are switched and output by a selector (S402), signal processes such as gamma correction are applied, and the data is stored in a recording medium 90 (S403).

Figure 24:
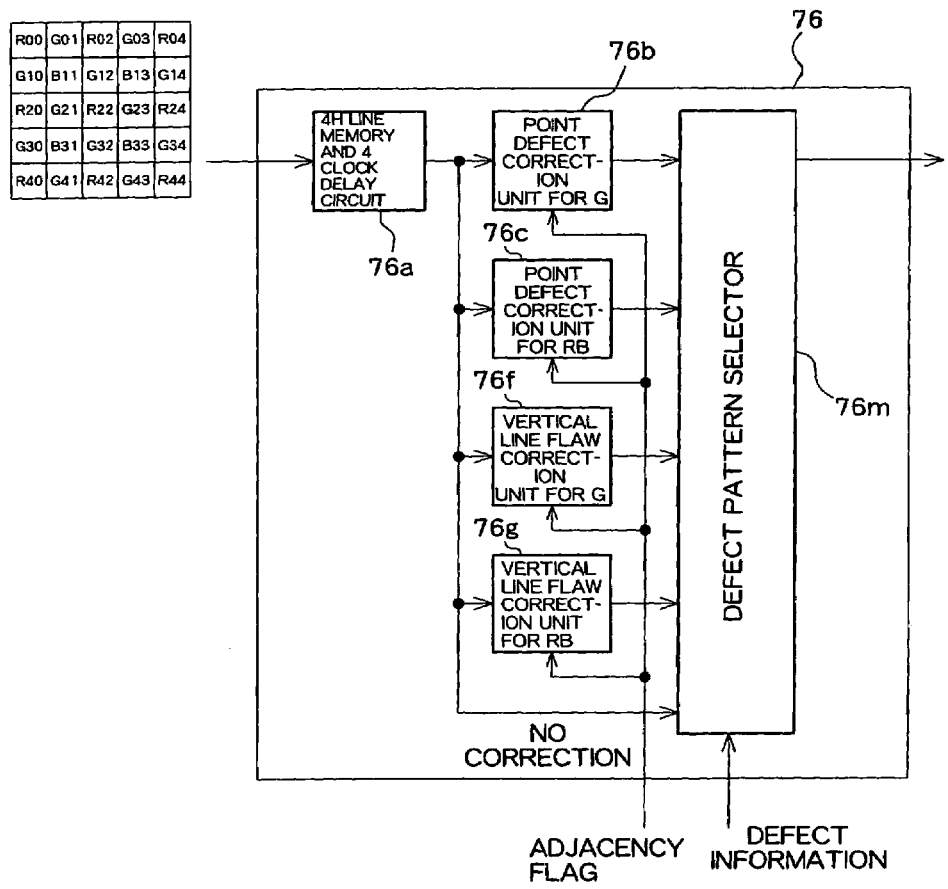
FIG. 24 is a block diagram showing a structure of a defect correction circuit according to the third preferred embodiment of the present invention.

FIG. 24 shows a structure of a defect correction circuit 76 of the third preferred embodiment of the present invention. This structure differs from the structure shown in FIG. 4 in that the vertical line flaw correction unit 76*f* for G and the vertical line flaw correction unit 76*g* for RB are provided in parallel with the point defect correction unit 76*b* for G and the point defect correction unit 76*c* for RB and that the 4H line memory and 4 clock delay circuit 76*e* and the selector 76*h* are removed. In other words, the 4H line memory and 4 clock delay circuits 76*a* and 76*e* in FIG. 4 are integrated to a single circuit 76*a* and the structure is thus simplified.

The 4H line memory and 4 clock delay circuit 76*a* supplies pixel data for 25 pixels to the correction units 76*b*-76*g*. The correction units execute flaw correction processes using the pixel data and supply the corrected data to a defect pattern selector 76*m*. In addition, the 4H line memory and 4 clock delay circuit 76*a* also supplies uncorrected data to the defect pattern selector 76*m* in order to handle cases in which there is no flaw. The defect pattern selector 76*m* switches the output based on the defect information from the defect decode circuit 78. That is, when there is a point flaw of G pixel, data from the correction unit 76*b* is output and when a vertical flaw is present in RB, data from the correction unit 76*g* is output. In a part in which a point flaw and a vertical flaw are not present, uncorrected data is output.

Figure 25:
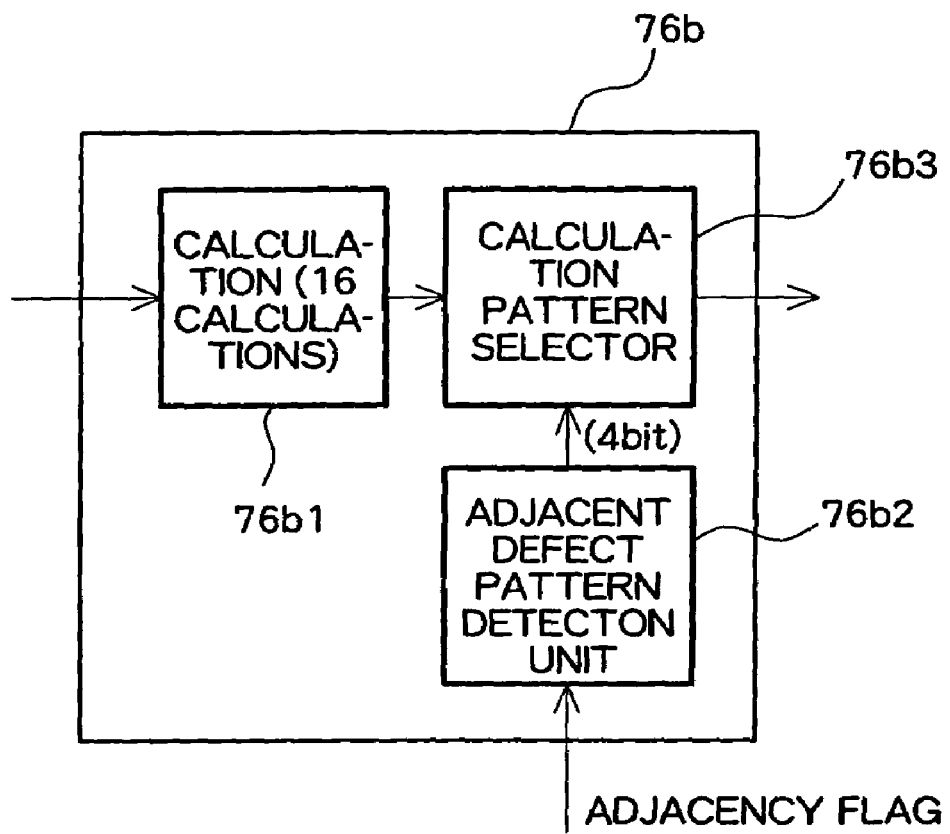
FIG. 25 is a block diagram showing a point defect correction unit for G according to the third preferred embodiment of the present invention.

FIG. 25 shows a structure of the point defect correction unit 76*b* for G The point defect correction unit 76*b* for G comprises a calculation unit 76*b*1, an adjacent defect pattern detection unit 76*b*2, and a calculation pattern selector 76*b*3. The calculation unit 76*b*1 executes 16 calculations from the data of 25 pixels and supplies the calculation values to the calculation pattern selector unit 76*b*3. The 16 calculations are calculations determined based on a relative position of the point defect with respect to the pixel G23 to be corrected. The adjacent defect pattern detection unit 76b2 detects the relative position, that is, the defect pattern, and supplies the detection result to the calculation pattern selector 76b3. The calculation pattern selector 76b3 selects one of the calculation values of the 16 calculations based on the detected defect pattern and outputs the selected calculation value.

Figure 26:
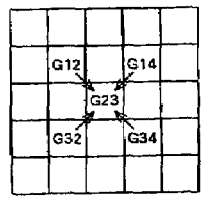
FIG. 26 is an explanatory diagram showing a calculation at a calculation unit for G according to the third preferred embodiment of the present invention.
Figure 26:
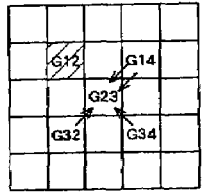
Figure 26:
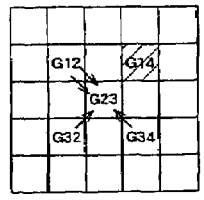
Figure 26:
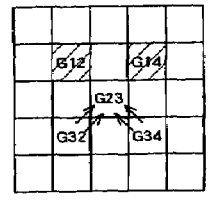
Figure 26:
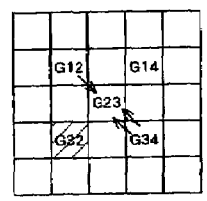
Figure 26:
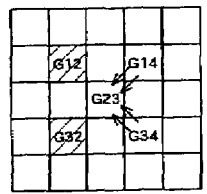
Figure 26:
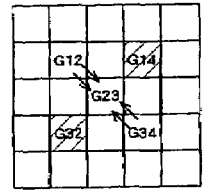
Figure 26:
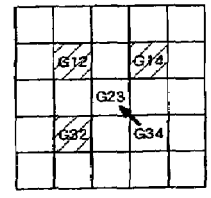
Figure 26:
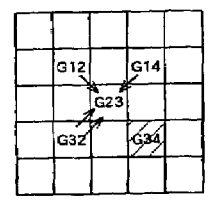
Figure 26:
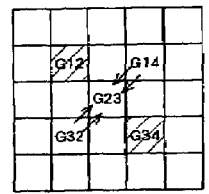
Figure 26:
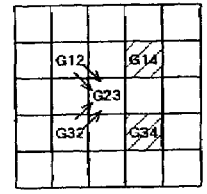
Figure 26:
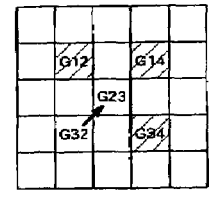
Figure 26:
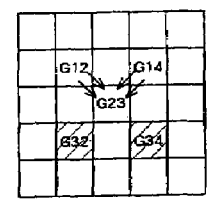
Figure 26:
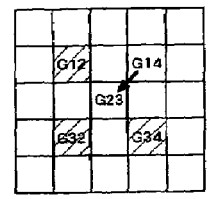
Figure 26:
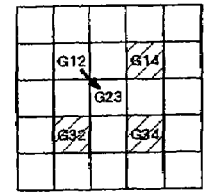
Figure 26:
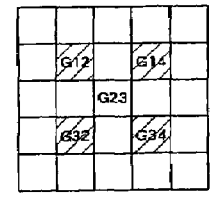

FIG. 26 shows the 16 calculations calculated in the calculation unit 76b1 with correspondence to the defect pattern. FIG. 26(a) shows a calculation when there is no point flaw around the pixel G23 to be corrected and:

$$G23=(G12+G14+G32+G34)/4$$

FIG. 26(b) shows a calculation when a point flaw is present in an upper-left pixel G12 which is adjacent to the target pixel G23 and:

$$G23=(2*G14+G32+G34)/4$$

In the figure, the slant line is used to represent the presence of a flaw. FIG. 26(c) shows a calculation when a point flaw is present in an upper-right pixel G14 which is adjacent to the target pixel G23 and:

$$G23=(2*G12+G32+G34)/4$$

FIG. 26(d) shows a calculation when a point flaw is present in the upper-left pixel G12 and the upper-right pixel G14 which are adjacent to the target pixel G23 and:

$$G23=(2*G32+2*G34)/4$$

FIG. 26(e) shows a calculation when a point flaw is present in a lower-left pixel G32 which is adjacent to the target pixel G23 and:

$$G23=(2*G34+G12+G14)$$

FIG. 26(f) shows a calculation when a point flaw is present in the upper-left pixel G12 and the lower-left pixel G32 which are adjacent to the target pixel G23 and:

$$G23=(2*G14+2*G34)/4$$

FIG. 26(g) shows a calculation when a point flaw is present in the upper-right pixel G14 and the lower-left pixel G32 which are adjacent to the target pixel G23 and:

$$G23=(2*G12+2*G34)/4$$

FIG. 26(h) shows a calculation when a point flaw is present in the upper-right pixel G14, upper-left pixel G12, and lower-left pixel G32 which are adjacent to the target pixel G23 and:

$$G23=(4*G34)/4$$

FIG. 26(i) shows a calculation when a point flaw is present in a lower-right pixel G34 which is adjacent to the target pixel G23 and:

$$G23=(2*G32+G12+G14)/4$$

FIG. 26(j) shows a calculation when a point flaw is present in the upper-left pixel G12 and the lower-right pixel G34 which are adjacent to the target pixel G23 and:

$$G23=(2*G14+2*G32)/4$$

FIG. 26(k) shows a calculation when a point flaw is present in the upper-right pixel G14 and the lower-right pixel G34 which are adjacent to the target pixel G23 and:

$$G23=(2*G12+2*G32)/4$$

FIG. 26(l) shows a calculation when a point flaw is present in the upper-left pixel G12, upper-right pixel G14, and lower-right pixel G34 which are adjacent to the target pixel G23 and:

$$G23=(4*G32)/4$$

FIG. 26(m) shows a calculation when a point flaw is present in the lower-right pixel G34 and the lower-left pixel G32 which are adjacent to the target pixel G23 and:

$$G23=(2*G14+2*G32)/4$$

FIG. 26(n) shows a calculation when a point flaw is present in the upper-left pixel G12, lower-left pixel G32, and lower-right pixel G34 which are adjacent to the target pixel G23 and:

$$G23=(4*G14)/4$$

FIG. 26(o) shows a calculation when a point flaw is present in the upper-right pixel G14, lower-right pixel G34, and lower-left pixel G32 which are adjacent to the target pixel G23 and:

$$G23=(4*G12)/4$$

FIG. 26(p) shows a calculation when a point flaw is present in all of the upper-left pixel G12, lower-left pixel G32, upper-right pixel G14, and lower-right pixel G34 which are adjacent to the target pixel G23, which results in:

$$G23=G23$$

This result indicates that the pixel value of the target pixel G23 cannot be interpolated from the surrounding pixels and the pixel data is output as it is (the result is identical to the case when the pixel is not corrected).

Figure 27:
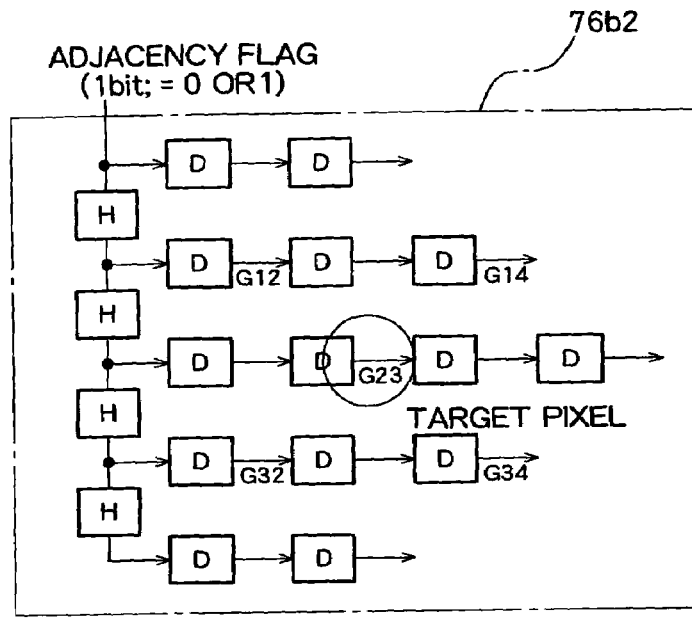
FIG. 27 is a structural diagram of an adjacent defect pattern detection unit for G according to the third preferred embodiment of the present invention.

FIG. 27 shows a structure of the adjacent defect pattern detection unit 76b2 of FIG. 25. The adjacent defect pattern detection unit 76b2 comprises a 4H line memory and clock delay circuit. An adjacency flag which indicates whether or not a pixel of a point flaw is adjacent to the target pixel G23 to be corrected is supplied from the defect decode circuit 78 to the adjacent defect pattern detection unit 76b2. The size of the adjacency flag is 1 bit and the adjacency flag is 1 when a pixel of point flaw is adjacent and 0 when no pixel of point flaw is adjacent. The flag of 1 or 0 is output from each component of the 4H line memory and clock delay circuit. Therefore, using the values of the flags from the elements, it is possible to detect the defect pattern with respect to the target pixel G23 to be corrected. For example, an output of a first delay element of a second line corresponds to the pixel G12 and it can be determined that the defect pattern is the defect pattern of FIG. 26(b) when the flag of the output is 1 and the other flags are 0. An output of a third delay element of a fourth line corresponds to the pixel G34 and it can be determined that the defect pattern is the defect pattern of FIG. 26(i) when the flag of this output is 1 and the other flags are 0. The calculation pattern selector 76b3 identifies the defect pattern from the defect patterns of FIGS. 26(a)~26(p) by determining that each of the flag values corresponding to the pixels G12, G14, G32, and G34 is 1 or 0, and selects a calculation value corresponding to the defect pattern. More specifically, the adjacent defect pattern detection unit 76b2 outputs the values of the flags corresponding to the pixels G12, G14, G32 and G34 in 4 bits, that is, the adjacent defect pattern detection unit 76b2 outputs an adjacent defect pattern value=G12+G14*2+G32*4+G34*8. The adjacent defect pattern value takes one of values of 0~15 and these values correspond to the patterns of FIGS. 26(a) ~26(p).

FIG. 26(a) corresponds to an adjacent pattern value of 0 and FIG. 26(p) corresponds to an adjacent pattern value of 15.

Figure 28:
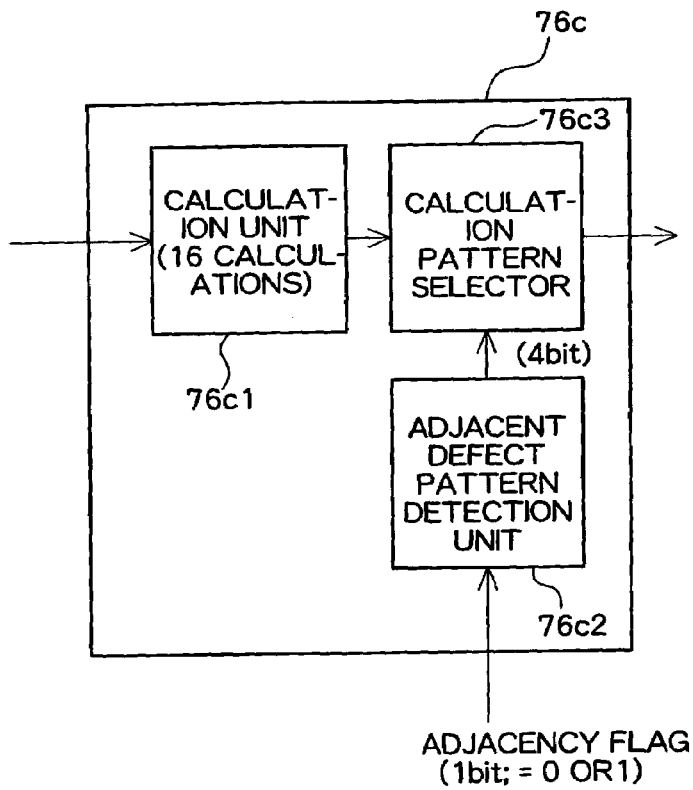
FIG. 28 is a block diagram showing a structure of a point defect correction unit for RB according to the third preferred embodiment of the present invention.

FIG. 28 shows a structure of the point defect correction unit 76c for RB. The point defect correction unit 76c for RB comprises a calculation unit 76c1, an adjacent defect pattern detection unit 76c2, and a calculation pattern selector 76c3. The calculation unit 76c1 executes 16 calculations from the data for 25 pixels and supplies the calculation values to the calculation pattern selector 76c3. The 16 calculations are calculations determined by a relative position of the point defect with respect to the target pixel R22 to be corrected (when the correction target is R pixel). The adjacent defect pattern detection unit 76c2 detects the relative position, that is, the defect pattern and supplies the detection result to the calculation pattern selector 76c3. The calculation pattern selector 76c3 selects one calculation value from the 16 calculations based on the detected defect pattern and outputs the selected value.

Figure 29:
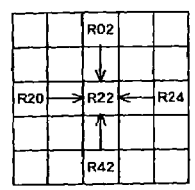
FIG. 29 is an explanatory diagram showing a calculation at a calculation unit for RB according to the third preferred embodiment of the present invention.
Figure 29:
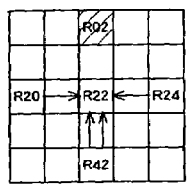
Figure 29:
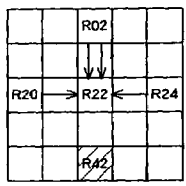
Figure 29:
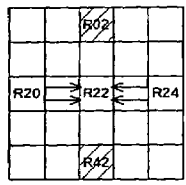
Figure 29:
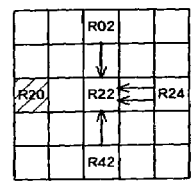
Figure 29:
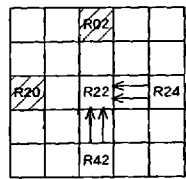
Figure 29:
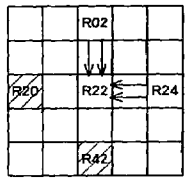
Figure 29:
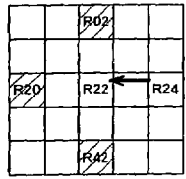
Figure 29:
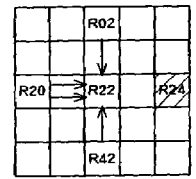
Figure 29:
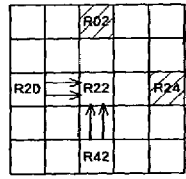
Figure 29:
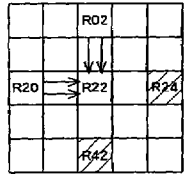
Figure 29:
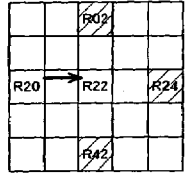
Figure 29:
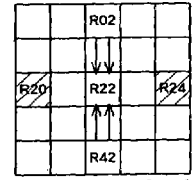
Figure 29:
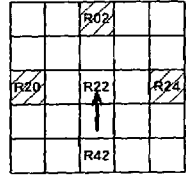
Figure 29:
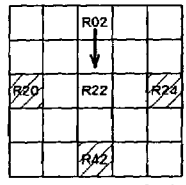
Figure 29:
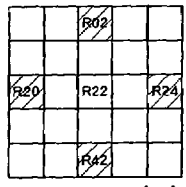

FIG. 29 shows the 16 calculations calculated in the calculation unit 76c1 with correspondence to the defect pattern. FIG. 29(a) shows a calculation when no point flaw is present surrounding the target pixel R22 to be corrected and:

$$R22=(R02+R42+R20+R24)/4$$

FIG. 29(b) shows a calculation when a point flaw is present at an upper pixel which is adjacent to the target pixel R22 and:

$$R22=(2*R42+R20+R24)/4$$

In the figure, the slanted line indicates occurrence of a flaw. FIG. 29(c) shows a calculation when a point flaw is present at a lower pixel which is adjacent to the target pixel R22 and:

$$R22=(2*R02+R20+R24)/4$$

FIG. 29(d) shows a calculation when a point flaw is present at the upper pixel and the lower pixel which are adjacent to the target pixel R22 and:

$$R22=(2*R20+2*R24)/4$$

FIG. 29(e) shows a calculation when a point flaw is present at a left pixel which is adjacent to the target pixel R22 and:

$$R22=(2*R24+R02+R42)/4$$

FIG. 29(f) shows a calculation when a point flaw is present at the left pixel and the upper pixel which are adjacent to the target pixel R22 and:

$$R22=(2*R42+2*R24)/4$$

FIG. 29(g) shows a calculation when a point flaw is present at the left pixel and the lower pixel which are adjacent to the target pixel R22 and:

$$R22=(2*R02+2*R24)/4$$

FIG. 29(h) shows a calculation when a point flaw is present at the upper pixel, left pixel, and lower pixel which are adjacent to the target pixel R22 and:

$$R22=(4*R24)/4$$

FIG. 29(i) shows a calculation when a point flaw is present in a light pixel which is adjacent to the target pixel R22 and:

$$R22=(2*R20+R02+R42)/4$$

FIG. 29(j) shows a calculation when a point flaw is present in the upper pixel and right pixel which are adjacent to the target pixel R22 and:

$$R22=(2*R42+2*R20)/4$$

FIG. 29(k) shows a calculation when a point flaw is present in the right pixel and the lower pixel which are adjacent to the target pixel R22 and:

$$R22=(2*R02+2*R20)/4$$

FIG. 29(l) shows a calculation when a point flaw is present in the upper pixel, right pixel, and lower pixel which are adjacent to the target pixel R22 and:

$$R22=(4*R20)/4$$

FIG. 29(m) shows a calculation when a point flaw is present in the right pixel and left pixel which are adjacent to the target pixel R22 and:

$$R22=(2*R42+2*R20)/4$$

FIG. 29(n) shows a calculation when a point flaw is present in the left pixel, upper pixel, and right pixel which are adjacent to the target pixel R22 and:

$$R22=(4*R42)/4$$

FIG. 29(o) shows a calculation when a point flaw is present in the left pixel, lower pixel, and right pixel which are adjacent to the target pixel R22 and:

$$R22=(4*R02)/4$$

FIG. 29(p) shows a calculation when a point flaw is present in all of the left pixel, lower pixel, right pixel, and upper pixel which are adjacent to the target pixel R22, with the result that:

$$R22=R22$$

This result indicates that the pixel value of the target pixel R22 cannot be interpolated using the surrounding pixels, and the pixel data is therefore output as is (the result is identical to the case when the pixel value is not corrected).

Figure 30:
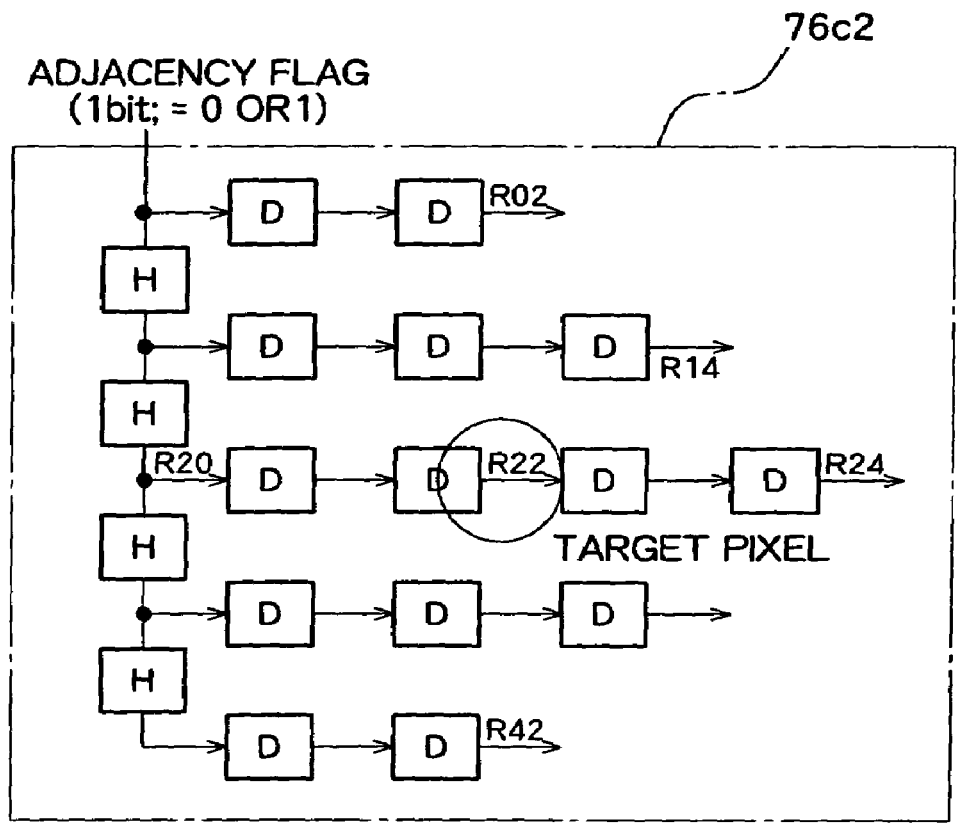
FIG. 30 is a structural diagram of an adjacent defect pattern detection unit for RB according to the third preferred embodiment of the present invention.

FIG. 30 shows a structure of the adjacent defect pattern detection unit 76c2 of FIG. 28 which comprises a 4H line memory and clock delay circuit. An adjacency flag indicating whether or not a pixel of a point flaw is adjacent to the target pixel R22 to be corrected is supplied from the defect decode circuit 78 to the adjacent defect pattern detection unit 76c2. The size of the adjacency flag is 1 bit and the adjacency flag is 1 when the pixel of point flaw is adjacent and 0 when no pixel of point flaw is adjacent. A flag of 1 or 0 is output from each component of the 4H line memory and clock delay circuit. Therefore, it is possible to detect, with the flag values from the components, the defect pattern with respect to the target pixel R22 to be corrected. For example, an output of a second delay element of a first line corresponds to a pixel R02, and it is possible to determine that the defect pattern is the defect pattern of FIG. 29(b) when the value of this flag is 1 and the values of the other flags are 0. Similarly, an output of a fourth delay element of a third line corresponds to a pixel R24, and it is possible to determine that the defect pattern is the defect pattern of FIG. 29(i) when the value of this flag is 1 and the values of the other flags are 0. The calculation pattern selector 76c3 identifies the defect pattern to be one of the defect patterns shown in FIGS. 29(a)~29(p) by determining the flag values corresponding to the pixels R02, R20, R24, and R42 to be 1 or 0 and selects a calculation value corresponding to the identified defect pattern. More specifically, the adjacent defect pattern detection unit 76c2 outputs flag values corresponding to the pixel R02, R20, R24, and R42 in 4 bits, that is, the adjacent defect pattern detection unit 76c2 outputs an adjacent defect pattern value=R02+R42*2+ R20*4+R24*8. The adjacent defect pattern value takes a value in a range of 0~15, each of which corresponding to each of the defect patterns of FIGS. 29(a)~29(p). In other words, the adjacent pattern value of 0 corresponds to the defect pattern of FIG. 29(a) and the adjacent pattern value of 15 corresponds to the defect pattern of FIG. 29(p).

Figure 31:
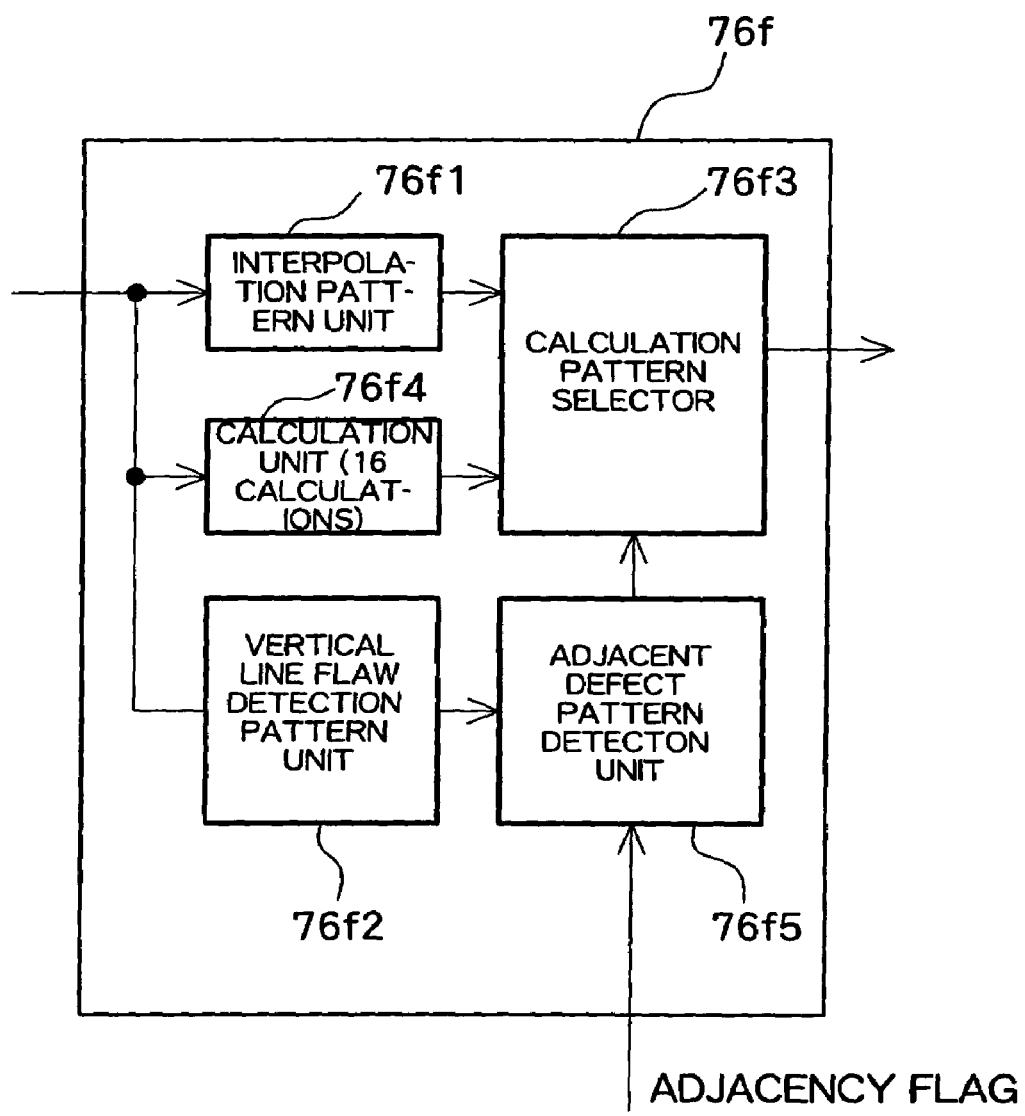
FIG. 31 is a block diagram showing a structure of a vertical line flaw correction unit for G according to the third preferred embodiment of the present invention.

FIG. 31 shows a structure of a vertical line flaw correction unit 76f for G of FIG. 24. The vertical line flaw correction unit 76f for G comprises an interpolation pattern unit 76f1, a calculation unit 76f4, a vertical line flaw detection pattern unit 76f2, a calculation pattern selector 76f, and an adjacent defect pattern detection unit 76f5. The interpolation pattern unit 76f1 and the vertical line flaw detection pattern unit 76f2 have functions identical to those of the interpolation pattern unit 76/1 and the vertical line flaw detection pattern unit 76/2 shown in FIG. 7. The calculation unit 76/4 performs 16 interpolation calculations and supplies the calculation results to the calculation pattern selector 76/3. The adjacent defect pattern unit 76/5 detects a pattern of an adjacent defect, that is, a pattern when a point flaw is present adjacent to a vertical flaw and supplies the detection result to the calculation pattern selector 76/3. The calculation pattern selector 76/3 determines whether the correction should be performed based on the interpolation pattern unit 76/1 and the vertical line flaw detection pattern unit 76/2 similar to the selector 76/3 shown in FIG. 7 or the correction should be performed based on the calculation unit 76/4 and the adjacent defect pattern detection unit 76/5, and outputs data accordingly. The calculation pattern selector 76/3 may switch between the two in every frame or may switch based on a frame of a pixel to be corrected even in the same frame. Alternatively, it is also possible to correct based on the calculation unit 76/4 and the adjacent defect pattern detection unit 76/5 only when a point flaw and a vertical flaw are adjacent. In other words, when the point flaw and the vertical flaw are not present adjacent to each other, it is possible to correct the vertical flaw as described in the first preferred embodiment of the present invention and to correct using a specific pattern as will be described below when a point flaw and a vertical flaw are present adjacent to each other. A correction process based on the calculation unit 76/4 and the adjacent defect pattern detection unit 76/5 will now be described.

Figure 32:
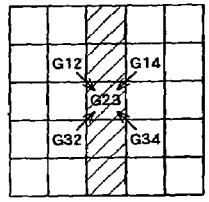
FIG. 32 is an explanatory diagram showing a calculation at a calculation unit for G according to the third preferred embodiment of the present invention.
Figure 32:
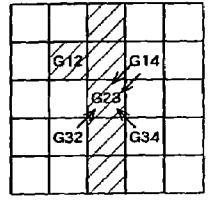
Figure 32:
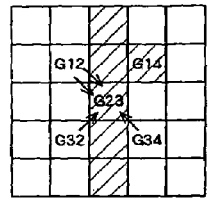
Figure 32:
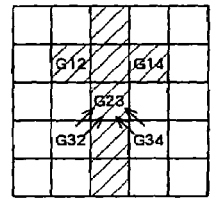
Figure 32:
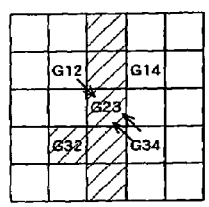
Figure 32:
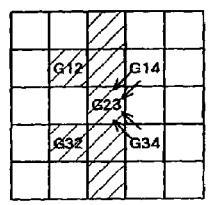
Figure 32:
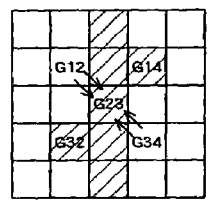
Figure 32:
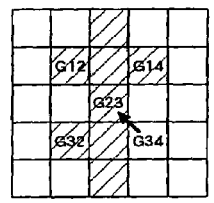
Figure 32:
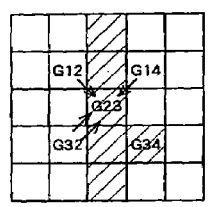
Figure 32:
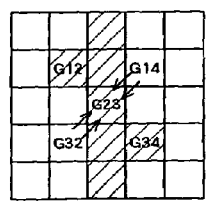
Figure 32:
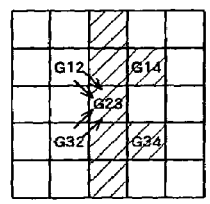
Figure 32:
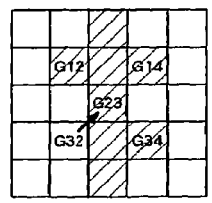
Figure 32:
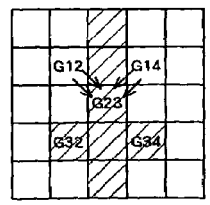
Figure 32:
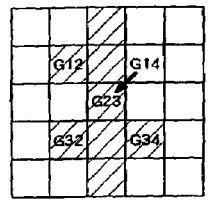
Figure 32:
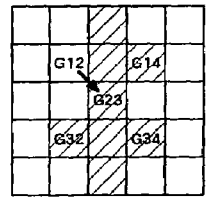
Figure 32:
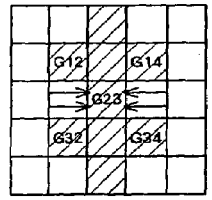

FIG. 32 shows 16 calculations calculated in the calculation unit 76/4 with correspondence to the adjacent defect patterns. FIG. 32(*a*) shows a calculation when only a vertical flaw is present in the target pixel G23 to be corrected and no point flaw is present in adjacent pixels and:

$$G23=(G12+G14+G32+G34)/4$$

FIG. 32(*b*) shows a calculation when a point flaw is present at he upper-left pixel G12 which is adjacent to the vertical flaw of the target pixel G23 and:

$$G23=(2*G14+G32+G34)/4$$

FIG. 32(*c*) shows a calculation when a point flaw is present in the upper-right pixel G14 which is adjacent to the vertical flaw of the target pixel G23 and:

$$G23=(2*G12+G32+G34)/4$$

FIG. 32(*d*) shows a calculation when a point flaw is present in the upper left pixel G12 and the upper right pixel G14 which are adjacent to the vertical flaw of the target pixel G23 and:

$$G23=(2*G32+2*G34)/4$$

FIG. 32(*e*) shows a calculation when a point flaw is present in the lower-left pixel G32 which is adjacent to the vertical flaw of the target pixel G23 and:

$$G23=(2*G34+G12+G14)/4$$

FIG. 32(*f*) shows a calculation when a point flaw is present in the upper-left pixel G12 and the lower-left pixel G32 which are adjacent to the vertical flaw of the target pixel G23 and:

$$G23=(2*G14+2*G34)/4$$

FIG. 32(*g*) shows a calculation when a point flaw is present in the upper-right pixel G14 and the lower-left pixel G32 which are adjacent to the vertical flaw of the target pixel G23 and:

$$G23=(2*G12+2*G34)/4$$

FIG. 32(*h*) shows a calculation when a point flaw is present in the upper-right pixel G14, upper-left pixel G12, and lower-left pixel G32 which are adjacent to the vertical flaw of the target pixel G23 and:

$$G23=(4*G34)/4$$

FIG. 32(*i*) shows a calculation when a point flaw is present in the lower-right pixel G34 which is adjacent to the vertical flaw of the target pixel G23 and:

$$G23=(2*G32+G12+G14)/4$$

FIG. 32(*j*) shows a calculation when a point flaw is present in the upper-left pixel G12 and the lower-right pixel G34 which are adjacent to the vertical flaw of the target pixel G23 and:

$$G23=(2*G14+2*G32)/4$$

FIG. 32(*k*) shows a calculation when a point flaw is present in the upper-right pixel G14 and the lower-right pixel G34 which are adjacent to the vertical flaw of the target pixel G23 and:

$$G23=(2*G12+2*G32)/4$$

FIG. 32(*l*) shows a calculation when a point flaw is present in the upper-left pixel G12, upper-right pixel G14, and lower-right pixel G34 which are adjacent to the vertical flaw of the target pixel G23 and:

$$G23=(4*G32)/4$$

FIG. 32(*m*) shows a calculation when a point flaw is present in the lower-right pixel G32 and the lower-left pixel G34 which are adjacent to the vertical flaw of the target pixel G23 and:

$$G23=(2*G14+2*G32)/4$$

FIG. 32(*n*) shows a calculation when a point flaw is present in the upper-left pixel G12, lower-left pixel G32, and lower-right pixel G34 which are adjacent to the vertical flaw of the target pixel G23 and:

$$G23=(4*G14)/4$$

FIG. 32(*o*) shows a calculation when a point flaw is present in the upper-right pixel G14, lower-right pixel G34, and lower-left pixel G32 which are adjacent to the vertical flaw of the target pixel G23 and:

$$G23=(4*G12)/4$$

FIG. 32(*p*) shows a calculation when a point flaw is present in all of the upper-left pixel G12, lower-left pixel G32, upper-right pixel G14, and lower-right pixel G34 which are adjacent to the vertical flaw of the target pixel G23 and:

$$G23=(2*G21+2*G25)/4$$

Figure 33:
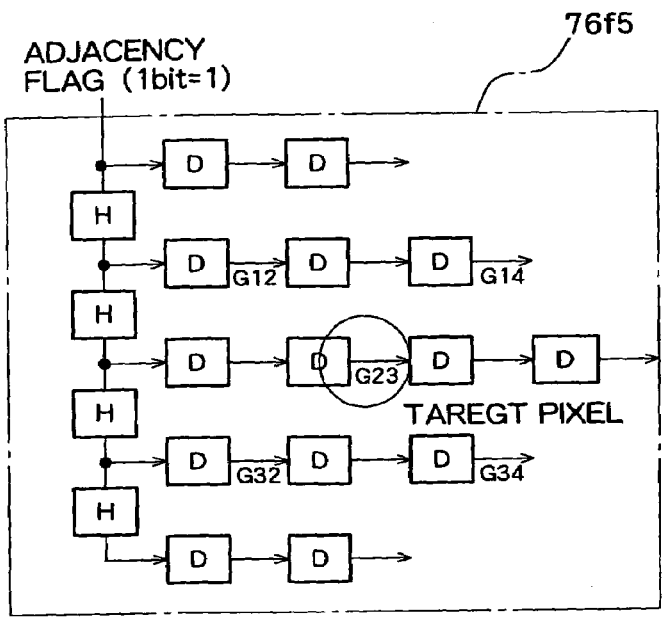
FIG. 33 is a structural diagram showing an adjacent defect pattern detection unit for G according to the third preferred embodiment of the present invention.

FIG. 33 shows a structure of the adjacent defect pattern detection unit 76/5 of FIG. 31 which comprises a 4H line memory and clock delay circuit. An adjacency flag which indicates whether or not a pixel of a point flaw is adjacent to the vertical flaw of the target pixel G23 to be corrected is supplied from the defect decode circuit 78 to the adjacent defect pattern detection unit 76/5. The size of the adjacency flag is 1 bit and the adjacency flag is 1 when a pixel of a point flaw is adjacent and is 0 when no pixel of point flaw is adjacent. A flag of 1 or 0 is output from each component of the 4H line memory and clock delay circuit. Therefore, it is possible to detect the defect pattern with respect to the target pixel G23 to be corrected from the values of the flags from the components. For example, an output of a first delay element on a second line corresponds to the pixel G12 and it is possible to determine that the defect pattern is the defect pattern of FIG. 32(b) when the value of this flag is 1 and the values of the other flags are 0. An output of a third delay element on a fourth line corresponds to the pixel G34 and it is possible to determine that the defect pattern is the defect pattern of FIG. 32(i) when the value of this flag is 1 and the values of the other flags are 0. The calculation pattern selector 76f3 identifies the defect pattern to be one of the defect patterns of FIGS. 32(a~32(p) by determining each of the values of the flags corresponding to the pixels G12, G14, G32, and G34 to be 1 or 0 and selects a calculation value corresponding to the defect pattern. More specifically, the adjacent defect pattern detection unit 76f5 outputs the values of the flags corresponding to the pixels G12, G14, G32, and G34 in 4 bits, that is, the adjacent defect pattern detection unit 76f5 outputs an adjacent defect pattern value=G12+G14*2+G32*4+G34*8. The adjacent defect pattern value takes a value in a range of 0~15 which corresponds to the defect patterns of FIGS. 32(a)~32(p). That is, the adjacent pattern value of 0 corresponds to the defect pattern of FIG. 32(a) and the adjacent pattern value of 15 corresponds to the defect pattern of FIG. 32(p).

Figure 34:
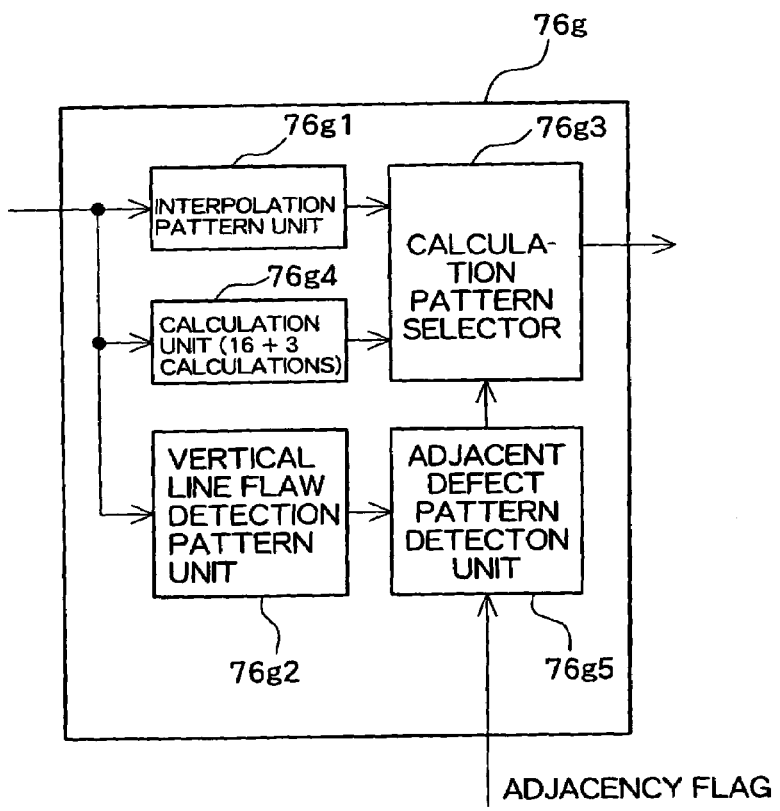
FIG. 34 is a block diagram showing a structure of a vertical line flaw correction unit for RB according to the third preferred embodiment of the present invention.

FIG. 34 shows a structure of the vertical line flaw correction unit 76g for RB of FIG. 24. The vertical line flaw correction unit 76g for RB comprises an interpolation pattern unit 76g1, a calculation unit 76g4, a vertical line flaw detection pattern unit 76g2, a calculation pattern selector 76g3, and an adjacent defect pattern detection unit 76g5. The interpolation pattern unit 76g1 and the vertical line flaw detection pattern unit 76g2 have functions identical to those of the interpolation pattern unit 76g1 and the vertical line flaw detection pattern unit 76g2 shown in FIG. 10. The calculation unit 76g4 performs 16 interpolation calculations and supplies the calculation results to the calculation pattern selector 76g3. The adjacent defect pattern unit 76g5 detects the pattern of the adjacent defect, that is, the pattern when a point flaw is present adjacent to the vertical flaw and supplies the result to the calculation pattern selector 76g3. The calculation pattern selector 76g3 makes a determination as to whether the correction should be performed based on the interpolation pattern unit 76g1 and the vertical line flaw detection pattern unit 76g2 similar to the selector 76g3 of FIG. 10 or the correction should be performed based on the calculation unit 76g4 and the adjacent defect pattern detection unit 76g5 and outputs the determination result. The calculation pattern selector 76g3 may switch between the two every frame or to switch based on a frame of the pixel to be corrected even in the same frame. Alternatively, it is also possible to correct based on the calculation unit 76g4 and the adjacent defect pattern detection unit 76g5 only when a point flaw is adjacent to a vertical flaw. In other words, it is possible to correct the vertical flaw in a manner similar to the first preferred embodiment of the present invention when the point flaw and the vertical flaw are not present adjacent to each other and correct the vertical flaw using a specific pattern as will be described below when a point flaw and a vertical flaw are present adjacent to each other. The correction based on the calculation unit 76g4 and the adjacent defect pattern detection unit 76g5 will be described now.

Figure 35:
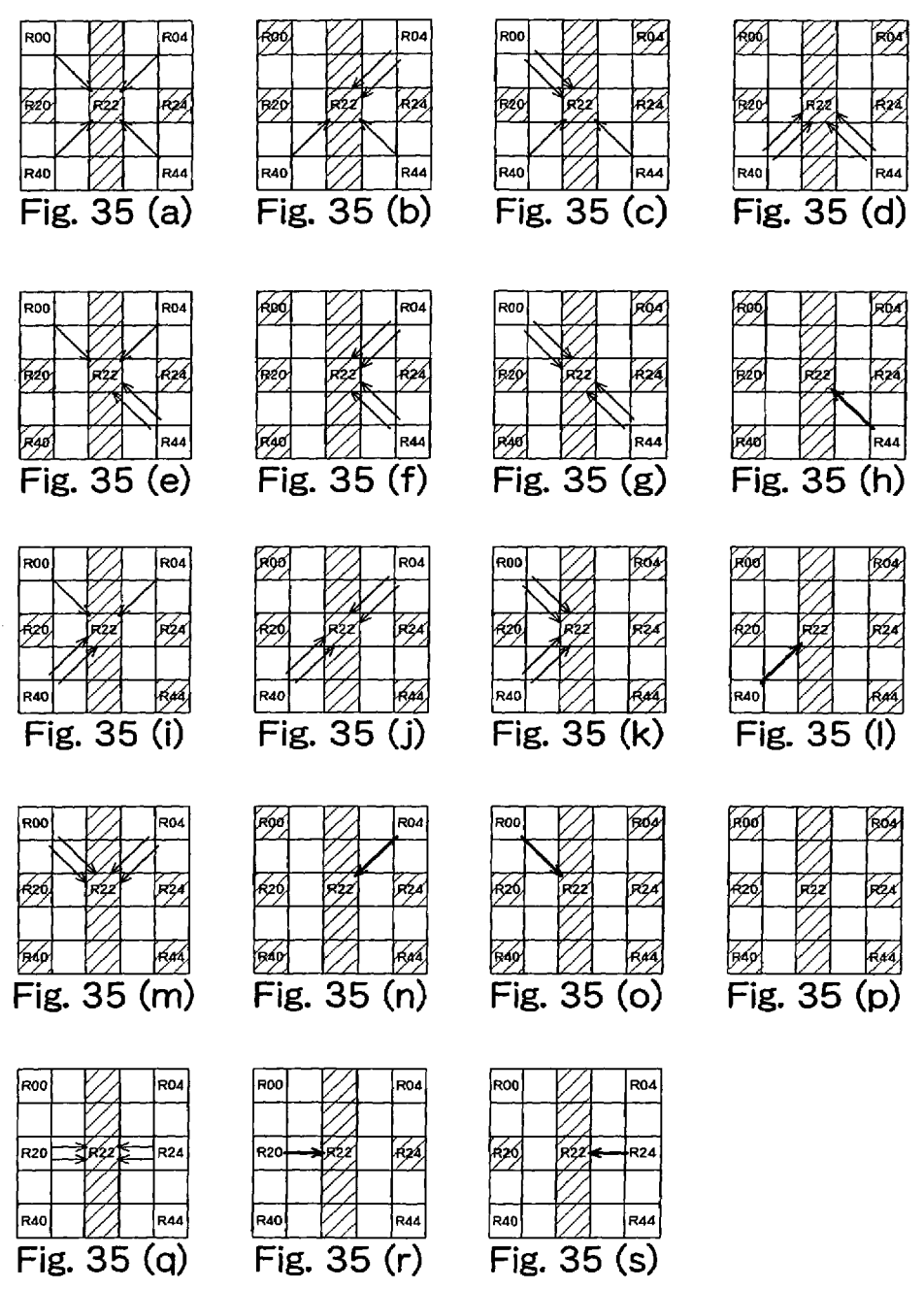

FIG. 35 shows the 16 calculations calculated by the calculation unit 76g4 with correspondence to the defect patterns. FIG. 35(a) shows a calculation when the target pixel to be corrected is the pixel R22 and a point flaw is present in a pixel R20 and a pixel R24, and:

$R22=(R00+R04+R40+R44)/4$

FIG. 35(b) shows a calculation when the target pixel is the pixel R22 and a point flaw is present in the pixels R20, R24, and R00, and:

$R22=(2*R04+R40+R44)/4$

FIG. 35(c) shows a calculation when the target pixel is the pixel R22 and a point flaw is present in the pixels R20, R24, and R04, and:

$R22=(2*R00+R40+R44)/4$

FIG. 35(d) shows a calculation when the target pixel is the pixel R22 and a point flaw is present in the pixels R20, R24, R00, and R04, and:

$R22=(2*R40+2*R44)/4$

FIG. 35(e) shows a calculation when the target pixel is the pixel R22 and a point flaw is present in the pixels R20, R24, and R40, and:

$R22=(2*R44+R00+R04)/4$

FIG. 35(f) shows a calculation when the target pixel is the pixel R22 and a point flaw is present in the pixels R20, R24, R00, and R40, and:

$R22=(2*R04+2*R44)/4$

FIG. 35(g) shows a calculation when the target pixel is the pixel R22 and a point flaw is present in the pixels R20, R24, R04, and R40, and:

$R22=(2*R00+2*R44)/4$

FIG. 35(h) shows a calculation when the target pixel is the pixel R22 and a point flaw is present in the pixels R20, R24, R00, R04, and R40, and:

$R22=(4*R44)/4$

FIG. 35(i) shows a calculation when the target pixel is the pixel R22 and a point flaw is present in the pixels R20, R24, and R44, and:

$R22=(2*R40+R00+R04)/4$

FIG. 35(j) shows a calculation when the target pixel is the pixel R22 and a point flaw is present in the pixels R20, R24, R00, and R44, and:

$R22=(2*R04+2*R40)/4$

FIG. 35(k) shows a calculation when the target pixel is the pixel R22 and a point flaw is present in the pixel R20, R24, R04, and R44, and:

$R22=(2*R00+2*R40)/4$

FIG. 35(l) shows a calculation when the target pixel is the pixel R22 and a point flaw is present in the pixels R20, R24, R00, R04, and R44, and:

$R22=(4*R40)/4$

FIG. 35(m) shows a calculation when the target pixel is the pixel R22 and a point flaw is present in the pixels R20, R24, R40, and R44, and:

$R22=(2*R04+2*R40)/4$

FIG. 35(n) shows a calculation when the target pixel is the pixel R22 and a point flaw is present in the pixels R20, R24, R00, R40, and R44, and:

$R22=(4*R04)/4$

FIG. 35(o) shows a calculation when the target pixel is the pixel R22 and a point flaw is present in the pixels R20, R24, R04, R40, and R44, and:

$R22=(4*R00)/4$

FIG. 35(p) shows a calculation when the target pixel is the pixel R22 and a point flaw is present in the pixels R20, R24, R00, R04, R40, and R44, with the result that:

$$R22=R22 \text{ (no correction)}$$

FIG. 35 shows cases in which a point flaw is present in both pixels R20 and R24. When, on the other hand, no point flaw is present in both pixels R20 and R24, it is possible to correct the pixel value of the pixel R22 as in FIG. 35(q) using:

$$R22=(2*R20+2*R24)/4$$

When there is a point flaw in the pixel R24 and there is no point flaw in the pixel R20, it is possible to correct the pixel value of the pixel R22 as in FIG. 35(r) using:

$$R22=(4*R20)/4$$

When there is a point flaw in the pixel R20 and there is no point flaw in the pixel R24, it is possible to correct the pixel value of the pixel R22 as in FIG. 35(s) by:

$$R22=(4*R24)/4$$

The calculation unit 76g4 performs these 16+3 calculations.

Figure 36:
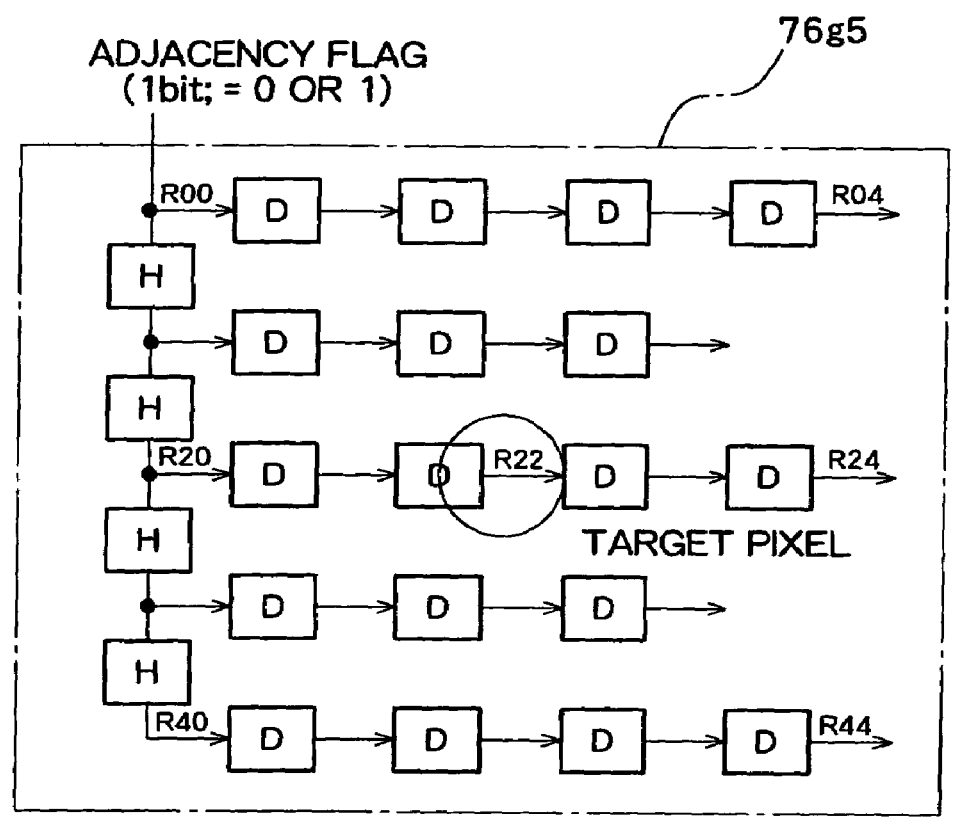
FIG. 36 is a structural diagram showing an adjacent defect pattern detection unit for RB according to the third preferred embodiment of the present invention.

FIG. 36 shows a structure of the adjacent defect pattern detection unit 76g5 of FIG. 34 which comprises a 4H line memory and a clock delay circuit. An adjacency flag indicating whether or not a pixel of a point flaw is adjacent to a vertical flaw of the target pixel R22 to be corrected is supplied from the defect decode circuit 78 to the adjacent defect pattern detection unit 76g5. The size of the adjacency flag is 1 bit and the adjacency flag is 1 when a pixel of point flaw is adjacent and is 0 when no pixel of point flaw is adjacent. A flag of 1 or 0 is output from each component of the 4H line memory and clock delay circuit. Therefore, it is possible to detect the defect pattern with respect to the target pixel R22 to be corrected from the values of the flags from the components. The adjacent pattern detection unit 76g5 outputs flag values corresponding to the pixels R00, R04, R40, R44, R20, and R24 in 6 bits. The adjacent pattern detection unit 76g5 outputs the pattern of FIG. 35(q) when R20=0 and R24=0, outputs the pattern of FIG. 35(r) when R24=1 and R20=0, outputs the pattern of FIG. 35(s) when R20=1 and R24=0, and outputs an adjacent defect pattern value=R02+R42*2+ R20*4+R24*8 when R20=1 and R24=1. The adjacent defect pattern value takes a value in a range of 0~15 and these values correspond to the defect patterns of FIGS. 35(a)~35(p).

The third preferred embodiment was described above using an example configuration in which a point flaw and a vertical flaw are simultaneously processed in parallel. In the fourth preferred embodiment, a configuration is described in which a point flaw, a vertical flaw, a horizontal flaw, and an intersecting flaw are processed simultaneously and in parallel.

Figure 37:
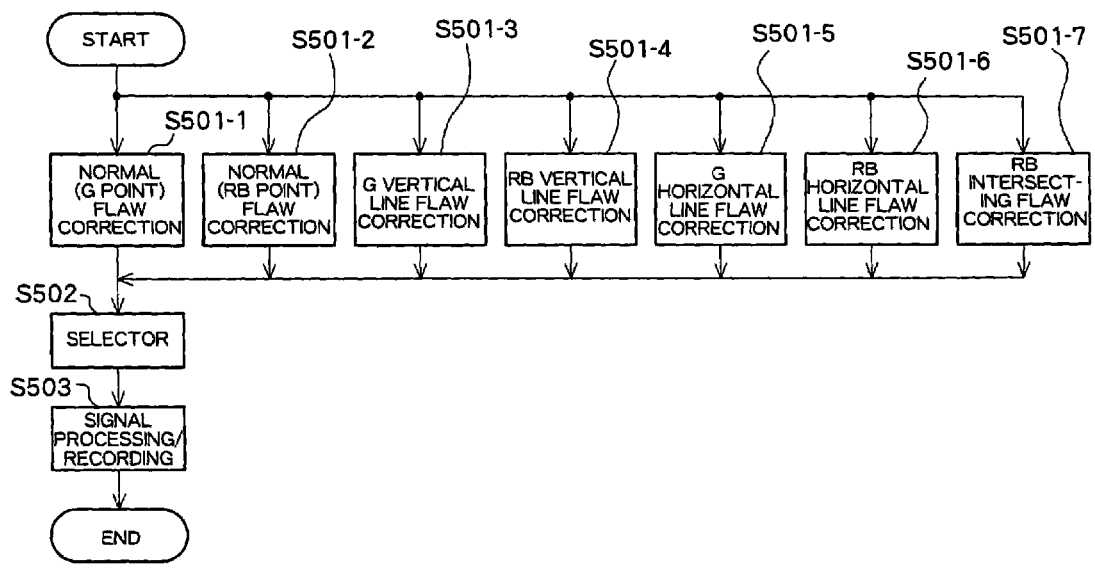
FIG. 37 is a flowchart showing a process according to a fourth preferred embodiment of the present invention.

FIG. 37 shows a flowchart of an overall process according to the fourth preferred embodiment of the present invention. First, correction of a point flaw of G (S501-1), correction of a point flaw of RB (S501-2), correction of a vertical line flaw of G (S501-3), correction of a vertical line flaw of RB (S501-4), correction of a horizontal line flaw of G (S501-5), correction of a horizontal line flaw of RB (S501-6), and correction of an intersecting flaw of RB (S501-7) are simultaneously performed. After the flaws are corrected, the data are switched and output from a selector (S502), signal processes such as gamma correction are executed, and the data is stored in a recording medium 90 (S503).

Figure 38:
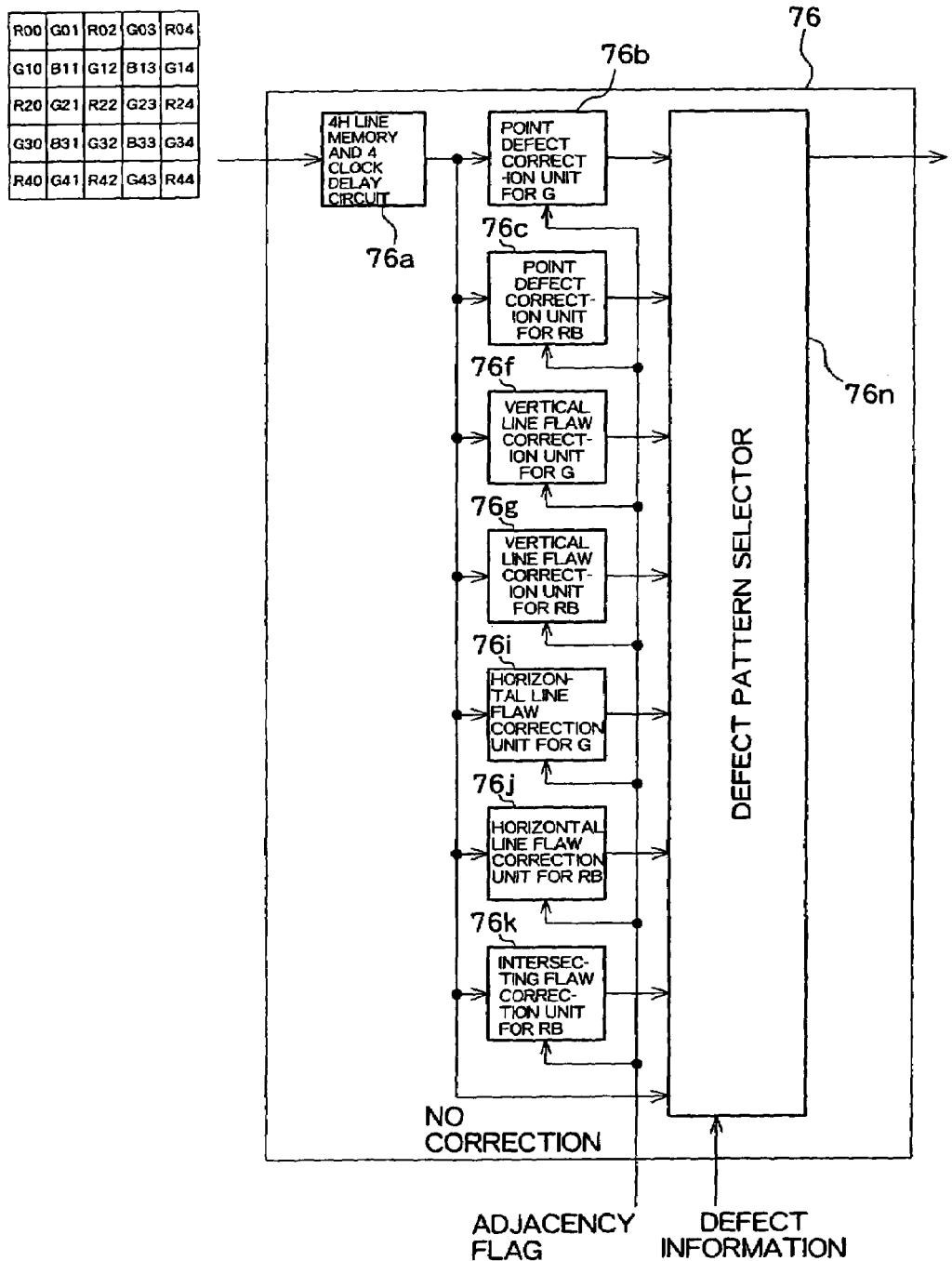
FIG. 38 is a block diagram showing a structure of a defect correction circuit according to the fourth preferred embodiment of the present invention.

FIG. 38 shows a structure of a defect correction circuit 76 according to the fourth preferred embodiment of the present invention. A point defect correction unit 76b for G, a point defect correction unit 76c for RB, a vertical line flaw correction unit 76f for G, a vertical line flaw correction unit 76g for RB, a horizontal line flaw correction unit 76i for G, a horizontal line flaw correction unit 76j for RB, and an intersecting flaw correction unit 76k for RB are provided in parallel to each other. The defect pattern selector 76n selects an image signal which is already corrected in each correction unit and outputs the selected signal.

Figure 39:
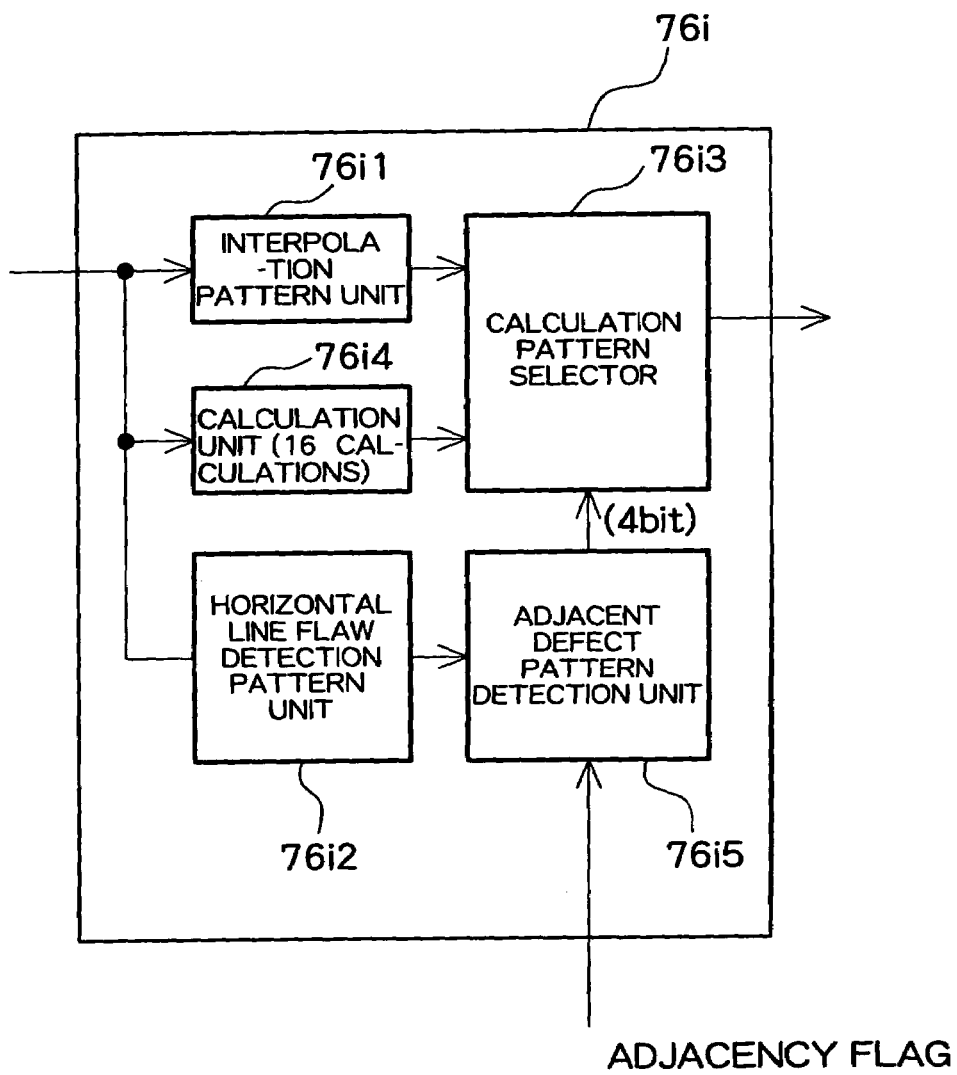
FIG. 39 is a block diagram showing a structure of a horizontal line flaw correction unit for G according to the fourth preferred embodiment of the present invention.

FIG. 39 shows a structure of the horizontal line flaw correction unit 76i for G of FIG. 38. The horizontal line flaw correction unit 76i for G comprises an interpolation pattern unit 76i1, a horizontal line flaw detection pattern unit 76i2, a calculation pattern selector 76i3, a calculation unit 76i4, and an adjacent defect pattern detection unit 76i5.

Figure 40:
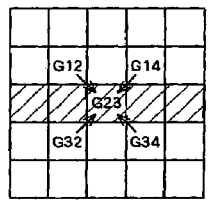
FIG. 40 is an explanatory diagram showing a calculation at a calculation unit for G according to the fourth preferred embodiment of the present invention.
Figure 40:
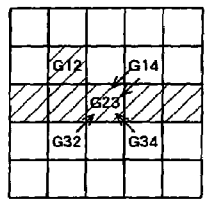
Figure 40:
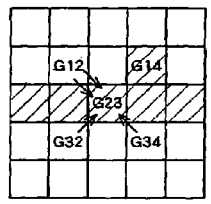
Figure 40:
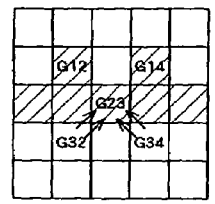
Figure 40:
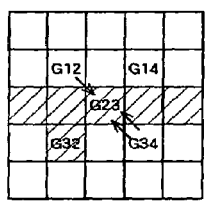
Figure 40:
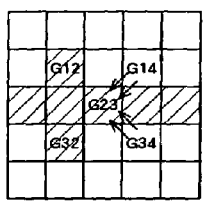
Figure 40:
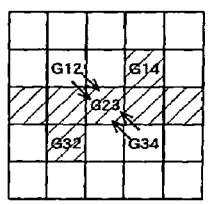
Figure 40:
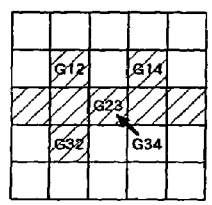
Figure 40:
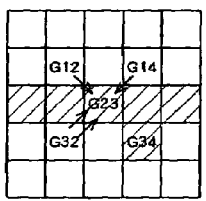
Figure 40:
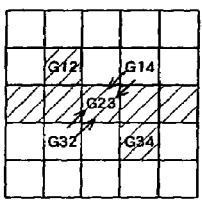
Figure 40:
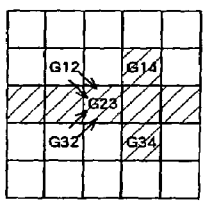
Figure 40:
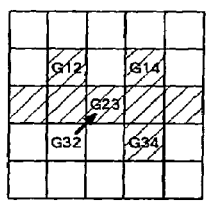
Figure 40:
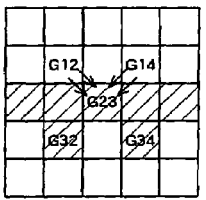
Figure 40:
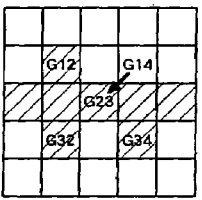
Figure 40:
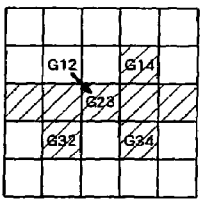
Figure 40:
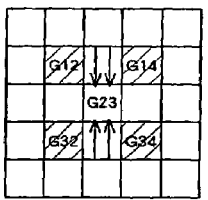

FIG. 40 shows calculations at the calculation unit 76i4. In the figure, a slanted line indicates that a horizontal flaw is present. The calculation unit 76i4 executes 16 calculations based on the defect pattern of the adjacent pixels. FIG. 40(a) shows a calculation when no point flaw is present in the adjacent pixels and:

$$G23=(G12+G14+G32+G34)/4$$

FIG. 40(b) shows a calculation when a point flaw is present in an adjacent upper-left pixel G12 and:

$$G23=(2*G14+G32+G34)/4$$

FIG. 40(c) shows a calculation when a point flaw is present in an adjacent upper-right pixel G14 and:

$$G23=(2*G12+G32+G34)/4$$

FIG. 40(d) shows a calculation when a point flaw is present in the adjacent upper-left pixel G12 and adjacent upper-right pixel G14 and:

$$G23=(2*G32+2*G34)/4$$

FIG. 40(e) shows a calculation when a point flaw is present in an adjacent lower-left pixel G32 and:

$$G23=(2*G34+G12+G14)/4$$

FIG. 40(f) shows a calculation when a point flaw is present in the adjacent upper-left pixel G12 and adjacent lower-left pixel G32 and:

$$G23=(2*G14+2*G34)/4$$

FIG. 40(g) shows a calculation when a point flaw is present in the adjacent upper-right pixel G14 and adjacent lower-left pixel G32 and:

$$G23=(2*G12+2*G34)/4$$

FIG. 40(h) shows a calculation when a point flaw is present in the adjacent upper-left pixel G12, adjacent lower-left pixel G32, and adjacent upper-right pixel G14 and:

$$G23=(4*G34)/4$$

FIG. 40(i) shows a calculation when a point flaw is present in an adjacent lower-right pixel G34 and:

$$G23=(2*G32+G12+G14)/4$$

FIG. 40(j) shows a calculation when a point flaw is present in the adjacent upper-left pixel G12 and adjacent lower-right pixel G34 and:

$$G23=(2*G14+2*G32)/4$$

FIG. 40(k) shows a calculation when a point flaw is present in the adjacent upper-right pixel G14 and adjacent lower-right pixel G34 and:

$$G23=(2*G12+2*G32)/4$$

FIG. 40(*l*) shows a calculation when a point flaw is present in the adjacent upper-left pixel G12, adjacent upper-right pixel G14, and adjacent lower-right pixel G34 and:

$$G23=(4*G32)/4$$

FIG. 40(*m*) shows a calculation when a point flaw is present in the adjacent lower-left pixel G32 and adjacent lower-right pixel G34 and:

$$G23=(2*G14+2*G32)/4$$

FIG. 40(*n*) shows a calculation when a point flaw is present in the adjacent upper-left pixel G12, adjacent lower-left pixel G32, and adjacent lower-right pixel G34 and:

$$G23=(4*G14)/4$$

FIG. 40(*o*) shows a calculation when a point flaw is present in the adjacent upper-right pixel G14, adjacent lower-right pixel G34, and adjacent lower-left pixel G32 and:

$$G23=(4*G12)/4$$

FIG. 40(*p*) shows a calculation when a point flaw is present in the adjacent upper-left pixel G12, adjacent lower-left pixel G32, adjacent upper-right pixel G14, and adjacent lower-right pixel G34 and:

$$G23=(2*G03+2*G43)/4$$

Figure 41:
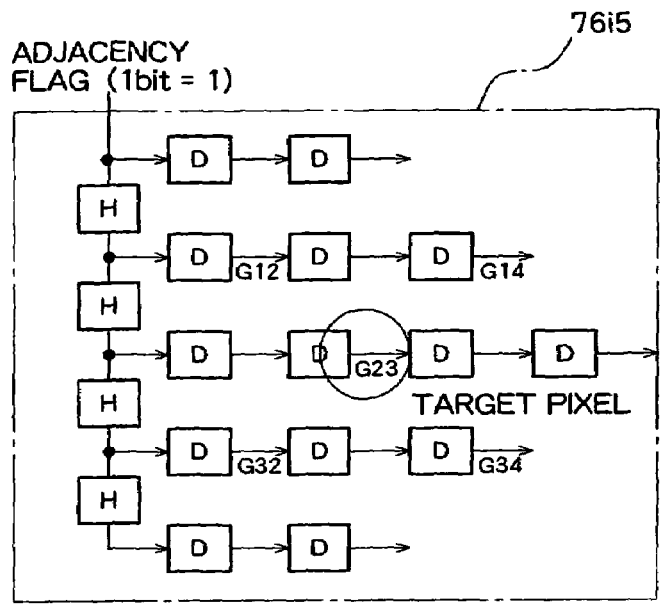
FIG. 41 is a structural diagram showing an adjacent defect pattern detection unit for G according to the fourth preferred embodiment of the present invention.

FIG. 41 shows a structure of the adjacent defect pattern detection unit 76*i*5 which comprises a 4H line memory and clock delay circuit. An adjacency flag indicating whether or not a pixel of a point flaw is adjacent to a horizontal flaw of the target pixel G23 to be corrected is supplied from the defect decode circuit 78 to the adjacent defect pattern detection unit 76*i*5. The size of the adjacency flag is 1 bit and the adjacency flag is 1 when a pixel of point flaw is adjacent and is 0 when no pixel of point flaw is adjacent. A flag of 1 or 0 is output from each component of the 4H line memory and clock delay circuit. Therefore, it is possible to detect the defect pattern with respect to the target pixel G23 to be corrected from the values of the flags from the components. The adjacent defect pattern detection unit 76*i*5 outputs values of the flags corresponding to the pixels G12, G14, G32, and G34 in 4 bits, that is, the adjacent defect pattern detection unit 76*i*5 outputs an adjacent defect pattern value=G12+G14\*2+G32\*4+G34\*8. The adjacent defect pattern value takes a value in a range of 0~15 and these values correspond to the defect patterns shown in FIGS. 40(*a*)~40(*p*), respectively. When there is no point flaw in the adjacent pixels, the target pixel G23 can be corrected in a manner similar to the above-described embodiments using the interpolation pattern unit 76*i*1, horizontal line flaw detection pattern unit 76*i*2, and calculation pattern selector 76*i*3.

Figure 42:
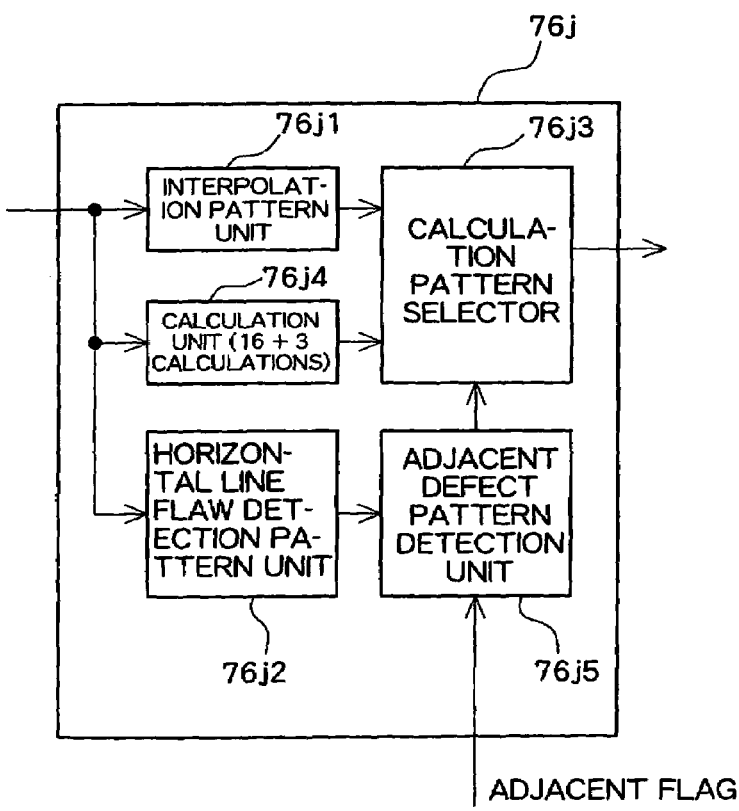
FIG. 42 is a block diagram showing a structure of a horizontal line flaw correction unit for RB according to the fourth preferred embodiment of the present invention.

FIG. 42 shows a structure of the horizontal line flaw correction unit 76*j* for RB of FIG. 38. The horizontal line flaw correction unit 76*j* for RB comprises an interpolation pattern unit 76*j*1, a horizontal line flaw detection pattern unit 76*j*2, a calculation pattern selector 76*j*3, a calculation unit 76*j*4, and an adjacent defect pattern detection unit 76*j*5. The calculation unit 76*j*4 executes 16+3 calculations based on the position of the point flaw with respect to the horizontal flaw.

Figure 43:
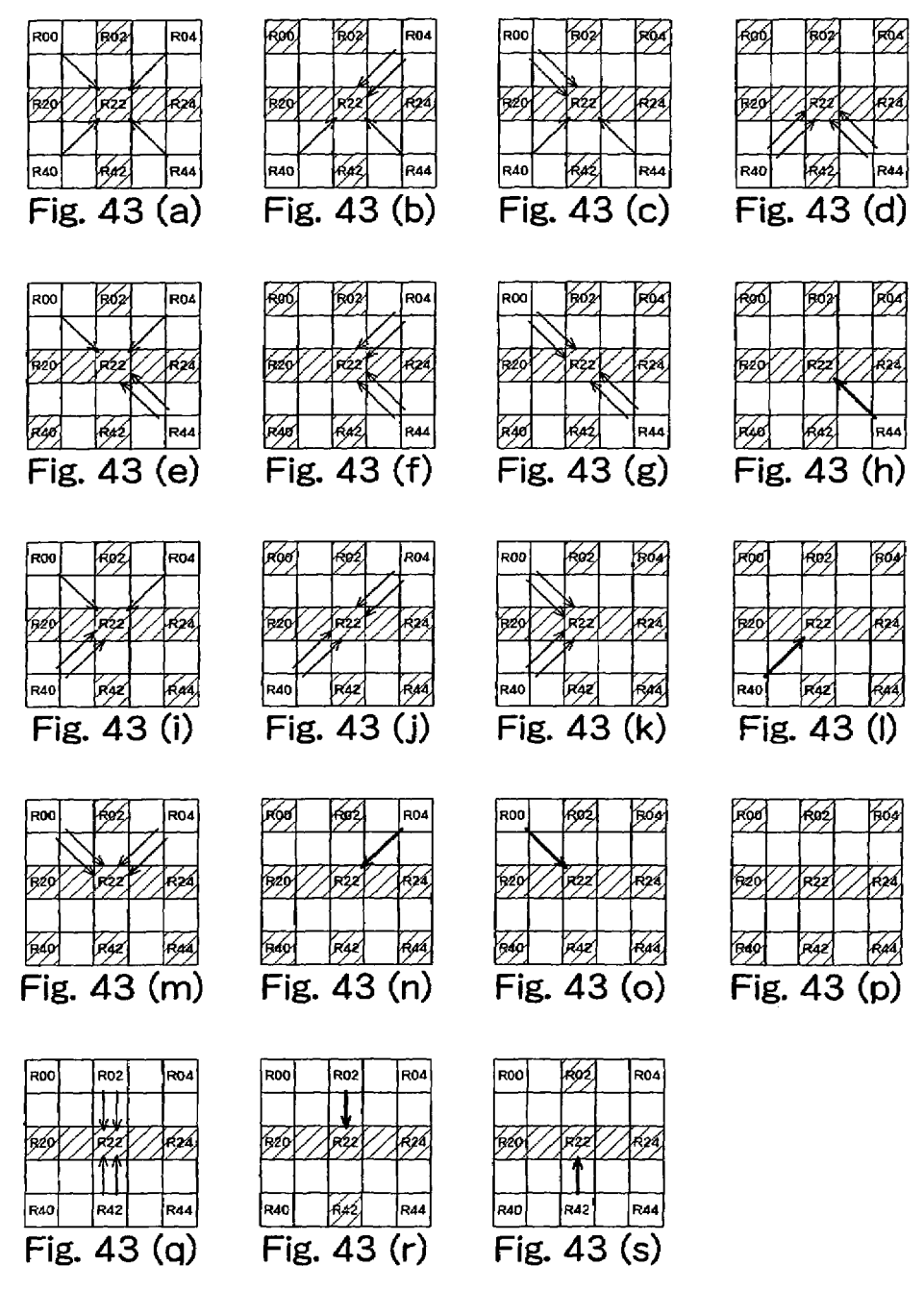

FIG. 43 shows calculations in the calculation unit 76*j*4. FIGS. 43(*a*)~43(*p*) show cases in which a point flaw is present in the pixels R02 and R42 which are adjacent to the target pixel R22 to be corrected. FIG. 43(*a*) shows a calculation when a point flaw is present in the pixels R02 and R44 and:

$$R22=(R00+R04+R40+R44)/4$$

FIG. 43(*b*) shows a calculation when a point flaw is present in the pixels R00, R02, and R42 and:

$$R22=(2*R04+R40+R44)$$

FIG. 43(*c*) shows a calculation when a point flaw is present in the pixels R02, R04, and R42 and:

$$R22=(2*R00+R40+R44)/4$$

FIG. 43(*d*) shows a calculation when a point flaw is present in the pixels R00, R02, R04, and R42 and:

$$R22=(2*R40+2*R44)/4$$

FIG. 43(*e*) shows a calculation when a point flaw is present in the pixels R02, R40, and R42 and:

$$R22=(2*R44+R00+R04)/4$$

FIG. 43(*f*) shows a calculation when a point flaw is present in the pixels R00, R02, R40, and R42 and:

$$R22=(2*R04+2*R44)/4$$

FIG. 43(*g*) shows a calculation when a point flaw is present in the pixels R02, R04, R40, and R42 and:

$$R22=(2*R00+2*R44)/4$$

FIG. 43(*h*) shows a calculation when a point flaw is present in the pixels R00, R02, R04, R40, and R42 and:

$$R22=(4*R44)/4$$

FIG. 43(*i*) shows a calculation when a point flaw is present in the pixels R02, R42, and R44 and:

$$R22=(2*R40+R00+R04)/4$$

FIG. 43(*j*) shows a calculation when a point flaw is present in the pixels R00, R02, R42, and R44 and:

$$R22=(2*R04+2*R40)/4$$

FIG. 43(*k*) shows a calculation when a point flaw is present in the pixels R02, R04, R42, and R44 and:

$$R22=(2*R00+2*R40)/4$$

FIG. 43(*l*) shows a calculation when a point flaw is present in the pixels R00, R02, R04, R42, and R44 and:

$$R22=(4*R40)/4$$

FIG. 43(*m*) shows a calculation when a point flaw is present in the pixels R02, R40, R42, and R44 and:

$$R22=(2*R04+2*R40)/4$$

FIG. 43(*n*) shows a calculation when a point flaw is present in the pixels R00, R02, R40, R42, and R44 and:

$$R22=(4*R04)/4$$

FIG. 43(*o*) shows a calculation when a point flaw is present in the pixels R02, R04, R40, R42, and R44 and:

$$R22=(4*R00)/4$$

FIG. 43(*p*) shows a calculation when a point flaw is present in the pixels R00, R02, R04, R40, R42, and R44, with the result that:

$$R22=R22$$

FIG. 43(*q*) shows a calculation when a point flaw is not present in the pixels R02 and R42 and:

$$R22=(2*R02+2*R42)/4$$

FIG. 43(*r*) shows a calculation when no point flaw is present in the pixel R02 and a point flaw is present in the pixel R42 and:

$$R22=(4*R02)/4$$

FIG. 43(s) shows a calculation when a point flaw is present in the pixel R02 and no point flaw is present in the pixel R42 and:

$$R22=(4*R42)/4$$

Figure 44:
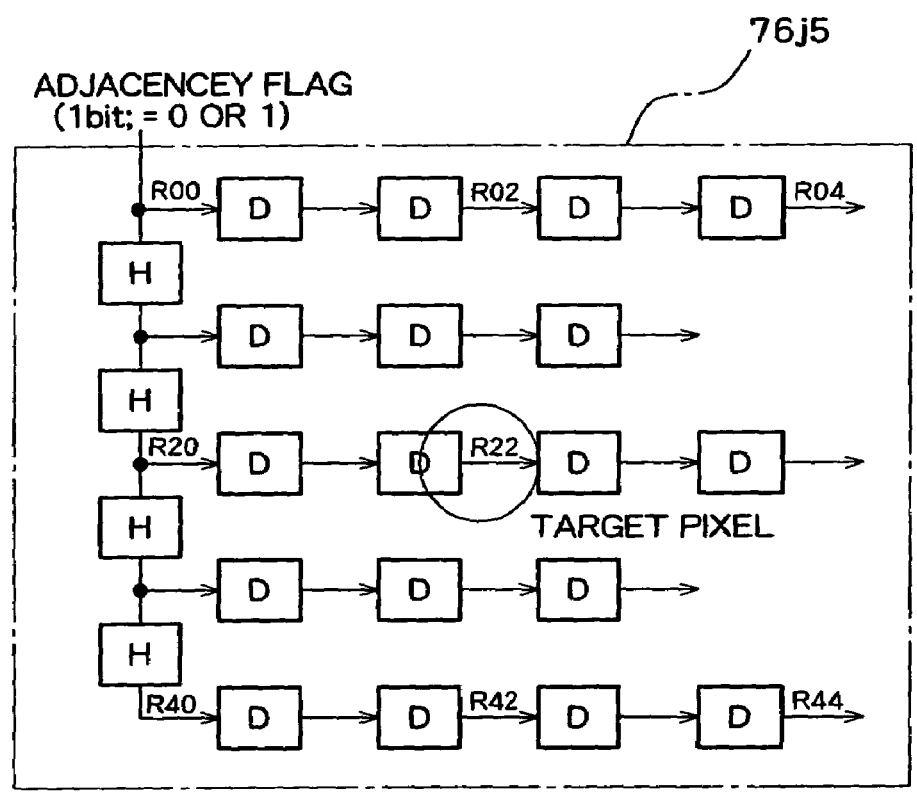
FIG. 44 is a structural diagram showing an adjacent defect pattern detection unit for RB according to the fourth preferred embodiment of the present invention.

FIG. 44 shows a structure of the adjacent defect pattern detection unit 76j5 in FIG. 42 which comprises a 4H line memory and clock delay circuit. An adjacency flag indicating whether or not a pixel of a point flaw is adjacent to the horizontal flaw of the target pixel R22 to be corrected is supplied from the defect decode circuit 78 to the adjacent defect pattern detection unit 76j5. The size of the adjacency flag is 1 bit and the adjacency flag is 1 when a pixel of point flaw is adjacent and is 0 when no pixel of point flaw is adjacent. A flag of 1 or 0 is output from each component of the 4H line memory and clock delay circuit. Therefore, it is possible to detect the defect pattern with respect to the target pixel R22 to be corrected from the values of the flags from the components. The adjacent pattern detection unit 76j5 outputs flag values corresponding to the pixels R00, R04, R40, R44, R02, and R42 in 6 bits. More specifically, the adjacent pattern detection unit 76j5 outputs the defect pattern of FIG. 43(q) when the flag value of R02 is 0 and the flag value of R42 is 0, the defect pattern of FIG. 43(r) when the flag value of R42 is 1 and the flag value of R02 is 0, the defect pattern of FIG. 43(s) when the flag value of R02 is 1 and the flag value of R42 is 0, and an adjacent defect pattern value=R00+R04*2+R40*4+R44*8 when the flag value of R02 is 1 and the flag value of R42 is 1. The adjacent defect pattern value takes a value within a range of 0~15. These values correspond to FIGS. 43(a)~43(p), respectively.

Figure 45:
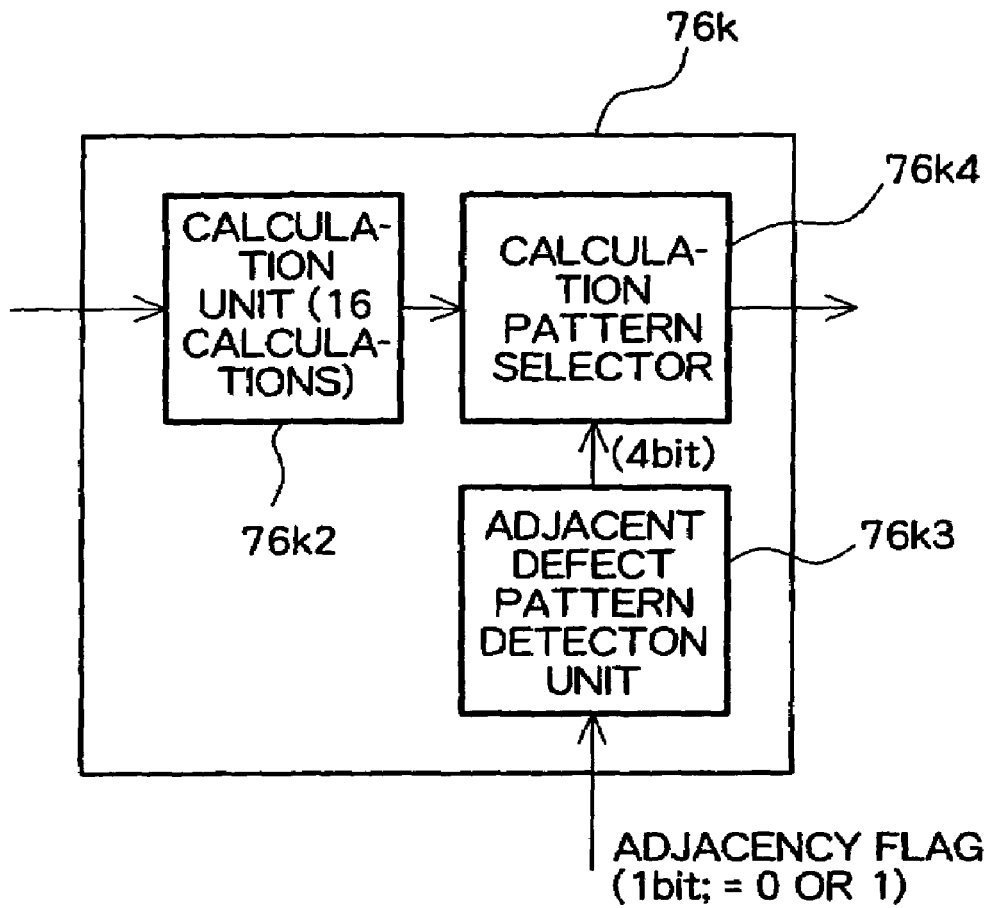
FIG. 45 is a block diagram showing a structure of an intersecting flaw correction unit for RB according to the fourth preferred embodiment of the present invention.

FIG. 45 shows a structure of the intersecting flaw correction unit 76k for RB in FIG. 38. The intersecting flaw correction unit 76k for RB comprises a calculation unit 76k2, an adjacent defect pattern detection unit 76k3, and a calculation pattern selector 76k4.

Figure 46:
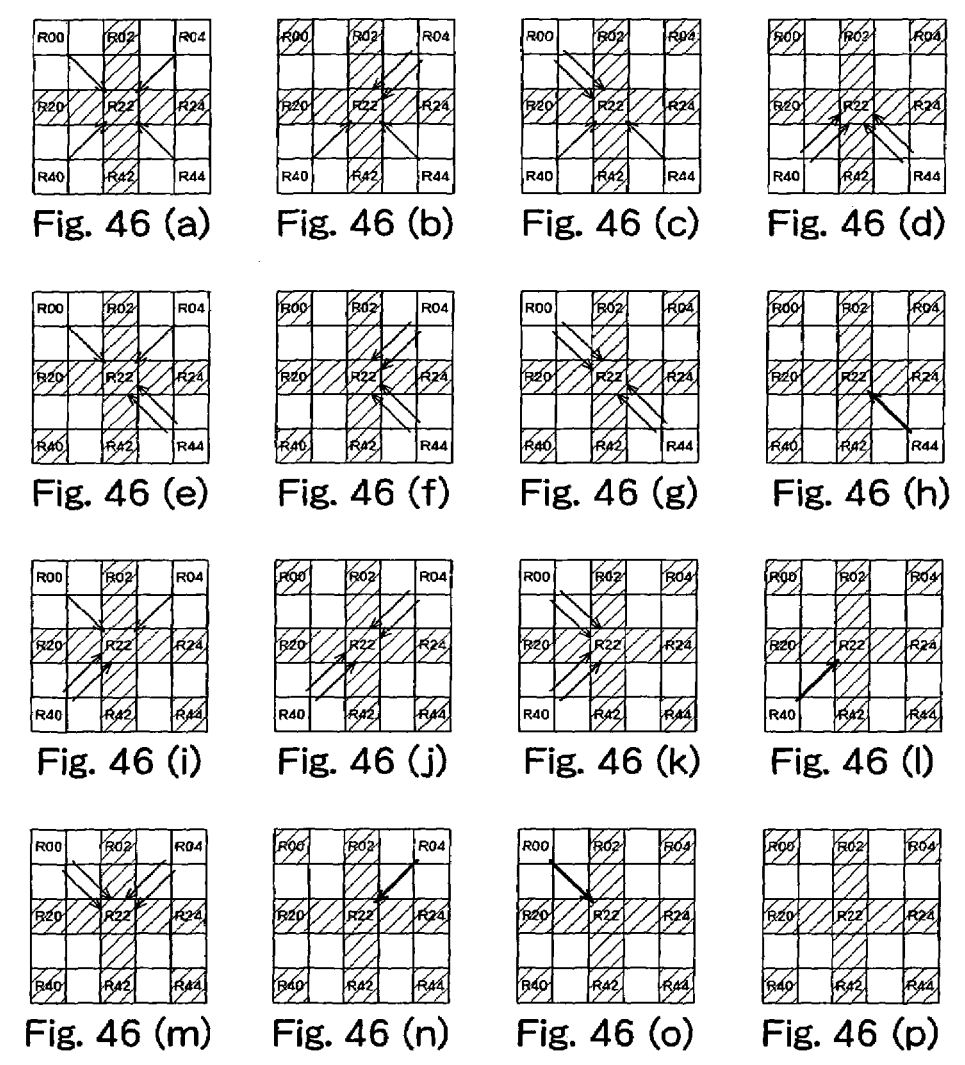

FIG. 46 shows calculations in the calculation unit 76k2. FIG. 46(a) shows a calculation when no point flaw is present adjacent to the pixel R22 of an intersecting flaw and:

$$R22=(R00+R04+R40+R44)/4$$

FIG. 46(b) shows a calculation when a point flaw is present in the pixel R00 and:

$$R22=(2*R04+R40+R44)/4$$

FIG. 46(c) shows a calculation when a point flaw is present in the pixel R04 and:

$$R22=(2*R00+R40+R44)/4$$

FIG. 46(d) shows a calculation when a point flaw is present in the pixels R00 and R04 and:

$$R22=(2*R40+2*R44)/4$$

FIG. 46(e) shows a calculation when a point flaw is present in the pixel R40 and:

$$R22=(2*R44+R00+R04)/4$$

FIG. 46(f) shows a calculation when a point flaw is present in the pixels R00 and R40 and:

$$R22=(2*R04+2*R44)/4$$

FIG. 46(g) shows a calculation when a point flaw is present in the pixels R04 and R40 and:

$$R22=(2*R00+2*R44)/4$$

FIG. 46(h) shows a calculation when a point flaw is present in the pixels R00, R04, and R40 and:

$$R22=(4*R44)/4$$

FIG. 46(i) shows a calculation when a point flaw is present in the pixel R44 and:

$$R22=(2*R40+R00+R04)/4$$

FIG. 46(j) shows a calculation when a point flaw is present in the pixels R00 and R44 and:

$$R22=(2*R04+2*R40)/4$$

FIG. 46(k) shows a calculation when a point flaw is present in the pixels R04 and R44 and:

$$R22=(2*R00+2*R40)/4$$

FIG. 46(l) shows a calculation when a point flaw is present in the pixels R00, R04, and R44 and:

$$R22=(4*R40)/4$$

FIG. 46(m) shows a calculation when a point flaw is present in the pixels R40 and R44 and:

$$R22=(2*R04+2*R00)/4$$

FIG. 46(n) shows a calculation when a point flaw is present in the pixels R00, R40, and R44 and:

$$R22=(4*R04)/4$$

FIG. 46(o) shows a calculation when a point flaw is present in the pixels R04, R40, and R44 and:

$$R22=(4*R00)/4$$

FIG. 46(p) shows a calculation when a point flaw is present in the pixels R00, R04, R40, and R44, again with the result that:

$$R22=R22.$$

Figure 47:
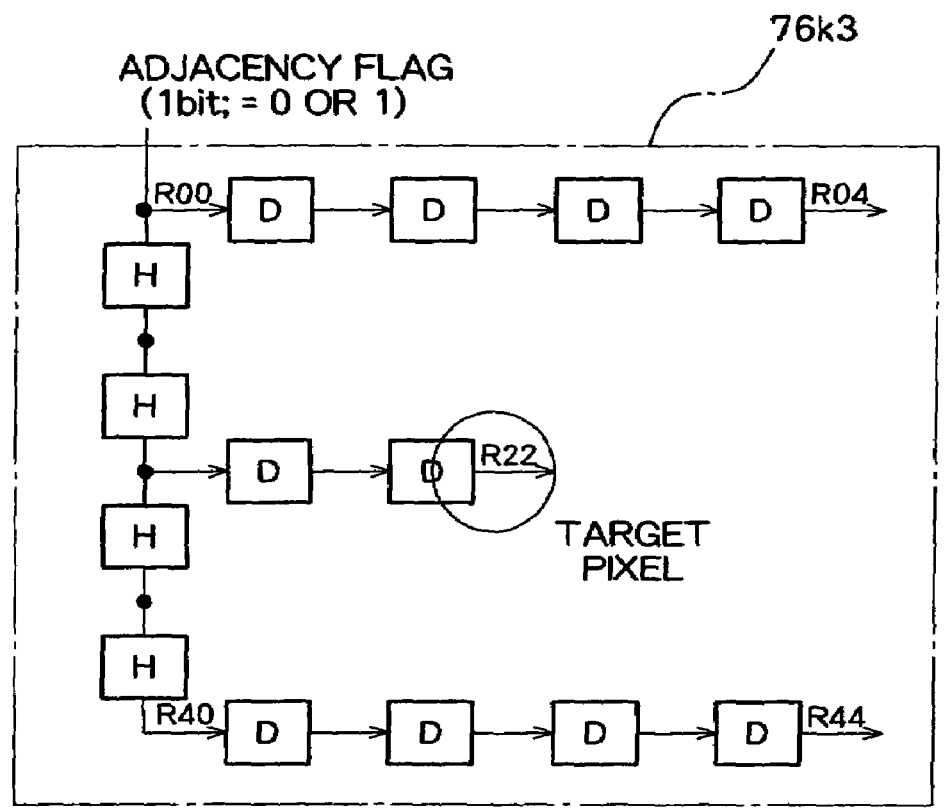
FIG. 47 is a structural diagram showing an intersecting flaw adjacent defect pattern detection unit for RB according to the fourth preferred embodiment of the present invention.

FIG. 47 shows a structure of the adjacent defect pattern detection unit 76k3 which comprises a 4H line memory and clock delay circuit. An adjacency flag indicating whether or not a point flaw is present adjacent to an intersecting flaw of the target pixel R22 to be corrected is supplied from the defect decode circuit 78 to the adjacent defect pattern detection unit 76k3. The size of the adjacency flag is 1 bit and the adjacency flag is 1 when a point flaw is adjacent to the intersecting flaw and is 0 when no point flaw is adjacent to the intersecting flaw. A flag of 1 or 0 is output from each component of the 4H line memory and clock delay circuit. Therefore, it is possible to detect the defect pattern with respect to the target pixel R22 to be corrected by the flag values from the components. The adjacent defect pattern detection unit 76g5 outputs values of the flags corresponding to the pixels R00, R04, R40, and R44 in 4 bits, that is, the adjacent defect pattern detection unit 76g5 outputs an adjacent defect pattern value=R02+R42*2+R20*4+R24*8. The adjacent defect pattern value takes a value within a range of 0~15 and these values correspond to the defect patterns of FIGS. 46(a)~46(p). The calculation pattern selector 76k4 selects one of the 16 calculations based on the defect pattern and outputs the calculation value, that is, the correction value. The intersecting flaw of G may be corrected through the point defect correction process for G.

In the fourth preferred embodiment, because the point flaw, vertical flaw, and horizontal flaw can be simultaneously processed in parallel, it is not necessary to provide a plurality of line memory and clock delay circuits. In addition, the process can be performed quickly. Moreover, even when a point flaw is present adjacent to a vertical flaw or a horizontal flaw, it is possible to reliably correct the flaws.

Although preferred embodiments of the present invention have been described referring to an image processing in a digital camera, the present invention is not limited to such a configuration, and may be embodied in various manners.

Figure 48:
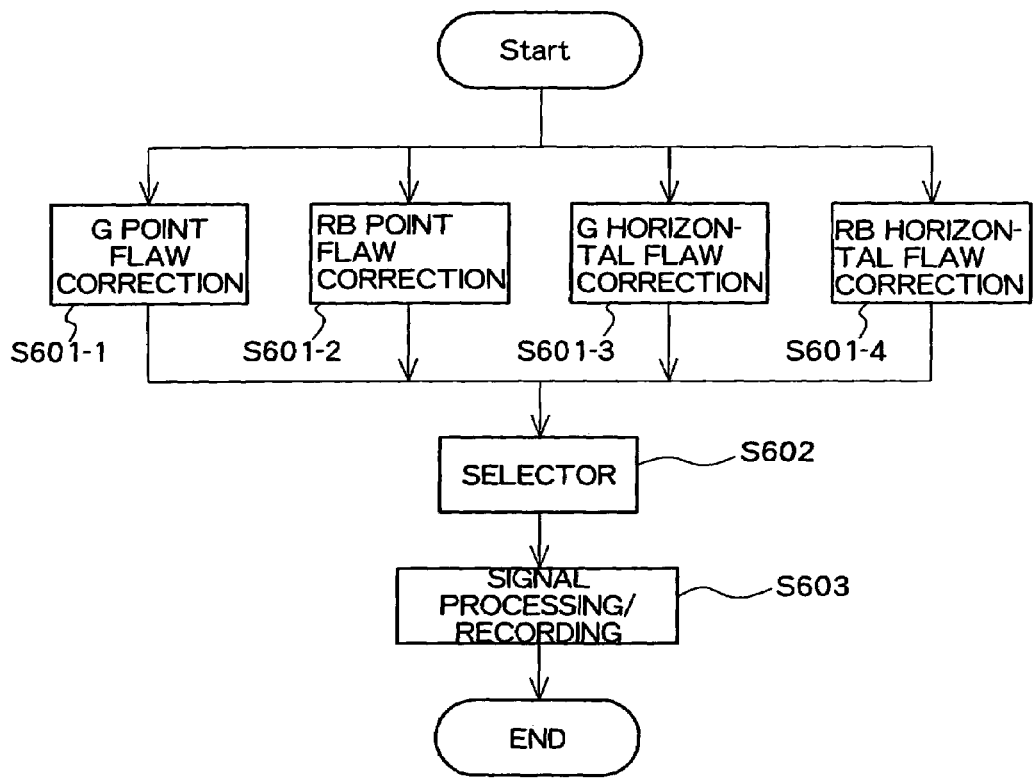
FIG. 48 is a flowchart showing a process according to yet another preferred embodiment of the present invention.
Figure 49:
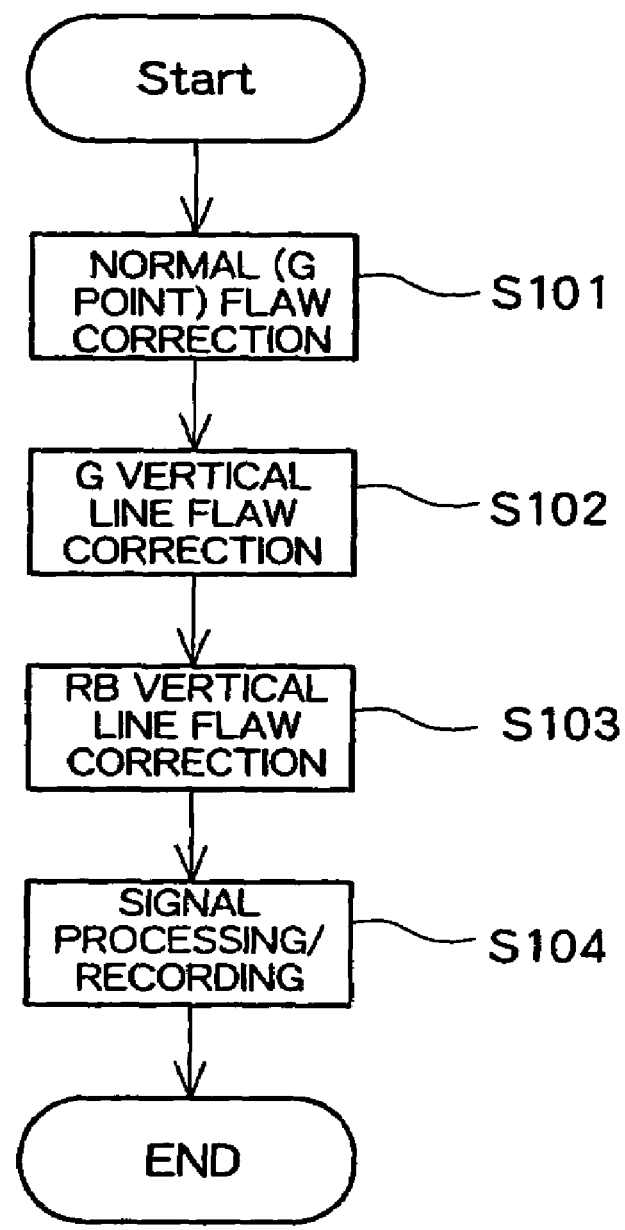
FIG. 49 is a flowchart showing a process in a device of a related art.

For example, although the vertical flaw of G and vertical flaw of RB are simultaneously corrected in the first preferred embodiment, the vertical flaw of G, vertical flaw of RB, horizontal flaw of G, and horizontal flaw of RB are simultaneously corrected in the second preferred embodiment, the point flaw of G, point flaw of RB, vertical flaw of G, and vertical flaw of RB are simultaneously corrected in the third preferred embodiment, and the point flaw of G, the point flaw of RB, vertical flaw of G, vertical flaw of RB, horizontal flaw of G, horizontal flaw of RB, and intersecting flaw of RB (and intersecting flaw of G) are simultaneously corrected in the fourth preferred embodiment, it is also possible to simultaneously correct the point flaw of G, point flaw of RB, horizontal flaw of G, and horizontal flaw of RB. FIG. 48 is a flowchart showing a process in this configuration.

What is claimed is:

1. A pixel defect correction circuit which corrects a point defect and a line defect of a plurality of pixels arranged along a horizontal direction and a vertical direction, the pixel defect correction circuit comprising:
   a unit which detects presence and a position of a point defect and a line defect;
   a unit which corrects a point defect pixel by calculating a pixel value of the point defect pixel from pixel values of surrounding pixels which are adjacent to the point defect pixel;
   a unit which calculates a first difference value between pixel values of an upper-right pixel and a lower-left pixel which are adjacent to a target pixel to be corrected within a line defect pixel, a second difference value between pixel values of an upper-left pixel and a lower-right pixel which are adjacent to the target pixel, a third difference value between a sum of the pixel values of the upper-left pixel and the lower-left pixel and a sum of the pixel values of the upper-right pixel and the lower-right pixel, and a fourth difference value between a sum of the pixel values of the upper-left pixel and the upper-right pixel and a sum of the pixel values of the lower-left pixel and the lower-right pixel, and
   a unit which corrects the line defect pixel by calculating a pixel value of the target pixel from at least one of the pixel values of the upper-right pixel, the lower-right pixel, the upper-left pixel, and the lower-left pixel using a correction pattern corresponding to a relationship in magnitude of the first difference value, the second difference value, the third difference value, and the fourth difference value.

2. A pixel defect correction circuit according to claim 1, wherein
   the target pixel is a G pixel in a Bayer arrangement.

3. A pixel defect correction circuit according to claim 2, wherein
   when the G pixels in the Bayer arrangement are Gij, R pixels in the Bayer arrangement are Rij, B pixels in the Bayer arrangement are Bij (wherein i and j are integers greater than or equal to 0), and the target pixel is G23, the calculating unit calculates:
   the first difference value=G14−G32;
   the second difference value=G12−G34;
   the third difference value=G12+G32−G14−G34; and
   the fourth difference value=G12+G14−G32−G34.

4. A pixel defect correction circuit according to claim 1, wherein
   the correcting unit simultaneously corrects a point defect pixel and a line defect pixel in parallel.

5. A pixel defect correction circuit according to claim 1, wherein
   the correcting unit simultaneously corrects a point defect pixel, a vertical line defect pixel, and a horizontal line defect pixel in parallel.

6. A pixel defect correction circuit according to claim 5, wherein
   the correcting unit simultaneously corrects an R pixel, a G pixel, and a B pixel in parallel.

7. A pixel defect correction circuit which corrects a point defect and a line defect of a plurality of pixels arranged along a horizontal direction and a vertical direction, the pixel defect correction circuit comprising:
   a unit which detects presence and a position of a point defect and a line defect;
   a unit which corrects a point defect pixel by calculating a pixel value of the point defect pixel from pixel values of surrounding pixels which are adjacent to the point defect pixel;
   a unit which calculates a first difference value between pixel values of a horizontal direction pixel and an upper-left pixel and a lower-right pixel which are adjacent to a target pixel to be corrected within a line defect pixel, a second difference value between pixel values of the horizontal direction pixel and an upper-right pixel and a lower-left pixel which are adjacent to the target pixel, and a third difference value between pixel values of the horizontal direction pixel and a left pixel and a right pixel which are adjacent to the target pixel; and
   a unit which corrects a vertical line defect pixel by calculating a pixel value of the target pixel from at least one of the pixel values of the upper-right pixel, the lower-right pixel, the upper-left pixel, and the lower-left pixel using a correction pattern corresponding to a relationship in magnitude of the first difference value, the second difference value, and the third difference value.

8. A pixel defect correction circuit according to claim 7, wherein
   the target pixel is an R pixel or a B pixel in a Bayer arrangement.

9. A pixel defect correction circuit according to claim 7, wherein
   the target pixel is an R pixel or a B pixel in a Bayer arrangement, and
   when G pixels in the Bayer arrangement are Gij, R pixels in the Bayer arrangement are Rij, B pixels in the Bayer arrangement are Bij (wherein i and j are integers greater than or equal to 0), and the target pixel is R22, the calculating unit calculates:
   the first difference value=G21*2+G23*2−G01−G10−G34−G43;
   the second difference value=G21*2+G23*2−G03−G14−G30−G41; and
   the third difference value=G21*2+G23*2G10−G30−G14−G34.

10. A pixel defect correction circuit which corrects a point defect and a line defect of a plurality of pixels arranged along a horizontal direction and a vertical direction, the pixel defect correction circuit comprising:
    a unit which detects presence and a position of a point defect and a line defect;
    a unit which corrects a point defect pixel by calculating a pixel value of the point defect pixel from pixel values of surrounding pixels which are adjacent to the point defect pixel;
    a unit which calculates a first difference value between pixel values of a vertical direction pixel and an upper-left pixel and a lower-right pixel which are adjacent to a target pixel to be corrected within a line defect pixel, a second difference value between pixel values of the vertical direction pixel and an upper-right pixel and a lower-left pixel which are adjacent to the target pixel, and a third difference value between pixel values of the vertical direction pixel and a left pixel and a right pixel which are adjacent to the target pixel; and a unit which corrects a horizontal line defect pixel by calculating a pixel value of the target pixel from at least one of the pixel values of the upper-right pixel, the lower-right pixel, the upper-left pixel, and the lower-left pixel using a correction pattern corresponding to a relationship in magnitude among the first difference value, the second difference value, and the third difference value.

11. A pixel defect correction circuit according to claim 10, wherein the target pixel is an R pixel or a B pixel in a Bayer arrangement; and when G pixels in the Bayer arrangement are $G_{ij}$, R pixels in the Bayer arrangement are $R_{ij}$, B pixels in the Bayer arrangement are $B_{ij}$ (wherein i and j are integers greater than or equal to 0), and the target pixel is $R_{22}$, the calculating unit calculates:

the first difference value $= G_{12}*2 + G_{32}*2 - G_{01} - G_{10} - G_{34} - G_{43}$;

the second difference value $= G_{12}*2 + G_{32}*2 - G_{03} - G_{14} - G_{30} - G_{41}$; and the third difference value $= G_{12}*2 + G_{32}*2 - G_{10} - G_{30} - G_{14} - G_{34}$.

12. A pixel defect correction circuit according to claim 10 wherein:

the target pixel is an R pixel or a B pixel in a Bayer arrangement.

* * * * *